United States Patent
Popovich et al.

(10) Patent No.: US 6,678,078 B1
(45) Date of Patent: Jan. 13, 2004

(54) OPTICAL FILTER EMPLOYING HOLOGRAPHIC OPTICAL ELEMENTS AND IMAGE GENERATING SYSTEM INCORPORATING THE OPTICAL FILTER

(75) Inventors: Milan M. Popovich, Leicester (GB); C. David Nabors, Sunnyvale, CA (US)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/478,150

(22) Filed: Jan. 5, 2000

Related U.S. Application Data
(60) Provisional application No. 60/115,063, filed on Jan. 7, 1999.

(51) Int. Cl.[7] ............................................. G02B 5/32
(52) U.S. Cl. ........................ 359/15; 359/22; 353/30
(58) Field of Search ....................... 359/15, 22, 24; 349/201, 202; 353/30, 31

(56) References Cited

U.S. PATENT DOCUMENTS

| | | |
|---|---|---|
| 3,807,829 A | 4/1974 | Close |
| 4,028,725 A | 6/1977 | Lewis ........................ 358/103 |
| 4,458,981 A | 7/1984 | Huignard |
| 4,500,163 A | 2/1985 | Burns et al. |
| 4,566,031 A | 1/1986 | Kirk |
| 4,669,812 A | 6/1987 | Hoebing |
| 4,759,596 A | 7/1988 | Po et al. |
| 4,790,613 A | 12/1988 | Moss |

(List continued on next page.)

FOREIGN PATENT DOCUMENTS

| | | | |
|---|---|---|---|
| DE | 34 19 098 A1 | 11/1985 | ........... G02B/27/22 |
| EP | 0 389 123 A3 | 9/1990 | ........... G03B/21/56 |
| EP | 0 389 123 A2 | 9/1990 | ........... G03B/21/56 |
| EP | 0 559 435 A1 | 9/1993 | ........... G11B/7/135 |
| EP | 0 602 813 A1 | 6/1994 | ........... D02B/5/32 |
| EP | 0 664 495 A1 | 7/1995 | ........... G03H/1/02 |
| EP | 0 720 040 A2 | 7/1996 | ........... G02F/1/1335 |
| EP | 0 720 040 A3 | 4/1997 | ........... G02F/1/1335 |
| EP | 0 777 136 A1 | 6/1997 | ........... G02B/5/20 |
| EP | 0 785 457 A2 | 7/1997 | ........... G02F/1/1333 |

(List continued on next page.)

OTHER PUBLICATIONS

Sutherland et al., "Electrically switchable volume gratings in polymer dispersed liquid crystals", Appl. Phys. Lett., 64(9), 1994, pp. 1074–1076.*

Bunning, T.J. et al., "The Morphology and Performance of Holographic Transmission Gratings Recorded in Polymer Dispersed Liquid Crystal," Polymer vol. 36, No. 14, received Dec. 27, 1994; revised Feb. 10, 1995, pp. 2699–2708.

Domash, Lawrence H. et al., "Applications of Switchable Polaroid Holograms," SPIE vol. 2152, Jun. 1, 1994, pp. 127–138.

(List continued on next page.)

*Primary Examiner*—John Juba
*Assistant Examiner*—Leo Boutsikaris
(74) *Attorney, Agent, or Firm*—Campbell Stephenson Ascolese LLP

(57) ABSTRACT

The present invention relates to a solid state filter used in sequentially illuminating an image display, directly or indirectly, with first, second, and third bandwidth light. The solid state filter includes at least one hologram that is switchable between active and inactive states. While in the active state, the at least one switchable hologram diffracts a first bandwidth light. In contrast, the switchable hologram transmits the first bandwidth light without substantial alteration when operating in the inactive state. In one embodiment, the diffracted first bandwidth light is used to illuminate a monochrome image presented on a display device. In another embodiment, the transmitted first bandwidth light is used to illuminate the monochrome image presented on the image display.

32 Claims, 35 Drawing Sheets

U.S. PATENT DOCUMENTS

| | | |
|---|---|---|
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,938,568 A | 7/1990 | Margerum et al. .......... 350/334 |
| 4,981,332 A | 1/1991 | Smith et al. |
| 4,993,790 A | 2/1991 | Vick |
| 5,011,244 A | 4/1991 | Smith et al. |
| 5,013,141 A | 5/1991 | Sakata ........................ 350/348 |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,093,567 A | 3/1992 | Staveley ..................... 250/221 |
| 5,096,282 A | 3/1992 | Margerum et al. ............. 359/3 |
| 5,103,323 A | 4/1992 | Magarinos |
| 5,111,313 A | 5/1992 | Shires |
| 5,151,724 A | 9/1992 | Kikinis |
| 5,153,670 A | 10/1992 | Jannson et al. |
| 5,175,637 A | 12/1992 | Jones et al. ................... 359/48 |
| 5,221,957 A | 6/1993 | Jannson et al. |
| 5,227,898 A | 7/1993 | Iavecchia et al. |
| 5,234,449 A | 8/1993 | Bruker ....................... 606/158 |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,331,149 A | 7/1994 | Spitzer et al. .............. 250/221 |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,414,544 A | 5/1995 | Aoyagi et al. ................ 359/53 |
| 5,418,631 A | 5/1995 | Tedesco et al. |
| 5,424,866 A | 6/1995 | Kikinis |
| 5,440,428 A | 8/1995 | Hegg et al. |
| 5,455,693 A | 10/1995 | Wreede et al. ................ 359/15 |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,579,026 A | 11/1996 | Tabata .......................... 345/8 |
| 5,581,378 A | 12/1996 | Kulick |
| 5,589,956 A | 12/1996 | Morishima et al. ........... 359/15 |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,635,947 A | 6/1997 | Iwamoto ........................ 345/7 |
| 5,640,256 A | 6/1997 | De Vré et al. .................. 359/3 |
| 5,644,369 A | 7/1997 | Jachimowicz et al. ........ 349/10 |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,682,214 A | 10/1997 | Amako et al. ................. 349/74 |
| 5,684,498 A | 11/1997 | Welch et al. ................... 345/8 |
| 5,692,077 A | 11/1997 | Stone et al. |
| 5,696,552 A | 12/1997 | Aritake et al. |
| 5,696,749 A | 12/1997 | Brazas et al. |
| 5,698,343 A * | 12/1997 | Sutherland ..................... 430/1 |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. |
| 5,744,267 A | 4/1998 | Meerholz et al. |
| 5,745,203 A | 4/1998 | Valliath et al. |
| 5,748,272 A | 5/1998 | Tanaka et al. ................. 349/86 |
| 5,748,828 A | 5/1998 | Steiner et al. |
| 5,751,243 A | 5/1998 | Turpin |
| 5,751,452 A | 5/1998 | Tanaka et al. ................. 359/52 |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,768,242 A | 6/1998 | Juday ......................... 369/103 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Loiseaux et al. |
| 5,790,284 A | 8/1998 | Taniguchi et al. |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,589 A | 9/1998 | Fergason ........................ 345/8 |
| 5,808,759 A | 9/1998 | Okamori et al. |
| 5,808,800 A | 9/1998 | Handschy et al. .......... 359/630 |
| 5,815,222 A | 9/1998 | Matsuda et al. |
| 5,822,029 A | 10/1998 | Davis et al. |
| 5,825,340 A | 10/1998 | Torizuka et al. ............... 345/8 |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,867,134 A | 2/1999 | Alvelda et al. ................. 345/8 |
| 5,875,012 A | 2/1999 | Crawford et al. ............. 349/74 |
| 5,880,883 A | 3/1999 | Sudo .......................... 359/462 |
| 5,886,675 A | 3/1999 | Aye et al. ....................... 345/7 |
| 5,942,157 A | 8/1999 | Sutherland et al. |
| 5,959,704 A | 9/1999 | Suzuki et al. ................... 349/9 |
| 5,977,935 A | 11/1999 | Yasukawa et al. ............. 345/8 |
| 6,008,781 A | 12/1999 | Furness, III et al. ............ 345/8 |

| | | | | |
|---|---|---|---|---|
| 6,023,253 | A | | 2/2000 | Taniguchi et al. ............. 345/7 |
| 6,072,923 | A | * | 6/2000 | Stone ........................... 385/16 |
| 6,166,800 | A | * | 12/2000 | Silverstein ................... 349/201 |
| 6,504,629 | B1 | * | 1/2003 | Popovich ..................... 359/15 |

FOREIGN PATENT DOCUMENTS

| | | | |
|---|---|---|---|
| EP | 0 821 293 A2 | 1/1998 | ............ G03H/1/04 |
| EP | 0 825 462 A1 | 2/1998 | ............ G02B/5/32 |
| EP | 0 826 986 A1 | 3/1998 | ............ G02B/5/20 |
| EP | 0 856 766 A2 | 8/1998 | ......... G02F/1/1333 |
| EP | 0 856 768 A2 | 8/1998 | ......... G02F/1/1347 |
| EP | 0 785 457 A3 | 10/1998 | ......... G02F/1/1333 |
| EP | 0 821 293 A3 | 11/1998 | ............ G03H/1/04 |
| EP | 0 856 766 A3 | 7/1999 | ......... G02F/1/1333 |
| EP | 0 856 768 A3 | 8/1999 | ......... G02F/1/1347 |
| FR | 2 610 733 A1 | 12/1988 | ........... G02B/27/10 |
| GB | 2 259 213 A | 3/1993 | ............ G09B/9/32 |
| JP | 3-84516 | 4/1991 | ........... G02B/27/22 |
| JP | 10 54959 | 2/1998 | ........... G02B/27/42 |
| WO | WO 94/18596 | 8/1994 | ........... G02B/27/00 |
| WO | WO 95/04294 | 2/1995 | |
| WO | WO 97/35223 | 9/1997 | ........... G02B/27/01 |
| WO | WO 97/36206 | 10/1997 | ......... G02F/1/1347 |
| WO | 98/04650 | 2/1998 | |

OTHER PUBLICATIONS

Iwamoto, Kazuyo et al., "An Eye Movement Tracking Type Head Mounted Display for Virtual Reality System: Evaluation Experiments of a Proto–type System," IEEE, Feb. 10, 1994, pp. 13–18.

Iwamoto, Kazuyo et al., "High Resolution, Wide View Angle Head Mounted Display Using Eye Movement Tracking: System Structure and Evaluation Experiments," IEEE International Workshop on Robot and Human Communication, May 7, 1995, pp. 289–294.

Marrakchi, A. et al., "Generation of Programmable Coherent Source Arrays Using Spatial Light Modulators," Optics Letters, vol. 16, No. 12, Jun. 15, 1991, pp. 931–933.

Natarajan, L.V., et al., "Holographic PDLC's for Optical Beam Modulation, Deflection, and Dynamic Filter Applications," (Invited Paper), work performed at the Materials Directorate of the Air Force Research Laboratory at Wright–Patterson Air Force Base, 1998, pp. 44–51.

Patel, J. S. et al., "Electrically Controlled Polarization–independent Liquid–Crystal Fresnel Lens Arrays," Optics Letters, vol. 16, No. 7, Apr. 1, 1991, pp. 532–534.

Stankus, J. J., et al., "Electric–Field–Switchable Stratified Volume Holograms in Photorefractive Polymers," Optics Letters, vol. 19, No. 18, Sep. 15, 1994, pp. 1480–1482.

Sutherland, R. L., "Optical Limiters, Switches, and Filters Based on Polymer Dispersed Liquid Crystals," SPIE, vol. 1080, Liquid Crystal Chemistry, Physics, and Applications, 1989, pp. 83–90.

Sutherland, R. L., et al., "Bragg Gratings in an Acrylate Polymer Consisting of Periodic Polymer–Dispersed Liquid–Crystal Planes," Chem. Mater., vol. 5, No. 10, 1993, pp. 1533–1538.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L.,et al., "Switchable Holograms in New Photopolymer–Liquid Crystal Composite Materials," SPIE, vol. 2404, Mar. 1995, pp. 132–143.

Tam, Eddy C., et al., "Spatial–Light Modulator–Based Electro–Optical Imaging System," Applied Optics, vol. 31, No. 5, Feb. 10, 1992, p. 578–579.

Tanaka, Keiji, et al., "Holographically Formed Liquid–Crystal/Polymer Device for Reflective Color Display," 2320 Journal of the Society for Information Display, No. 1, Apr. 1994, pp. 37–40.

* cited by examiner

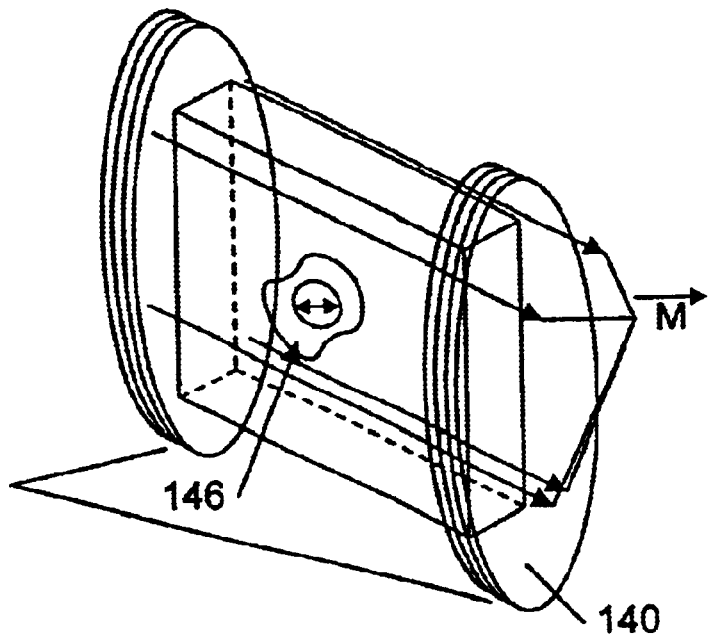
FIG. 10a
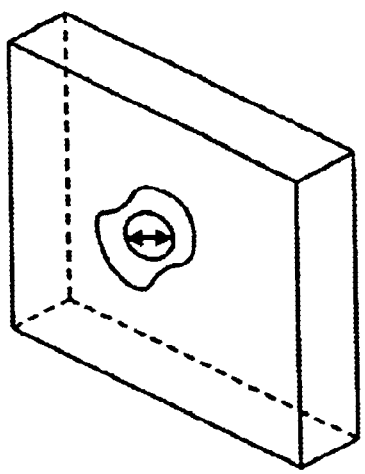 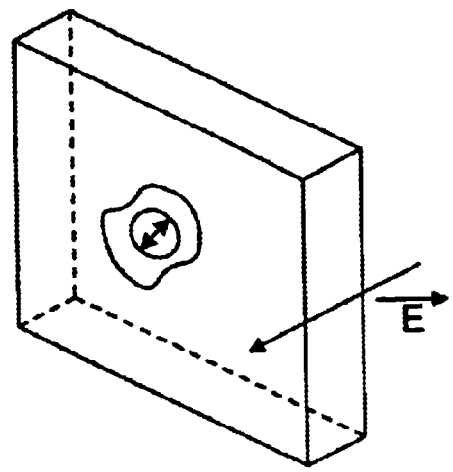
FIG. 10b                FIG. 10c

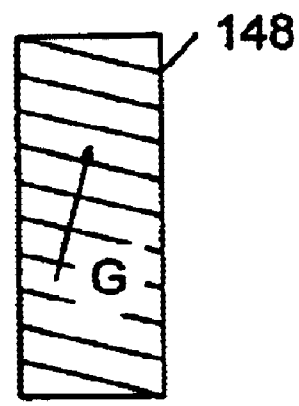
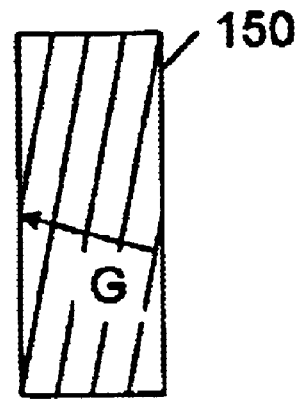
FIG. 11a — SLANTED TRANSMISSION
FIG. 11b — SLANTED REFLECTION
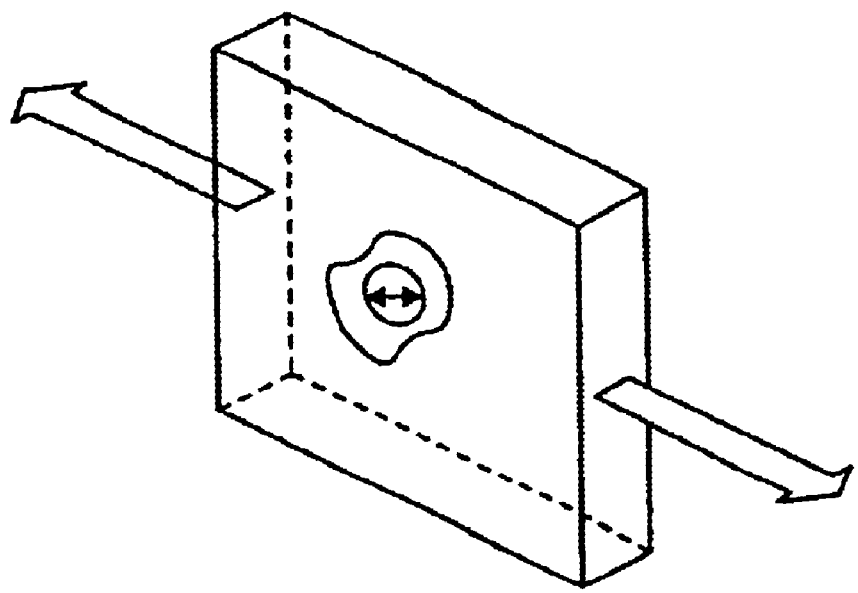
FIG. 12

LIGHT TRANSMITTED

LIGHT BLOCKED

TRANSMITTED

RETRO-REFLECTED

UNSWITCHED STATE

SWITCHED STATE

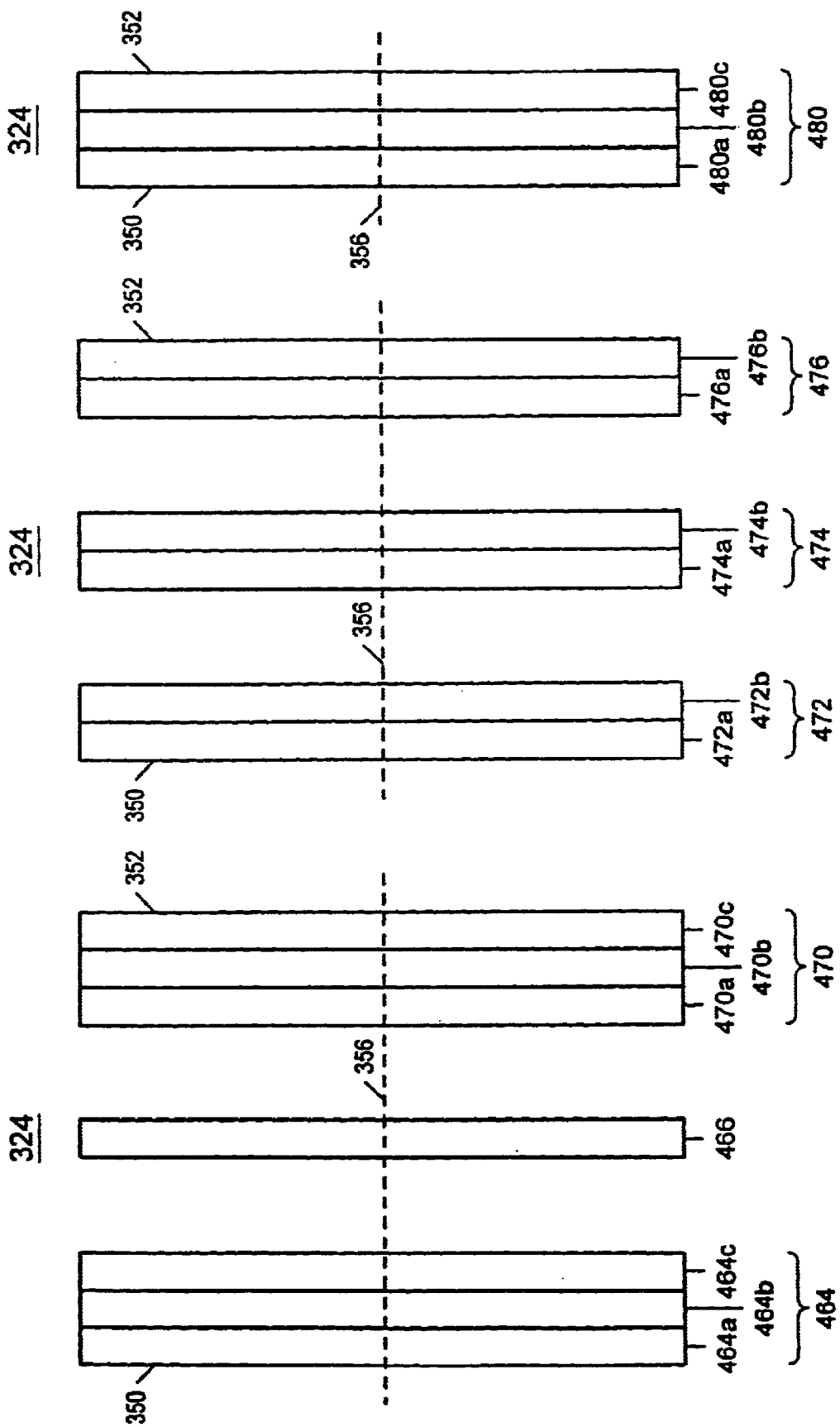

OPTICAL FILTER EMPLOYING HOLOGRAPHIC OPTICAL ELEMENTS AND IMAGE GENERATING SYSTEM INCORPORATING THE OPTICAL FILTER

RELATED APPLICATIONS

This application claims priority to provisional application entitled Optical Filter Device And Image Generating Apparatus Incorporating Such A Device, Ser. No. 60/115,063, filed Jan. 7, 1999.

BACKGROUND OF THE INVENTION

1. Field of the Invention

The present invention relates generally to an optical filter device, and more particularly to an optical filter device employing electrically switchable holograms.

2. Description of the Relevant Art

Image display systems often employ a display screen for projecting an image. The display screen typically displays a sequence of monochrome images that are illuminated in succession by red, blue, and green light. The illuminated images are then projected for display to a viewer.

The display screen switches from one monochrome image to the next very rapidly so that a sequence of three consecutive monochrome images illuminated by red, blue, and green light, respectively, are projected and effectively eye integrated by a viewer to create a full-color image. The successive illumination of the display screen by red, blue, and green light can be achieved by employing a white-light source and a rotating color wheel (often utilizing transmissive dielectric red, blue, and green filters). These rotating color wheels are prone to mechanical problems. Additionally, rotating wheels tend to be large and noisy in operation.

SUMMARY OF THE INVENTION

The present invention relates to a solid state filter used in sequentially illuminating an image display, directly or indirectly, with first, second, and third bandwidth light. The solid state filter includes at least one hologram that is switchable between active and inactive states. While in the active state, the at least one switchable hologram diffracts a first bandwidth light. In contrast, the switchable hologram transmits the first bandwidth light without substantial alteration when operating in the inactive state. In one embodiment, the diffracted first bandwidth light is used to illuminate a monochrome image presented on a display device. In another embodiment, the transmitted first bandwidth light is used to illuminate the monochrome image presented on the image display.

In one embodiment, the solid state filter may be coupled to a filter control circuit. More particularly, the filter control circuit is coupled to the at least one switchable hologram of the solid state filter. The control circuit is configured to selectively couple a voltage source to the at least one switchable hologram. The at least one switchable hologram is configured to operate in the active state when decoupled from the voltage source. In contrast, the at least one switchable hologram is configured to operate in the inactive state when coupled to the voltage source.

In another embodiment of the present invention, a solid-state filter is provided which includes a first group of first, second, and third holographic optical elements electrically switchable between active and inactive states, and a second group of first, second, and third holographic optical elements electrically switchable between active and inactive states. Each of the holographic optical elements includes front and back oppositely facing surfaces. Each of the first holographic optical elements diffracts first bandwidth light incident on the front surface thereof when operating in the active state. Diffracted first bandwidth light emerges from the back surface of the first holographic optical element. In contrast, each of the first holographic optical elements transmits first bandwidth light incident on the front surface thereof without substantial alteration when operating in the inactive state. First bandwidth light transmitted by each of the first holographic optical elements emerges from the back surface thereof. Each of the second holographic optical elements diffracts second bandwidth light incident on the front surface thereof when operating in the active state. Diffracted second bandwidth light emerges from the back surface of the second holographic optical elements. In contrast, each of the second holographic optical elements transmits second bandwidth light incident on the front surface thereof without substantial alteration when operating in the inactive state. Transmitted second bandwidth light emerges from the back surface of the second holographic optical elements. Each of the third holographic optical elements diffracts third bandwidth light incident on the front surface thereof when operating in the active state. Diffracted third bandwidth light emerges from the back surface of the third holographic optical elements. In contrast, each of the third holographic optical elements transmits third bandwidth light incident on the front surface thereof without substantial alteration when operating in the active state. This transmitted third bandwidth light emerges from the back surface of the third holographic optical elements. In one embodiment, a polarization rotation device is positioned between the first and second groups of holographic optical elements. The polarization rotation device operates to rotate the plane of polarization of light transmitted therethrough.

BRIEF DESCRIPTION OF THE DRAWINGS

FIG. 10a is an elevational view of a reflection grating, made in accordance with the teachings of the description herein, disposed within a magnetic field generated by Helmholtz coils;

FIGS. 10b and 10c are elevational views of the reflection grating of FIG. 10a in the absence of an electric field (FIG. 10b) and with an electric field applied (FIG. 10c);

FIGS. 11a and 11b are representative side views of a slanted transmission grating (FIG. 11a) and a slanted reflection grating (FIG. 11b) showing the orientation of the grating vector G of the periodic planes of polymer channels and PDLC channels;

FIG. 12 is an elevational view of a reflection grating, made in accordance with the teachings of the description herein, when a shear stress field is applied thereto;

FIG. 24a is a cross-sectional view of a reflective or transmissive-type solid-state optical filter employing the present invention;

FIG. 24b is a cross-sectional view of a transmissive or reflective-type solid-state optical filter employing the present invention;

FIG. 24c is a cross-sectional view of a transmissive-type solid-state optical filter employing the present invention;

Figure 1:
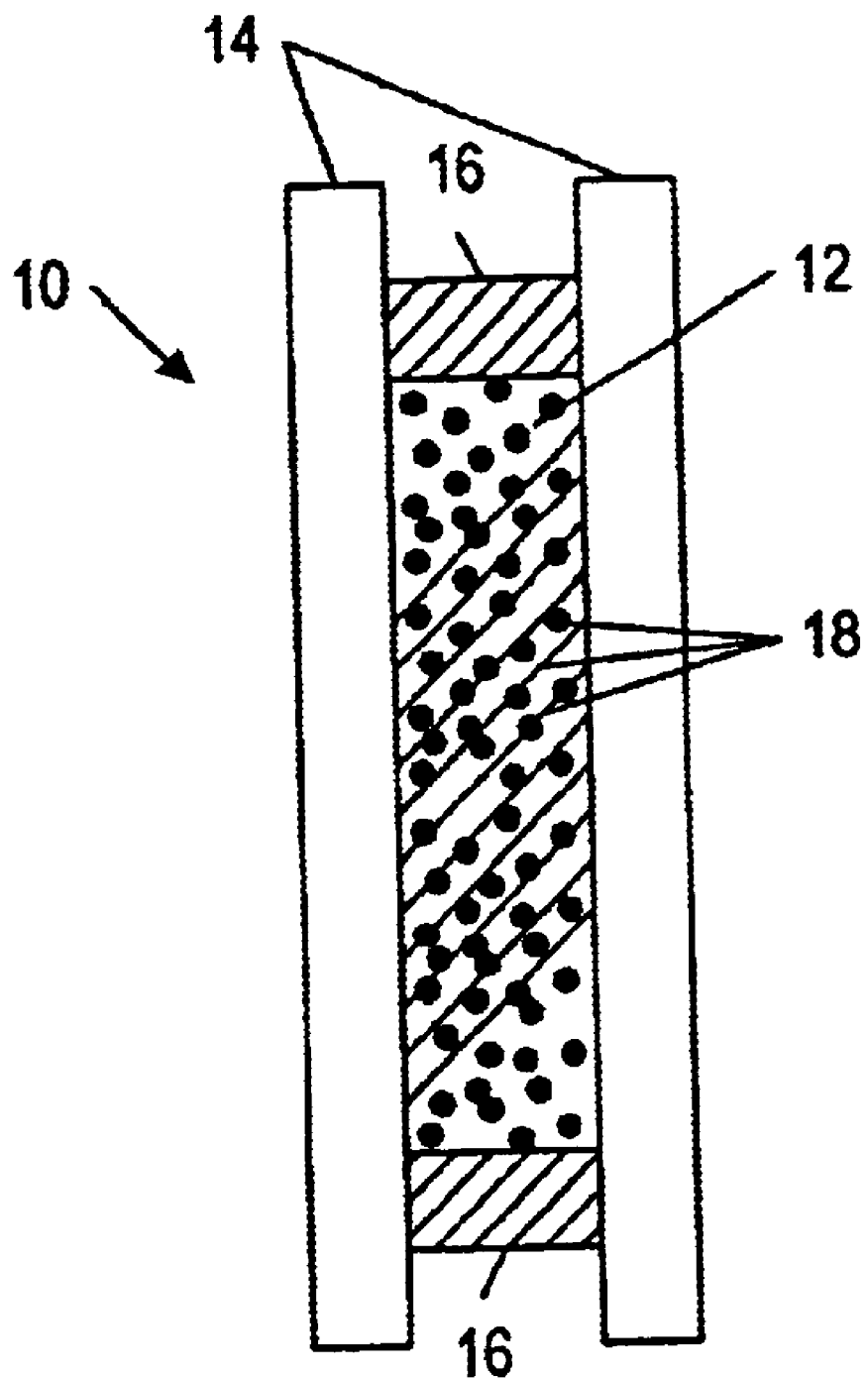
FIG. 1 is a cross-sectional view of an electrically switchable hologram made of an exposed polymer dispersed liquid crystal (PDLC) material made in accordance with the teachings of the description herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims.

DETAILED DESCRIPTION OF THE PREFERRED EMBODIMENTS

1. Switchable Hologram Materials and Devices

The present invention employs holographic optical elements formed, in one embodiment, from a polymer dispersed liquid crystal (PDLC) material comprising a monomer, a dispersed liquid crystal, a cross-linking monomer, a co-initiator and a photo-initiator dye. These PDLC materials exhibit clear and orderly separation of the liquid crystal and cured polymer, whereby the PDLC material advantageously provides high quality optical elements. The PDLC materials used in the holographic optical elements may be formed in a single step. The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. Nos. 08/273, 436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

The process by which a hologram for use in one embodiment of the present invention, may be formed is controlled primarily by the choice of components used to prepare the homogeneous starting mixture, and to a lesser extent by the intensity of the incident light pattern. In one embodiment of polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting embodiment of PDLC material may have an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels, and nearly pure polymer channels in a PDLC material are possible by multistep processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 µm thickness. The sample is placed in a conventional holographic recording setup. Gratings are typically recorded using the 488 nm line of an Argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photo-initiator dye, a co-initiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to end to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 μm.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used in the present invention. In one embodiment, it has been found that an approximately 1:4 mixture of tri-to penta-acrylate facilitates homogeneous mixing while providing a favorable mixture for forming 10–20 μm films on the optical plates.

The second phase material of choice for use in the practice of the present invention is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, α-methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wisconsin), co-initiator N-phenylglycine ("NPG") (also available from the Aldrich Chemical Company, Milwaukee, Wis.), and the photo-initiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed that results in the formation of small liquid crystal micro-droplets.

The mixture of liquid crystal and prepolymer material are homogenized to a viscous solution by-suitable means (e.g., ultrasonification) and spread between indium-tin-oxide (ITO) coated glass sides with spacers of nominally 15–100 μm thickness and, preferably, 10–20 μm thickness. The ITO is electrically conductive and serves as an optically transparent electrode. Preparation, mixing and transfer of the prepolymer material onto the glass slides are preferably done in the dark, as the mixture is extremely sensitive to light.

The sensitivity of the prepolymer materials to light intensity is dependent on the photo-initiator dye and its concentration. A higher dye concentration leads to a higher sensitivity. In most cases, however, the solubility of the photo-initiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photo-initiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The co-initiator employed in the practice of the present invention controls the rate of curing in the free radical polymerization reaction of the prepolymer material. Optimum phase separation and, thus, optimum diffraction efficiency in the resulting PDLC material, is a function of curing rate. It has been found that favorable results can be achieved utilizing co-initiator in the range of 2–3% by weight. Suitable co-initiators include N-phenylglycine; triethyl amine; triethanolamine; N,N-dimethyl-2,6-diisopropyl aniline, and the like.

Other suitable dyes and dye co-initiator combinations that may be suitable for use in the present invention, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–5 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and an applied field of 6V/μm could electrically switch the resulting gratings.

PDLC materials used in the present invention may also be formed using a liquid crystalline bifunctional acrylate as the monomer ("LC monomer"). The LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2V/μm).

Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

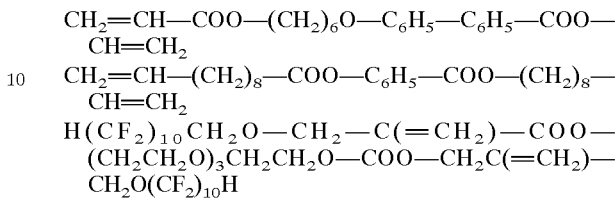

Semifluorinated polymers are known to show weaker anchoring properties and also significantly reduced switching fields. Thus, it is believed that semifluorinated acrylate monomers which are bifunctional and liquid crystalline may find suitable application in the present invention.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Varying the concentrations of photo-initiator, co-initiator and chain-extending (or cross-linking) agent can control liquid crystal domain size. The orientation of the nematic directors can be controlled while the gratings are being recorded by application of an external electric field across the ITO electrodes.

Figure 2:
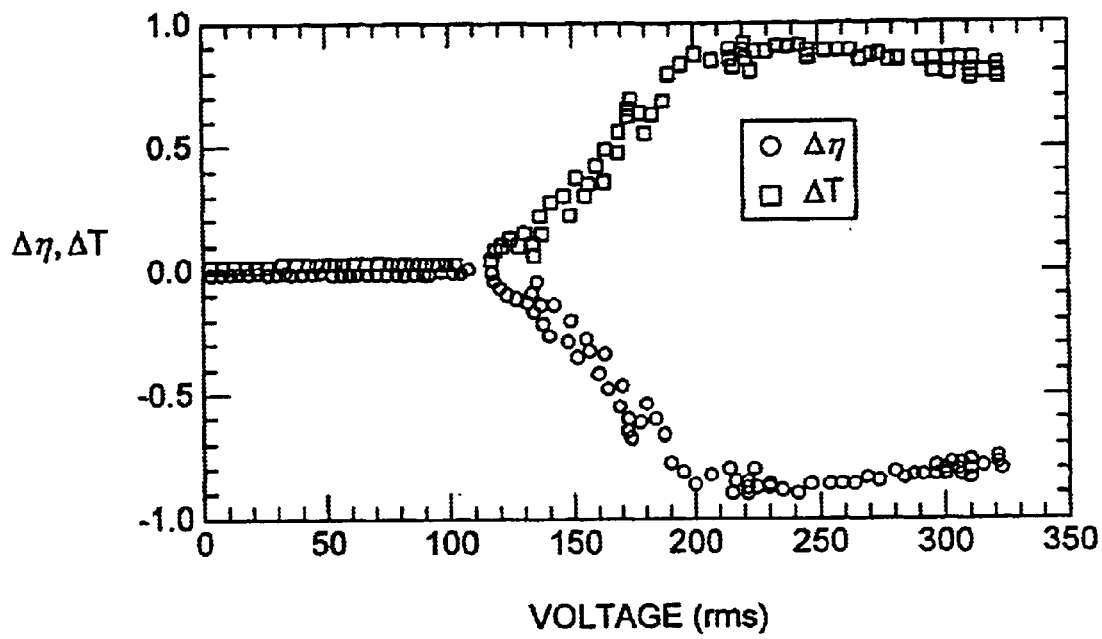
FIG. 2 is a graph of the normalized net transmittance and normalized net diffraction efficiency of a hologram made in accordance with the teachings of the description herein (without the addition of a surfactant) versus the rms voltage applied across the hologram.

The scanning electron micrograph shown in FIG. 2 of the referenced *Applied Physics Letters* article, and incorporated herein by reference, is of the surface of a grating which was recorded in a sample with a 36 wt % loading of liquid crystal using the 488 nm line of an argon ion laser at an intensity of 95 mW/cm$^2$. The size of the liquid crystal domains is about 0.2 μm and the grating spacing is about 0.54 μm. This sample, which is approximately 20 μm thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. Δη is the change in first order Bragg diffraction efficiency. ΔT is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
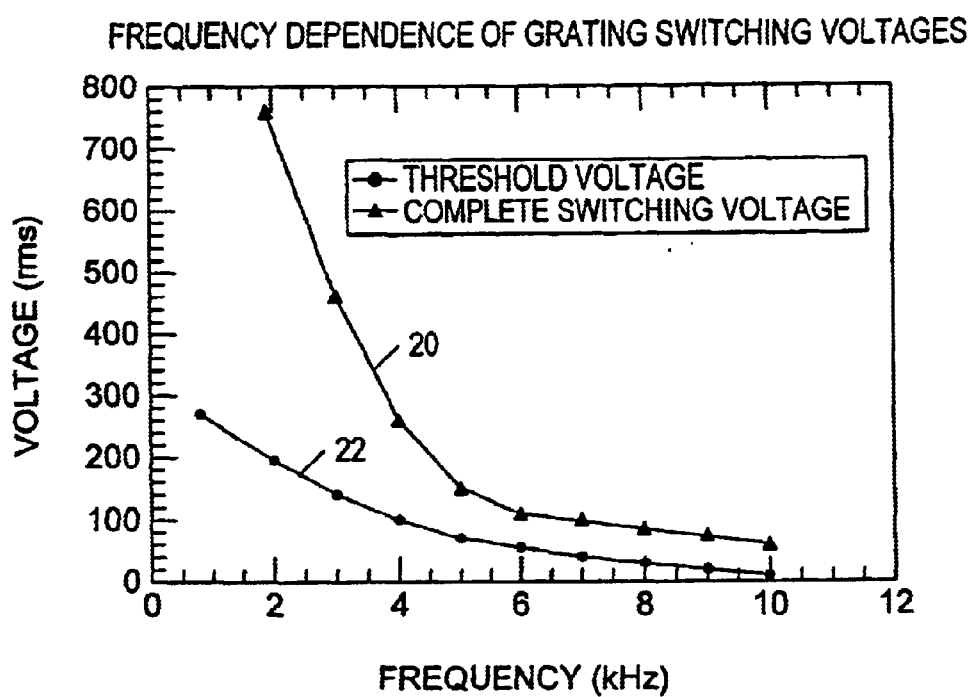
FIG. 3 is a graph of both the threshold and complete switching rms voltages needed for switching a hologram made in accordance with the teachings of the description herein to minimum diffraction efficiency versus the frequency of the rms voltage.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 4:
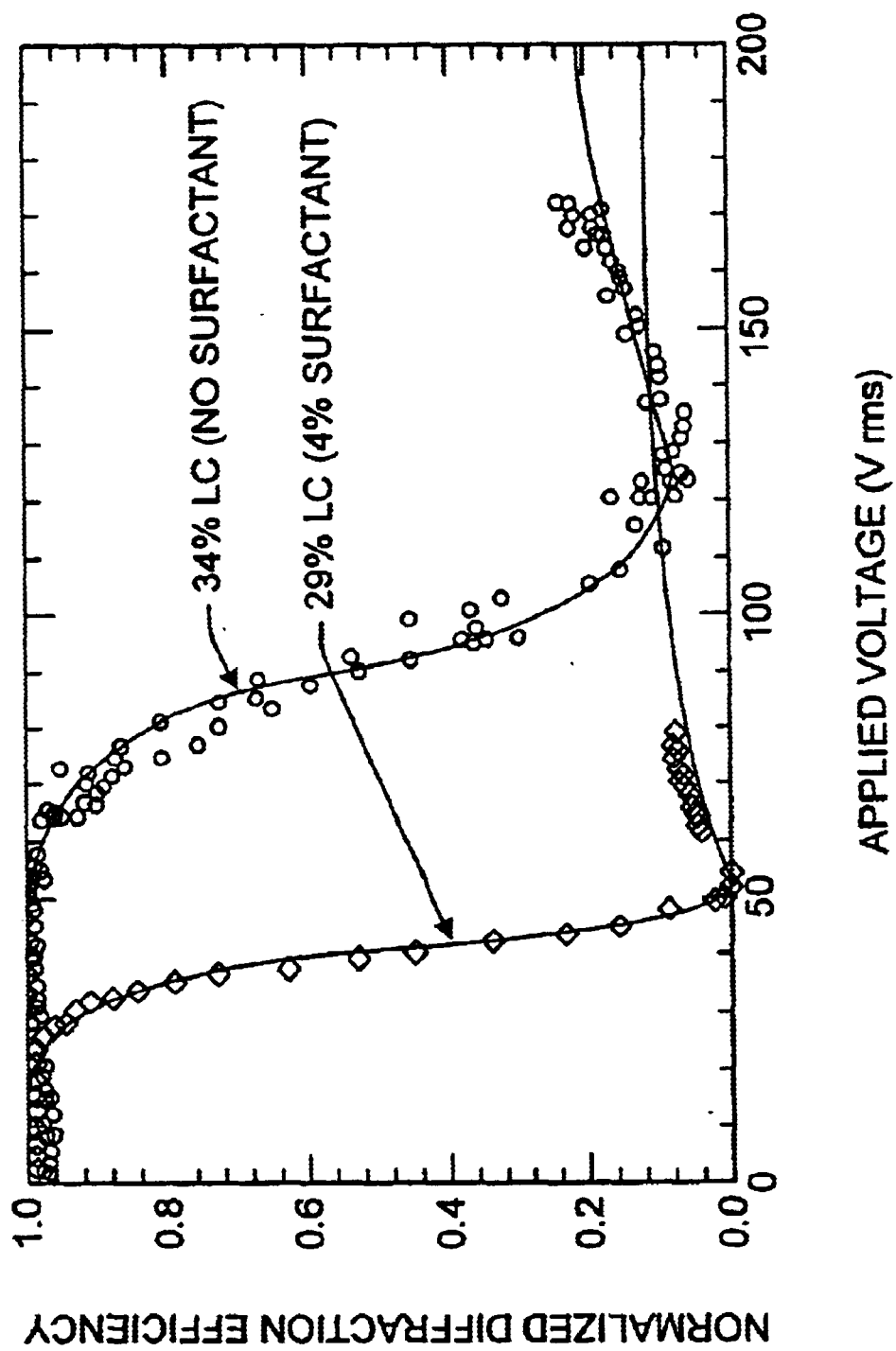
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.
Figure 5:
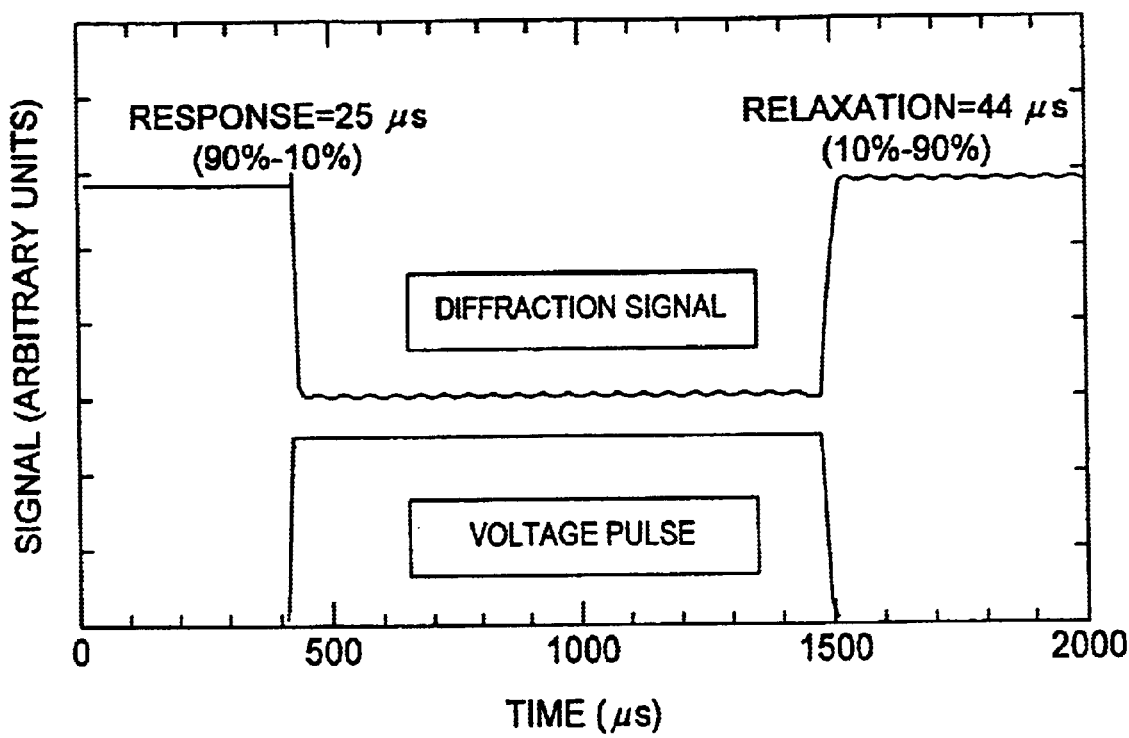
FIG. 5 is a graph showing the switching response time data for the diffracted beam in the surfactant-containing PDLC material in FIG. 4.
Figure 6:
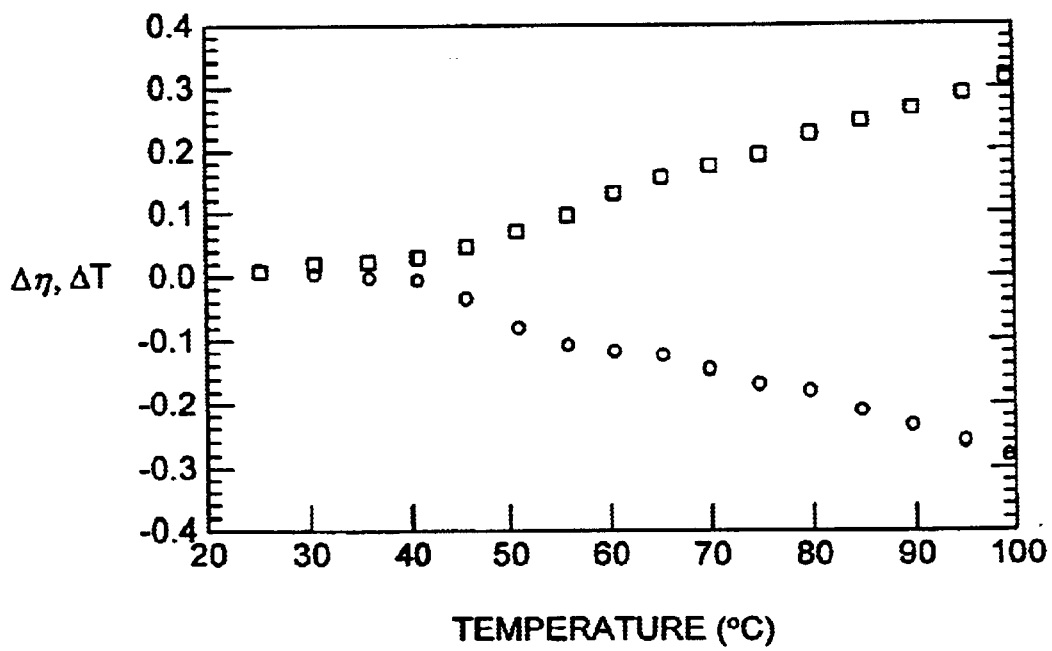
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
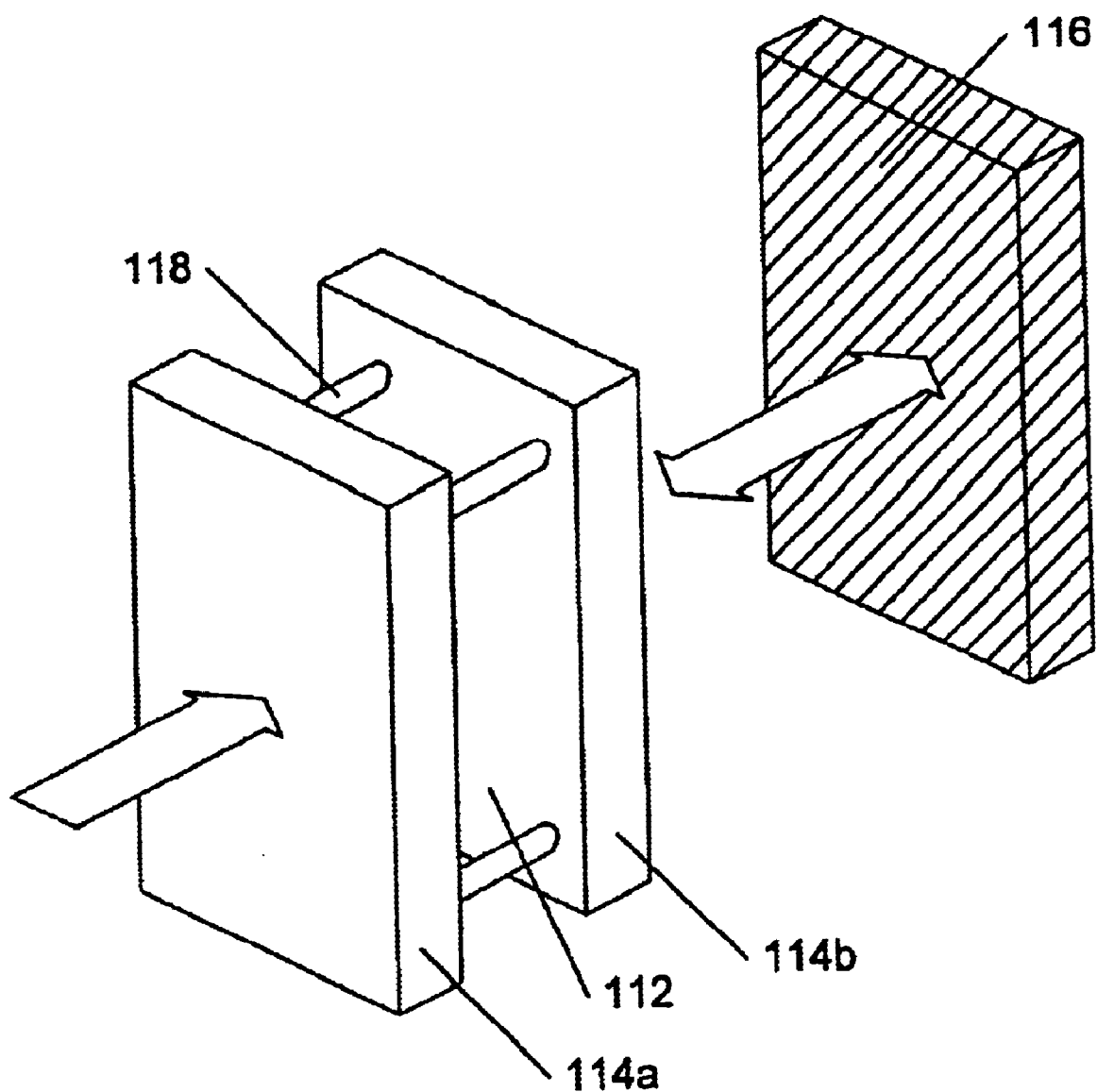
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 $\mu$m by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a co-initiator, and a photo-initiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the co-initiator N-phenylglycine ("NPG"), and $10^{-5}$ to $10^{-6}$ gram moles of a photo-initiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

Figure 8A:
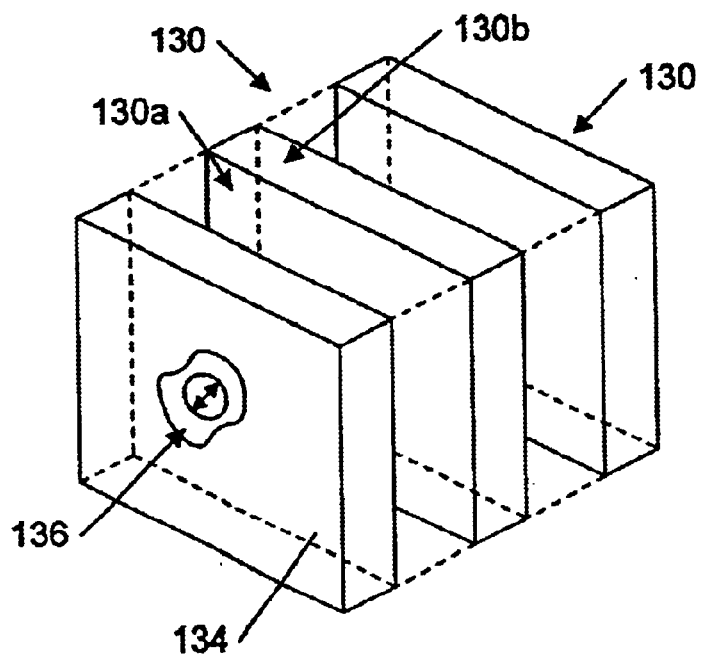
FIGS. 8a and 8b are elevational views of a reflection grating, made in accordance with the teachings of the description herein, having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b that run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other co-initiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, that the photo-initiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8B:
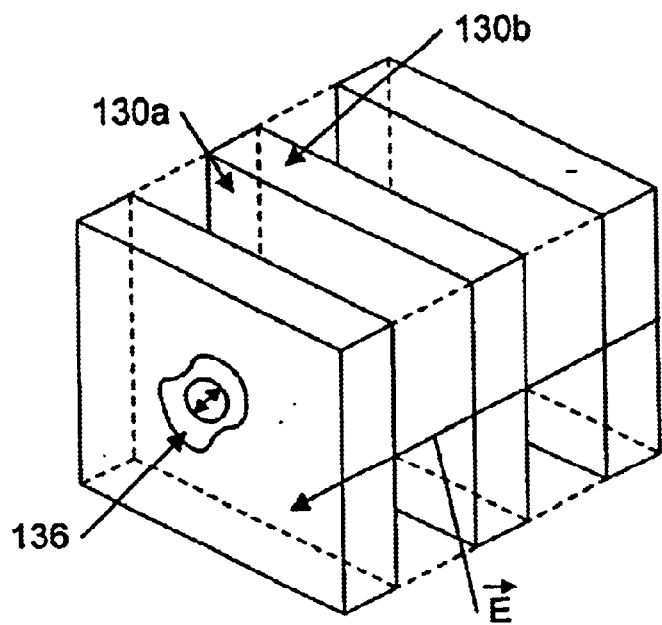

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low crossover frequency), an applied magnetic field, an applied shear stress field, or slanted gratings.

Figure 9A:
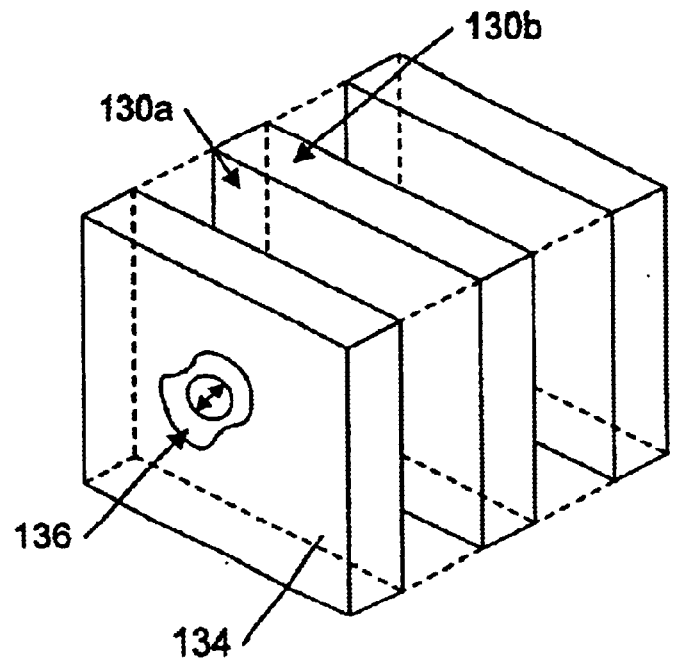
FIGS. 9a and 9b are elevational views of a reflection grating, made in accordance with the teachings of the description herein, having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9B:
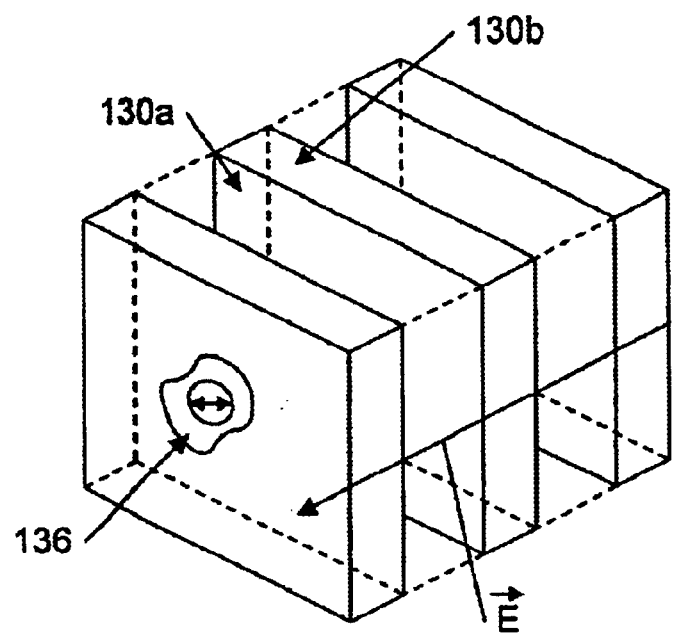

It is known that liquid crystals having a negative dielectric anisotropy ($\Delta\in$) will rotate in a direction perpendicular to an applied field. As shown in FIG. 9a, the symmetry axis 136 of the liquid crystal domains formed with a liquid crystal having a negative $\Delta\in$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\in$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\in$ liquid crystals and others are expected to find ready applications in the methods and devises of the present invention:

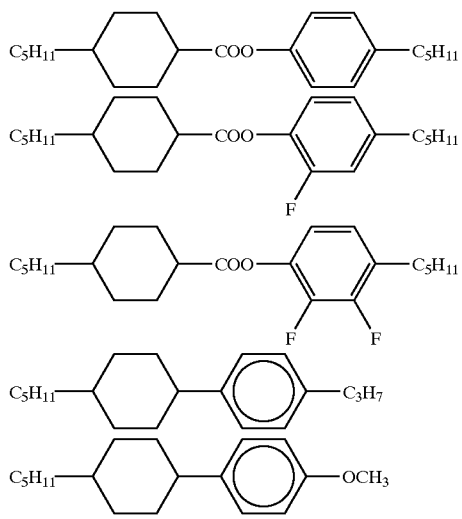

Liquid crystals can be found in nature (or synthesized) with either positive or negative $\Delta\in$. Thus, it is possible to use a LC that has a positive $\Delta\in$ at low frequencies, but becomes negative at high frequencies. The frequency (of the applied voltage) at which $\Delta\in$ changes sign is called the crossover frequency. The crossover frequency will vary with LC composition, and typical values range from 1–10 kHz. Thus, by operating at the proper frequency, the reflection grating may be switched. It is expected that low crossover frequency materials can be prepared from a combination of positive and negative dielectric anisotropy liquid crystals. A suitable positive dielectric liquid crystal for use in such a combination contains four ring esters as shown below:

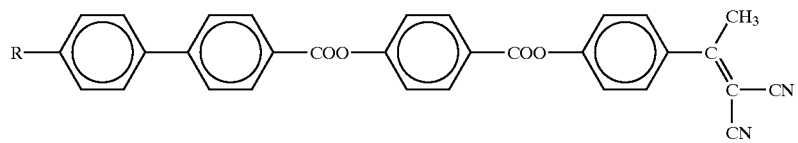

A strongly negative dielectric liquid crystal suitable for use in such a combination is made up of pyridazines as shown below:

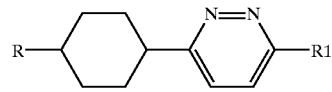

Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

In still more detailed aspects, switchable reflection gratings can be formed using positive $\Delta\in$ liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\in$ liquid crystal will reorient in the direction of the field, which is perpendicular to the front surface of grating and to the periodic channels of the grating.

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as non-slanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. A conventional beam splitter splits the incident laser beam into two beams that are directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam and the normal to the prism front face at which that beam enters the prism).

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
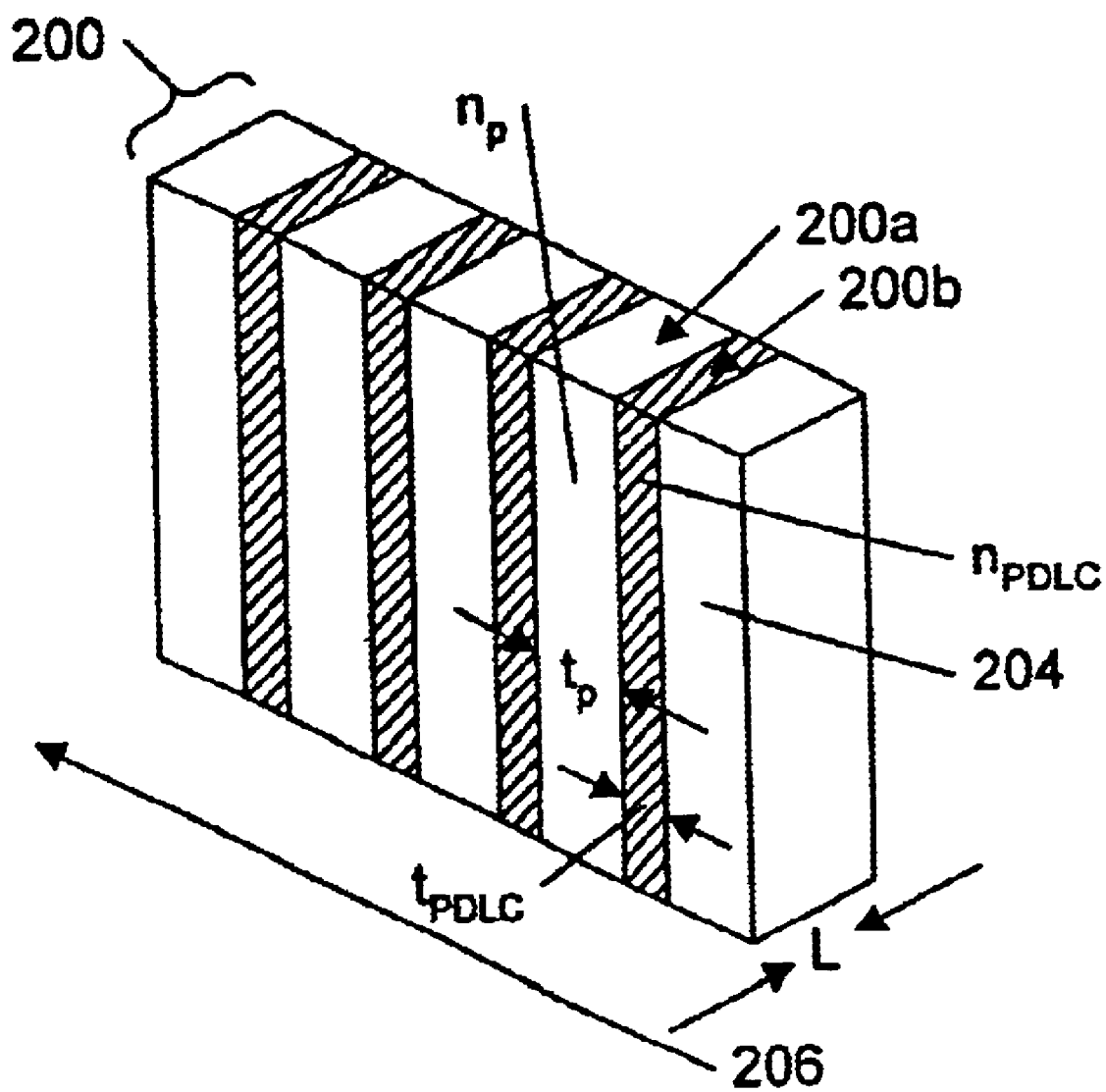
FIG. 13 is an elevational view of a subwavelength grating, made in accordance with the teachings of the description herein, having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e., retardance=$\lambda/2$, and to form a quarter-wave plate, the retardance must be equal to one-quarter of a wavelength, i.e., retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_o|L$$

Thus, for a half-wave plate, i.e. a retardation equal to one-half of a wavelength, the length of the subwavelength grating should be selected so that:

$$L=\lambda/(2|\Delta n|)$$

Similarly, for a quarter-wave plate, i.e., a retardation equal to one-quarter of a wavelength, the length of the subwavelength grating should be selected so that:

$$L=\lambda/(4|\Delta n|)$$

Figure 14A:
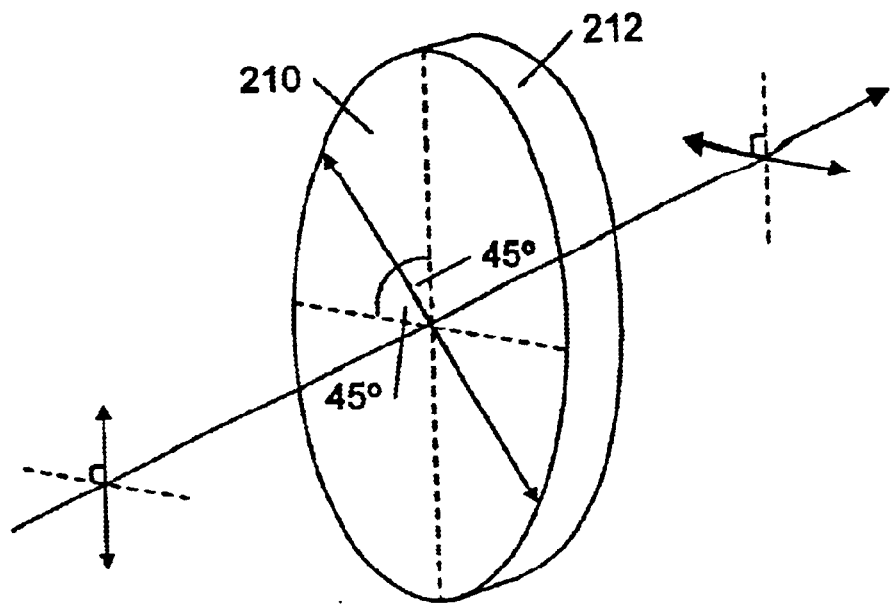
FIG. 14a is an elevational view of a switchable subwavelength, made in accordance with the teachings of the description herein, wherein the subwavelength grating functions as a half-wave plate whereby the polarization of the incident radiation is rotated by 90°.
Figure 14B:
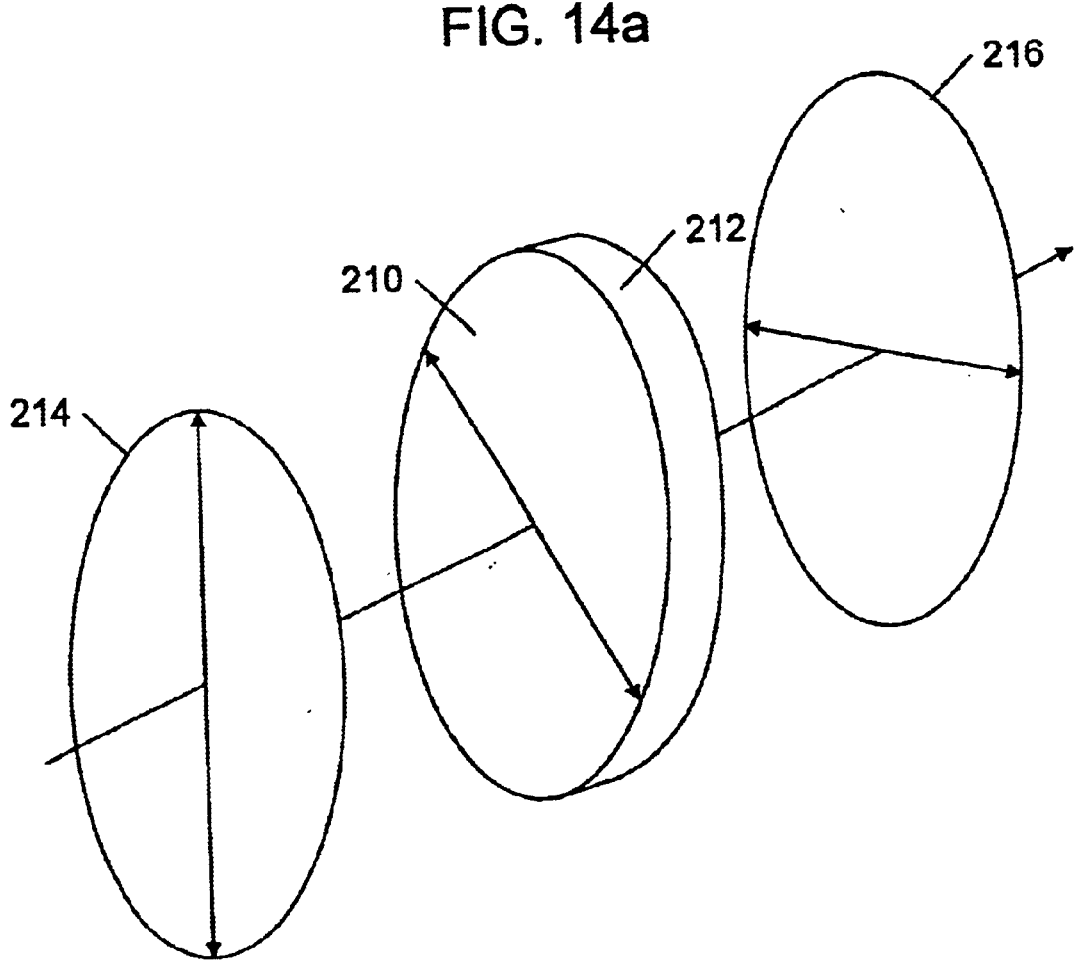
FIG. 14b is an elevational view of the switchable half-wave plate shown in FIG. 14a disposed between crossed polarizers whereby the incident light is transmitted.
Figure 14C:
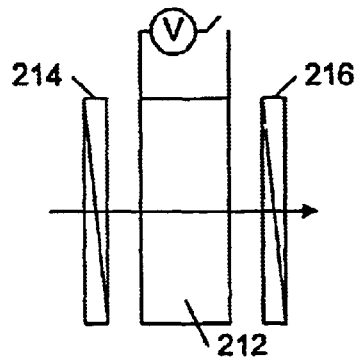
FIGS. 14c and 14d are side views of the switchable half-wave plate and crossed polarizes shown in FIG. 14b and showing the effect of the application of a voltage to the plate whereby the polarization of the light is no longer rotated and thus blocked by the second polarizer.
Figure 14D:
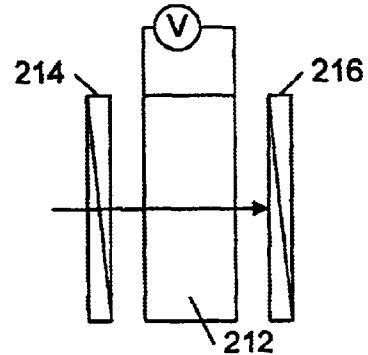

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b and 14c, where the half-wave plate 212 is placed between cross-polarizers 214 and 216, the incident-light will be transmitted. If an appropriate switching voltage is applied, as shown in FIG. 14d, the polarization of the light is not rotated and the second polarizer will block the light.

Figure 15A:
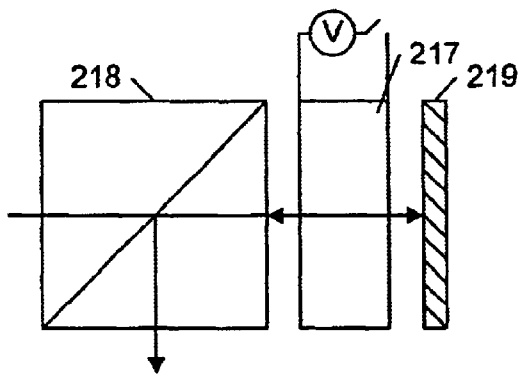
FIG. 15a is a side view of a switchable subwavelength grating, made in accordance with the teachings of the description herein, wherein the subwavelength grating functions as a quarter-wave plate whereby plane polarized light is transmitted through the subwavelength grating, retroreflected by a mirror and reflected by the beam splitter.
Figure 15B:
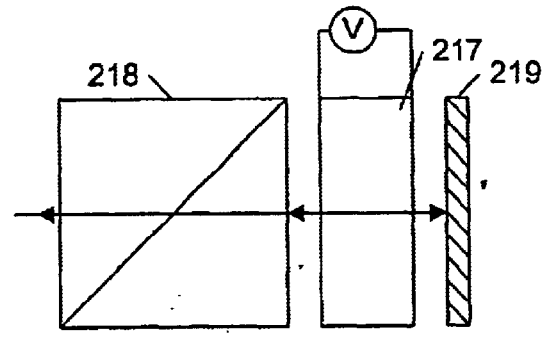
FIG. 15b is a side view of the switchable subwavelength grating of FIG. 15a and showing the effect of the application of a voltage to the plate whereby the polarization of the light is no longer modified, thereby permitting the reflected light to pass through the beam splitter.

For a quarter-wave plate plane polarized light is converted to circularly polarized light. Thus, referring now to FIG. 15a, where quarter-wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
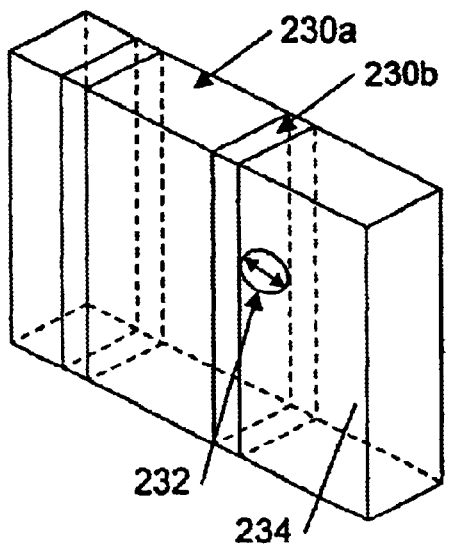
FIGS. 16a and 16b are elevational views of a transmission grating, made in accordance with the teachings of the description herein, having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
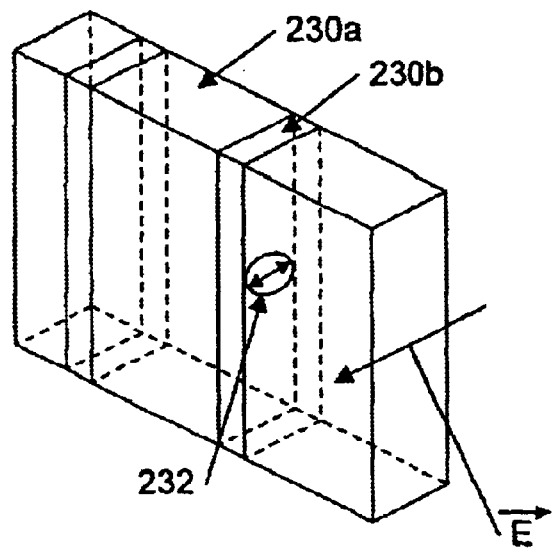

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating, and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating, and that this gradient causes the liquid crystal domain symmetry to orient in a direction perpendicular to the periodic planes.

As discussed in Born and Wolf, Principles of Optics, 5$^{th}$ Ed., New York (1975) and incorporated herein by reference, the birefringence of a subwavelength grating is given by the following relation:

$$n_e^2 - n_o^2 = -[(f_{PDLC})(f_p)(n_{PDLC}^2 - n_p^2)]/[f_{PDLC} n_{PDLC}^2 + f_p n_p^2]$$

Where:

$n_0$ = the ordinary index of refraction of the subwavelength grating;

$n_e$ = the extraordinary index of refraction;

$n_{PDLC}$ = the refractive index of the PDLC plane;

$n_p$ = the refractive index of the polymer plane $n_{LC}$ = the effective refractive index of the liquid crystal seen by an incident optical wave;

$f_{PDLD} = t_{PDLC}/(t_{PDLC} + t_P)$ $f_P = t_P/(t_{PDLC} + t_P)$

Thus, the net birefringence of the subwavelength grating will be zero if $n_{PDLC} = n_p$.

It is known that the effective refractive index of the liquid crystal, $n_{LC}$, is a function of the applied electric field, having a maximum when the field is zero and value equal to that of the polymer, $n_p$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{NDLC}$ is equal to $n_p$, i.e. when $n_{LC} = n_p$. Therefore, if the refractive index of the PDLC plane can be matched to the refractive index of the polymer plane, i.e. $n_{PDLC} = n_p$, by the application of an electric field, the birefringence of the subwavelength grating can be switched off.

The following equation for net birefringence, i.e. $|\Delta n| = |n_e - n_o|$, follows from the equation given in Born and Wolf (reproduced above):

$$\Delta n = -[(f_{PDLC})(f_p)(n_{NDLC}^2 - n_p^2)]/[2n_{AVG}(f_{PDLC} n_{PDLC}^2 + f_p n_p^2)]$$

where $n_{AVG} = (n_e + n_o)/2$.

Furthermore, it is known that the refractive index of the PDLC plane $n_{NDLC}$ is related to the effective refractive index of the liquid crystal seen by an incident optical wave, $n_{LC}$, and the refractive index of the surrounding polymer plane, $n_p$, by the following relation:

$$n_{PDLC} = n_p + f_{LC}[n_{LC} - n_p]$$

Where $f_{LC}$ is the volume fraction of liquid crystal dispersed in the polymer within the PDLC plane, $f_{LC} = [V_{LC}/(V_{LC} + V_P)]$.

By way of example, a typical value for the effective refractive index for the liquid crystal in the absence of an electric field is $n_{LC} = 1.7$, and for the polymer layer $n_p = 1.5$. For the grating where the thickness of the PDLC planes and the polymer planes are equal (i.e. $t_{PDLC} = t_P$, $f_{PDLC} = 0.5 = f_P$) and $f_{LC} = 0.35$, the net birefringence, Δn, of the subwavelength grating is approximately 0.008. Thus, where the incident light has a wavelength of 0.8 μm, the length of the subwavelength grating should be 50 μm for a half-wave plate and a 25 μm for a quarter-wave plate. Furthermore, by application of an electric field of approximately 5 V/μm, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
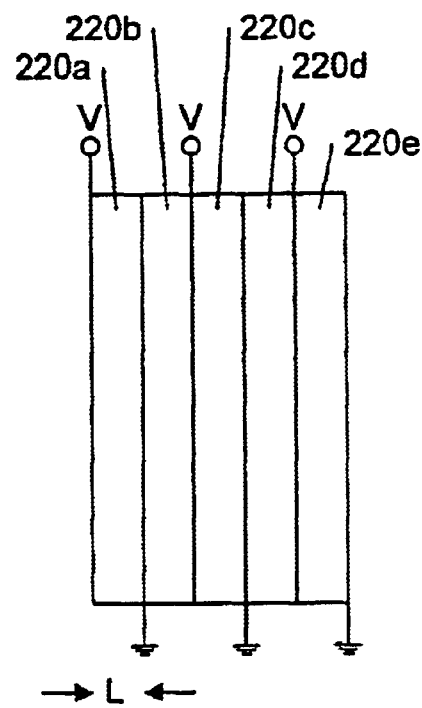
FIG. 17 is a side view of five subwavelength gratings wherein the gratings are stacked and connected electrically in parallel thereby reducing the switching voltage of the subwavelength grating.

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 μm yields the thickness required for a half-wave plate. It should be noted that the length of the sample is somewhat greater than 50 μm, because each grating includes an indium-tin-oxide coating that acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

A switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film (Δn~0.5) because the second phase domains are replaced with empty (air) voids (n~1).

Similarly, in accordance with this description a high birefringence static sub-wavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those skilled in the art will clearly understand that the use herein of the standard term used in the art, "polymer dispersed liquid crystals" (which grammatically refers to liquid crystals dispersed in a fully polymerized matrix) is meant to include all or part of a more grammatically correct prepolymer dispersed liquid crystal material, or a more grammatically correct starting material for a polymer dispersed liquid crystal material.

2. Solid State Optical Filter and Image Display System

Figure 18A:
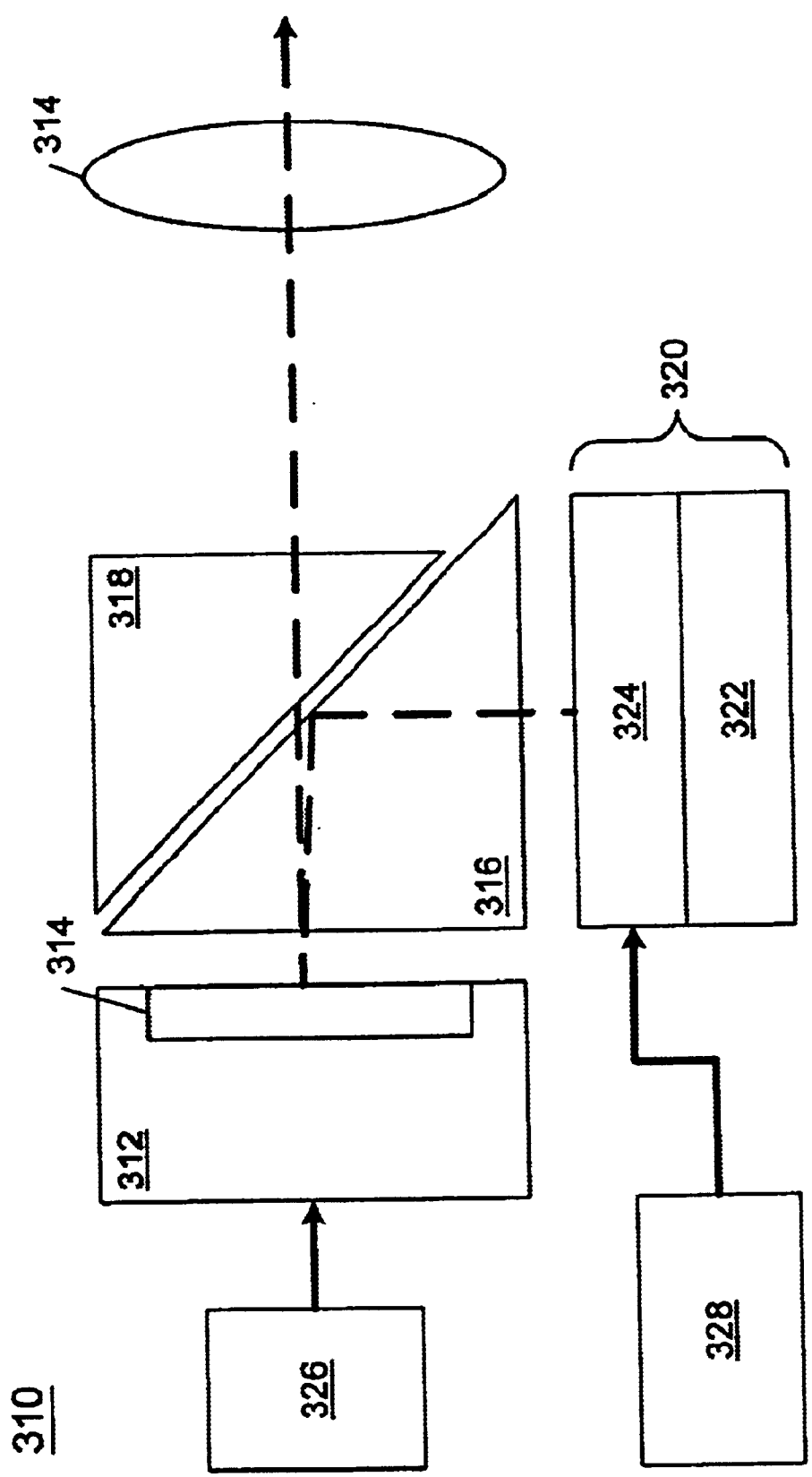
FIG. 18a is a block diagram of an image display system employing one embodiment of the present invention.
Figure 18B:
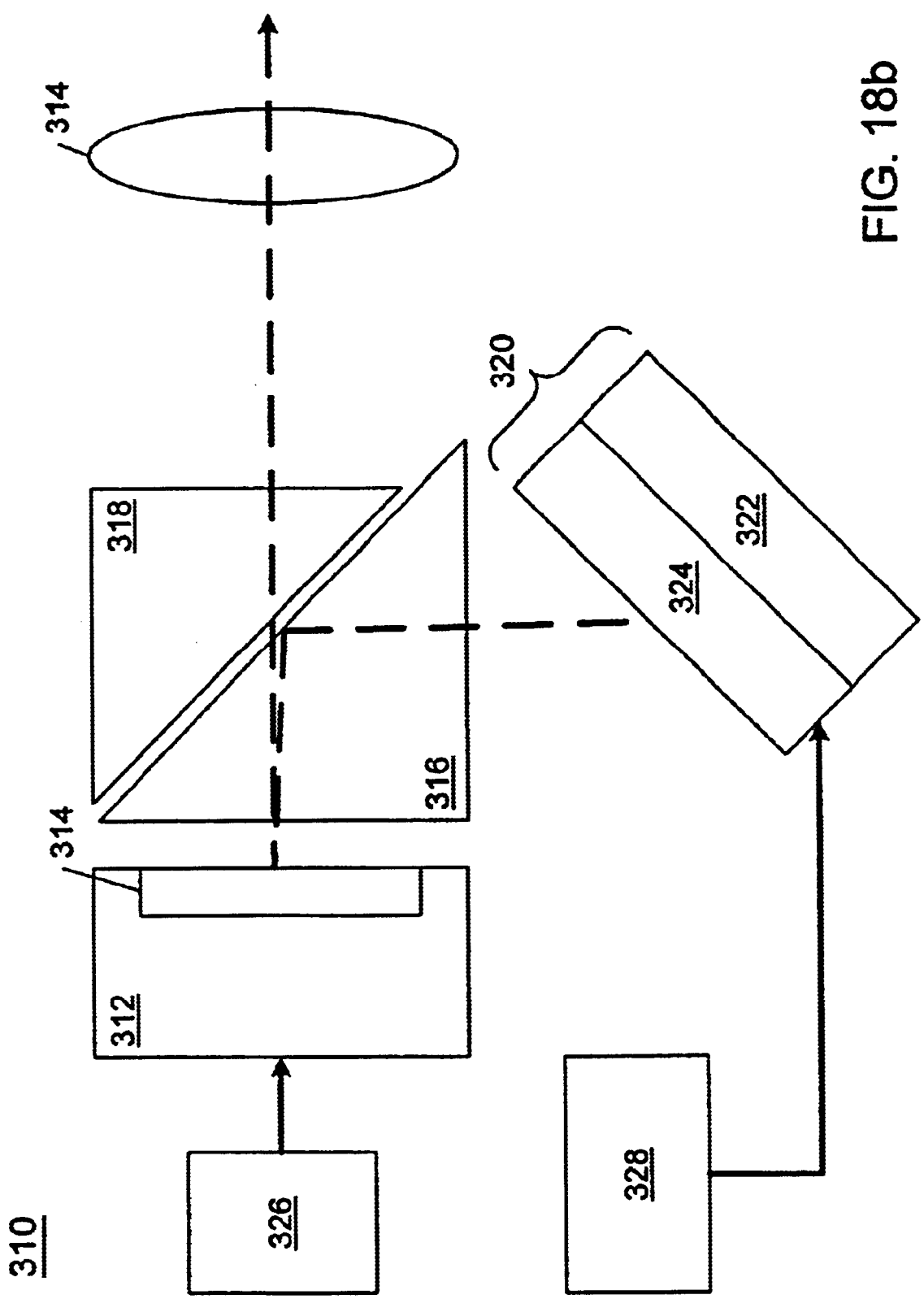
FIG. 18b is a block diagram of an image display system employing another embodiment of the present invention.
Figure 18C:
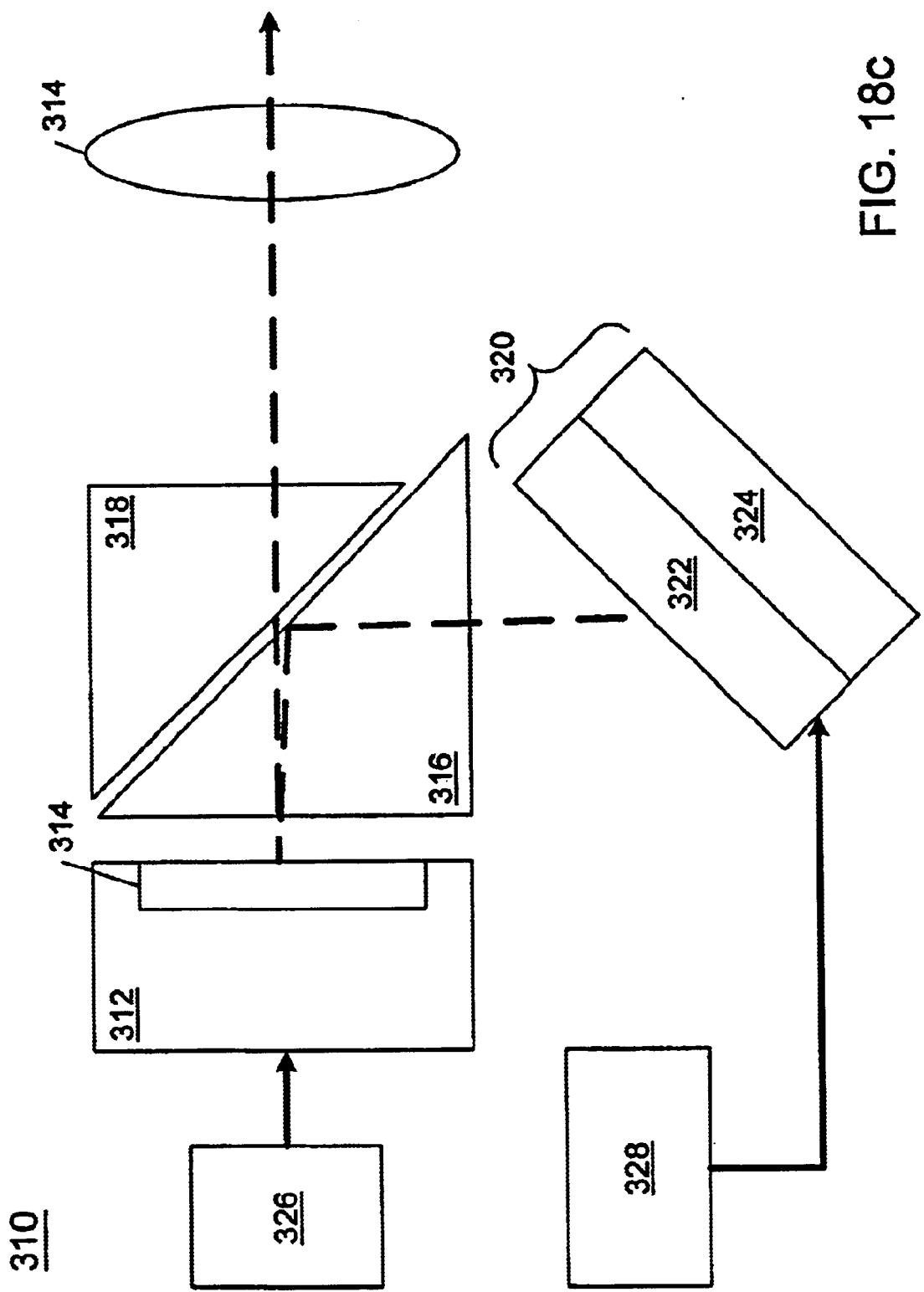
FIG. 18c is a block diagram of an image display system employing yet another embodiment of the present invention.

FIGS. 18a–18c show three distinct embodiments of an image display system 310 employing the present invention. Other embodiments are possible. Each figure includes an image display device 312 having an image display screen 314, a total internal reflection (TIR) prism 316, a transmissive prism 318, an illumination system 320 having a collimated light source 322 and either a transmissive or reflective-type solid-state optical filter 324, an image display control circuit 326, an optical filter control circuit 328, and an input aperture 330 to a projection lens (the projection lens not shown in FIGS. 18a–18c). Prism 318 is used for optical path balancing. That is, prism 318 ensures that the incident and reflected beams have identical optical path lengths in glass. FIGS. 18a–18c-show solid state optical filter 324 represented in cross section.

Collimated light source 322 generates randomly polarized, collimated white light. In this specification, white light is defined to include red, blue, and green bandwidth light components. Solid-state optical filter 324 operates in accordance with signals generated by optical filter control circuit 328, to sequentially and cyclically filter the collimated white light into red, blue, and green bandwidth components in a manner described below. Filtered light produced by optical filter 324 is then projected onto display screen 314 to illuminate a monochrome image displayed thereon via TIR prism 316. Illuminated images are projected back through TIR prism 316 for onward processing by viewing optics (not shown) via input aperture 330.

Image display device 312 receives frames of signals generated by image display control circuit 326. Each frame of signals is converted into a monochrome image frame for display on image display screen 314. Each displayed monochrome frame, in turn, is illuminated with one of the red, blue, and green bandwidths outputted by solid-state optical filter 324. The solid-state optical filter 324 filters collimated white light to produce, for example, red light which is projected onto display screen 314 when display screen 314 displays (in monochrome) what will be the red component of a final image. Additionally, solid-state optical filter 324 filters collimated white light to sequentially project green and blue light onto display screen 314 when display screen 314 displays (in monochrome), respectively, the green and blue components of the final image frame. If the three monochrome images are presented and illuminated quickly with red, blue, and green light, respectively, an observer will eye integrate the three illuminated images into a full-color final image.

Image display control circuit 326 controls the sequential presentation of the monochrome images on display screen 314, while optical filter control circuit 328 controls the sequential and cyclical color output of the solid-state optical filter 322. Although not shown in FIGS. 18a–18c, control circuits 326 and 328 may communicate with each other such that each of the displayed monochrome images is timely illuminated with the appropriate bandwidth light produced by solid-state optical filter 324.

Solid-state optical filter 324, in FIGS. 18a–18c, may be reflective or transmissive-type, as noted above. Further, as will be more fully described below, filtered light outputted by solid-state optical filter 324 may emerge therefrom at a variety of emergence angles as shown in FIGS. 18a–18c. Further, the positions of the collimated light source 322 and the solid-state optical filter 324 may be reversed with respect to each other, as shown in FIGS. 18a–18c.

Figure 19B:
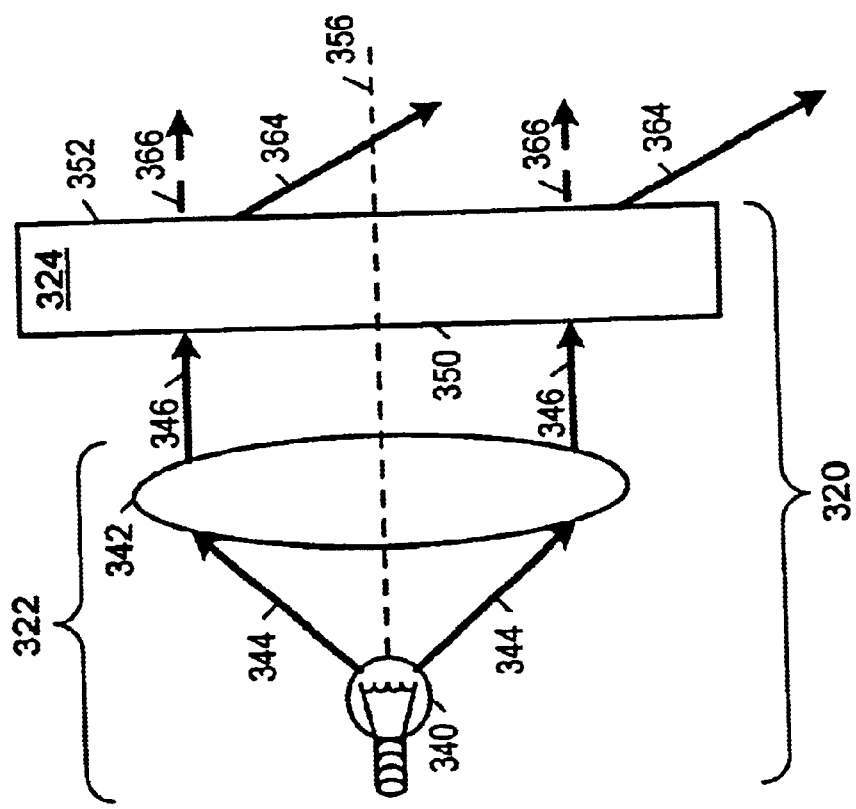
FIG. 19b is a diagram showing a collimated light source and a transmissive-type solid-state optical filter employing the present invention and operating in the additive mode.
Figure 19A:
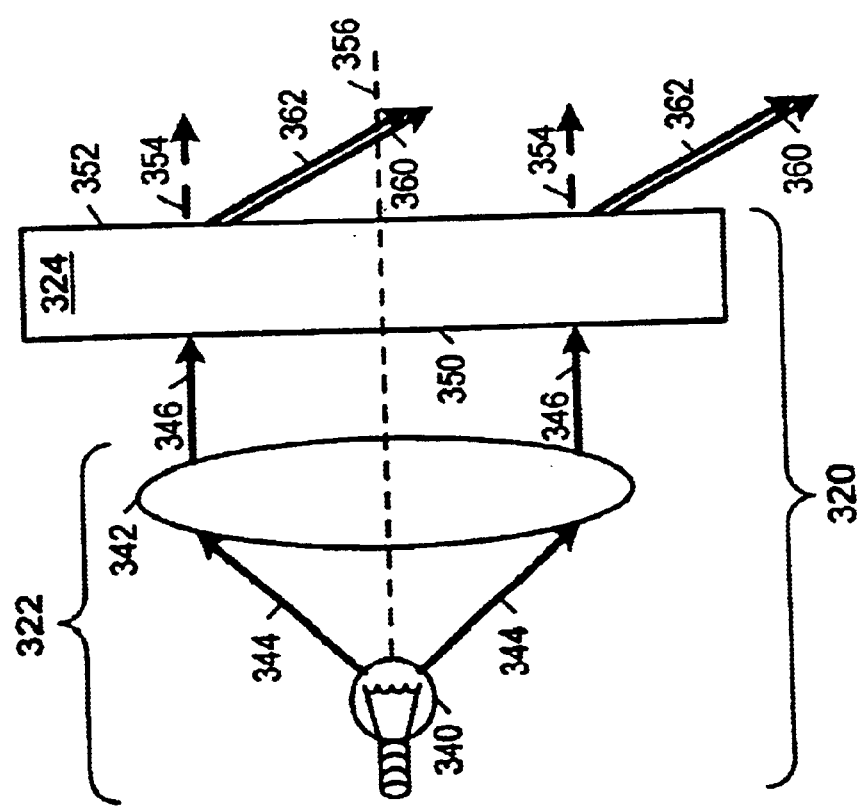
FIG. 19a is a diagram of a collimated light source and a transmissive-type solid-state optical filter employing the present invention and operating in the subtractive mode.

FIGS. 19a and 19b illustrate one embodiment of the illumination system 320 operating in a subtractive mode and an additive mode, respectively. The illumination systems in FIGS. 19a and 19b employ identical components operating in different modes. Common reference numbers will be used in FIGS. 19a and 19b to identify common components. The illumination system 320 shown in FIG. 19a may be employed in the image display system 310 shown in FIG. 18a, while the illumination system 320 shown in FIG. 19b may be employed in the image display system 310 shown in FIG. 18b.

Each of the illumination systems 320 shown in FIGS. 19a and 19b includes a transmissive-type solid-state optical filter 324, and collimated light source 322 which includes a white light source 340 and a condenser lens 342. White light source 340 generates randomly polarized white light 344, a portion of which is received by condenser lens 342. Condenser lens 342, in turn, translates the randomly polarized white light 344 into randomly polarized, parallel or collimated white light 346, which is subsequently received by solid-state optical filter 324 on a front surface 350 thereof.

As noted above, the solid-state optical filter 324 shown in FIG. 19a operates in the subtractive mode, while the solid-state optical filter shown in FIG. 19b operates in the additive mode. Each of the solid-state optical filters shown in FIGS. 19a and 19b operate in accordance with control signals provided by filter control circuit 328 (not shown in FIGS. 19a and 19b).

In the subtractive mode, the solid-state optical filter 324, shown in FIG. 19a, filters randomly polarized, collimated white light 346 using diffraction to produce illumination light 354 emerging from back surface 352 at a non-diffracted angle, and diffracted light 360 and 362 which also emerges from back surface 352 at a diffraction angle. Illumination light 354 is randomly polarized. Diffracted light 360 and 362 each include p-polarized and s-polarized light and will be more fully described below. In transmissive type holograms, the diffraction efficiency will be higher for p-polarized light. Typically the ratio of diffraction efficiencies for p-polarized and s-polarized light is P:S in the range 60:1 to 100:1.

The illumination light 354 constitutes one of the red, blue, or green bandwidth components of the collimated white light 346, while diffracted light 360 and 362 constitutes the remaining two bandwidth components of the collimated white light 346. The illumination light 354 is used to illuminate a monochrome image provided on display screen 314 shown in FIG. 18a, while diffracted light 360 and 362 is sent into free space and unused in illuminating display screen 314. Optical filter control circuit 328 controls solid-state optical filter 324 so that filter 324 sequentially and cyclically emits, for example, red, blue, and green illumination light 354.

The illumination system 320 shown in FIG. 19b operates in the additive mode in accordance with control signals generated by the optical filter control circuit 328. Solid-state optical filter 324 filters randomly polarized, collimated white light 346 using diffraction to produce illumination light 364 which emerges from back surface 352 at a diffracted angle, and non-diffracted light 366 which also emerges from back surface 352 at a non-diffracted angle. Non-diffracted light 366 is randomly polarized. Illumination light 364 includes p and s-polarized components and will be more fully described below. In transmissive type holograms, the diffraction efficiency will be higher for p-polarized light. Typically the ratio of diffraction efficiencies for p-polarized and s-polarized light is P:S in the range 60:1 to 100:1.

Illumination light 364 comprises one of the red, green, or blue bandwidth components of the collimated white light 346. Illumination light 364 is projected onto display screen 314 of FIG. 18b to illuminate a monochrome image displayed therein. Non-diffracted light 366 represents the remaining two bandwidths of the white collimated light 346. The non-diffracted light 366 is sent into free space, and is not used in illuminating the image display screen 314. Solid-state optical filter 324 sequentially and cyclically filters collimated white light 346 to emit, for example, red, blue, and green bandwidth illumination light 346 for illuminating consecutive monochrome images displayed on screen 314 shown in FIG. 18b.

Figure 20B:
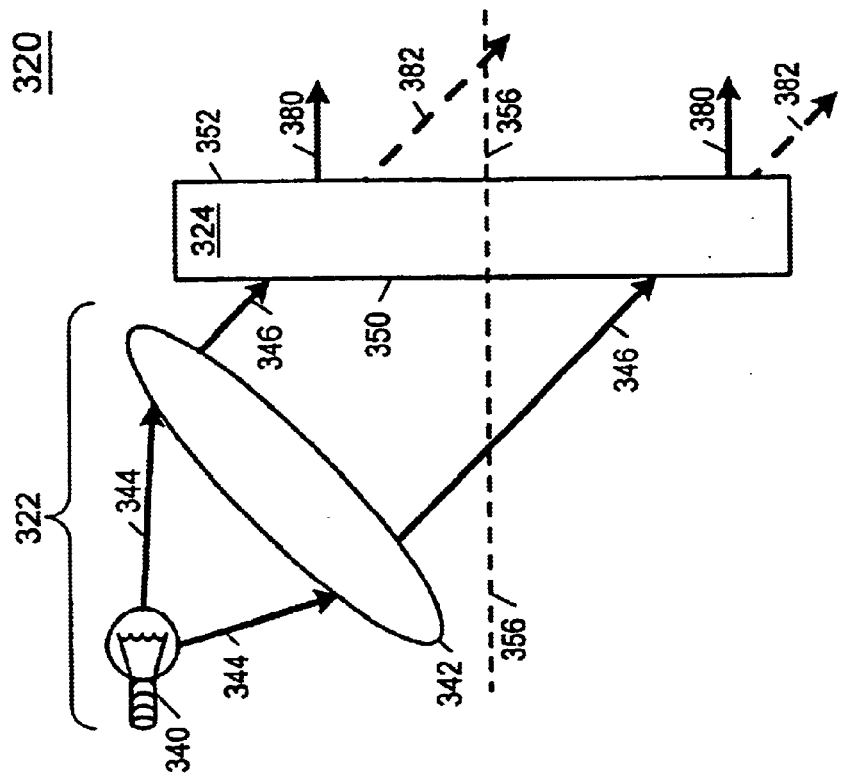
FIG. 20b is a diagram showing a collimated light source and a transmissive-type solid-state optical filter employing the present invention and operating in the additive mode.
Figure 20A:
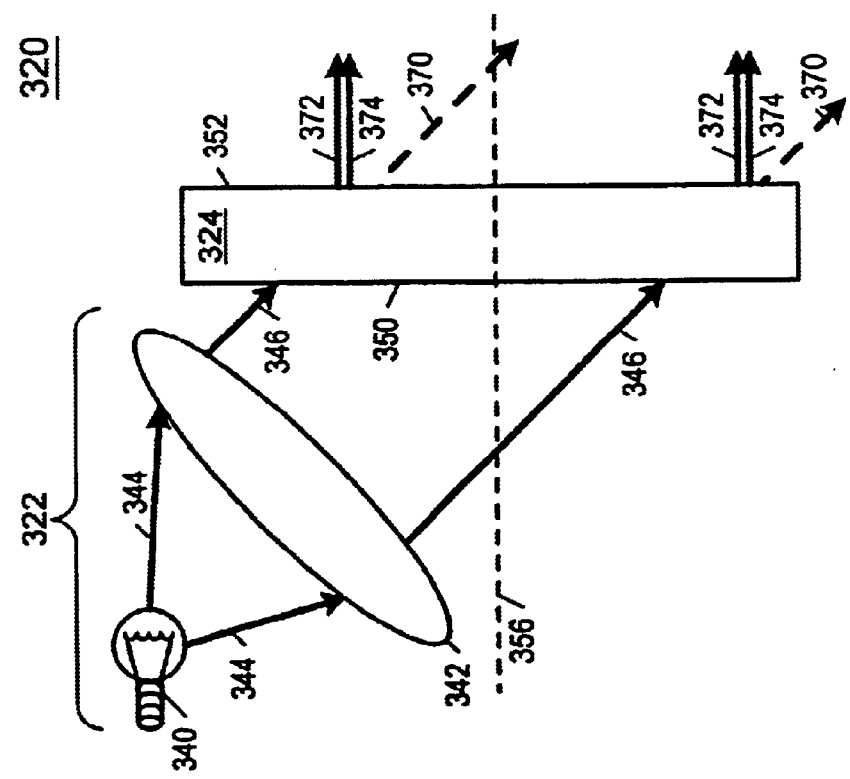
FIG. 20a is a diagram showing a collimated light source and a transmissive-type solid-state optical filter employing the present invention and operating in the subtractive mode.

FIGS. 20a and 20b illustrate another embodiment of the illumination system 320 operating in a subtractive mode and an additive mode, respectively. The illumination systems in FIGS. 20a and 20b employ identical components operating in different modes and common reference numbers will be used. Further, the illumination system 320 shown in FIGS. 20a and 20b share several common components with the illumination system shown in FIGS. 19a and 19b, and common reference numbers will be used. However, it is noted that the optical filter represented in FIGS. 19a and 19b is substantial different then that represented in FIGS. 20a and 20b. The Illumination system 320 shown in FIGS. 20a and 20b may find application in display systems of FIGS. 18a and 18b, respectively.

The illumination system 320 shown in FIG. 20a operates much like the illumination system 320 shown in FIG. 19a. In particular, FIG. 20a shows transmissive-type solid-state optical filter 324, operating in the subtractive mode in accordance with control signals issued by filter control circuit 328 (not shown in FIG. 20a). Collimated white light 346 is split into illumination light 370, which is emitted from back surface 352 at a non-diffracted angle, and diffracted light 372 and 374, which is also emitted from back surface 352 at a diffraction angle. Illumination light 370 is randomly polarized. Diffracted lights 372 and 374 each include p-polarized and s-polarized light and will be more fully described below. In transmissive type holograms, the diffraction efficiency will be higher for p-polarized light. Typically the ratio of diffraction efficiencies for p-polarized and s-polarized light is P:S in the range 60:1 to 100:1.

The illumination light 370 constitutes one of the red, blue, or green bandwidth components of the collimated white light 346, while the diffracted light 372 and 374 constitutes the remaining two components of the collimated white light 346. Illumination light 370 is projected onto the display screen 314 (not shown in FIG. 20a) to illuminate a monochrome image displayed thereon. Diffracted light 372 and 374 enters free space, and is not used to illuminate the display screen. Solid-state optical filter 324 is operated to sequentially and cyclically produce, for example, red, blue, and green illumination light in accordance with control signals provided by optical filter control circuit 328.

FIG. 20b shows the illumination system 320 of FIG. 20a operating in the additive mode. The illumination system 320 shown in FIG. 20b operates substantially similar to the illumination system 320 shown in FIG. 19b. Solid-state optical filter 324, operating in accordance with control signals generated by optical filter control circuit 328, filters collimated white light 346 using diffraction to produce illumination light 380 and non-diffracted light 382. The illumination light 380 emerges from the back surface 352 of filter 324 at a diffraction angle, while the non-diffracted light 382 emerges from the back surface 352 at a non-diffracted angle. Non-diffracted light 382 is randomly polarized. Illumination light 380 includes p and s-polarized illumination light and will be more fully described below. In transmissive type holograms, the diffraction efficiency will be higher for p-polarized light. Typically the ratio of diffraction efficiencies for p-polarized and s-polarized light is P:S in the range 60:1 to 100:1.

The illumination light 380 constitutes one of the red, blue, and green bandwidth components of the collimated white light 346. Illumination light 380 is projected onto display screen 314 to illuminate a monochrome image thereon. Non-diffracted light 382 constitutes the remaining two bandwidth components of collimated white light 346. Non-diffracted light enters free space, and is not used to illuminate display screen 314. Solid-state optical filter 324, operating in accordance with control signals generated by filter control circuit 328, sequentially and cyclically produces, for example, red, blue, and green bandwidth illumination light 380.

Comparing FIGS. 20a and 20b to FIGS. 19a and 19b, it is seen that collimated light source 322 is positioned at an angle relative to the solid-state optical filter 324. Because of spatial constraints in the image display system in which the illumination system 320 is used, it is often necessary to position collimated light source 322 to one side of optical filter 324. As a result, collimated white light 346 from collimated light source 322 is received by the front surface 350 of optical filter 324 at a non-zero-degree angle measured with respect to optical axis 356 normal to front and back surfaces 350 and 352, respectively. This angle can be decreased by positioning a prism at the front surface 350 of the solid-state optical filter 324, such that collimated white light is incident thereon from a medium having a greater refractive index than air.

Figure 21B:
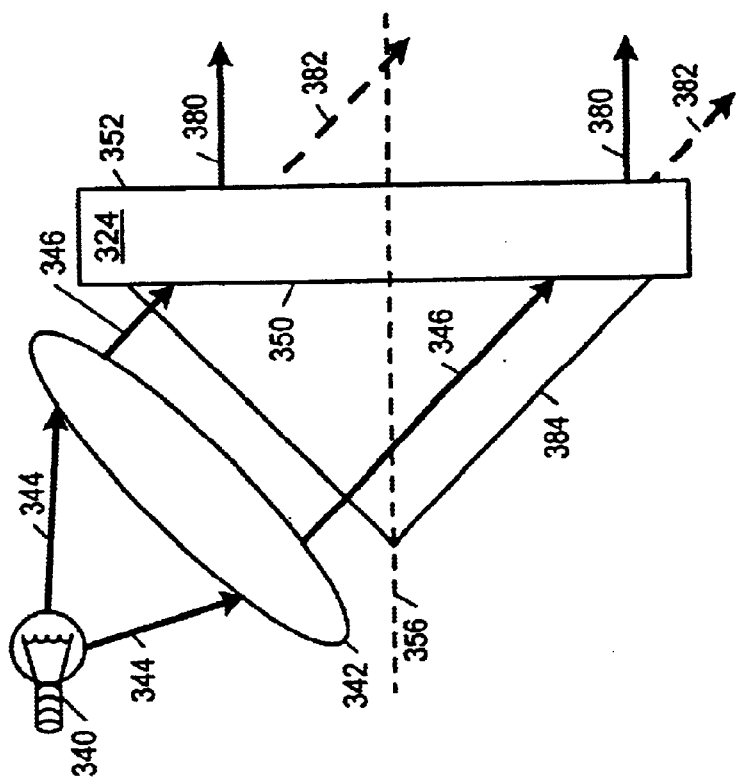
FIG. 21b is a diagram illustrating a collimated light source and a transmissive-type solid-state optical filter employing the present invention and operating in the additive mode.
Figure 21A:
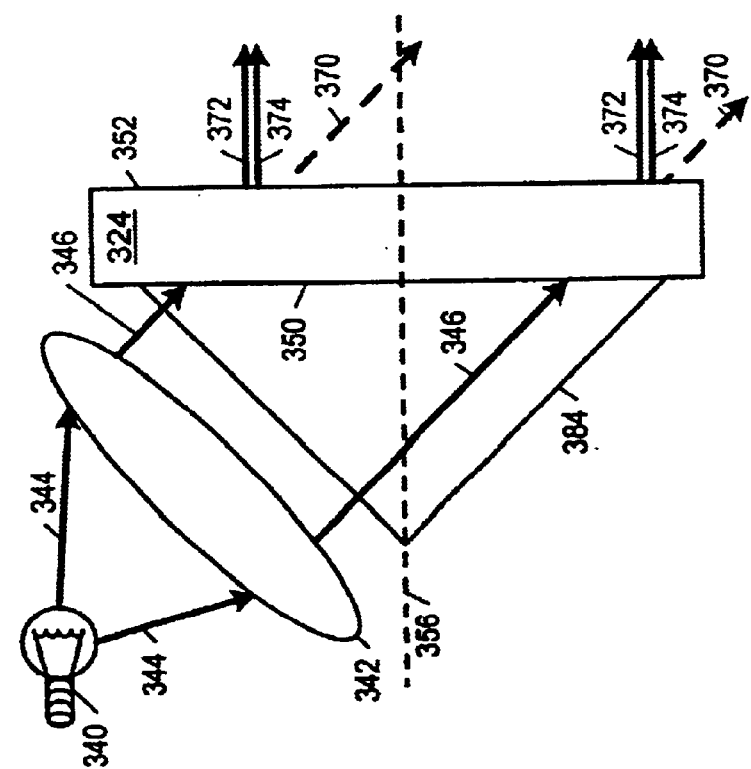
FIG. 21a is a diagram illustrating a collimated light source and a transmissive-type solid-state optical filter employing the present invention and operating in the subtractive mode.

FIGS. 21a and 21b illustrate the illumination system 320 shown in FIGS. 20a and 20b, respectively, in addition to a prism 382 positioned between condenser lens 342 and solid-state optical filter 324. The illumination systems shown in FIGS. 21a and 21b operate substantially similar to that shown in FIGS. 19a and 19b.

As will be described below, the solid-state optical filter 324 in one embodiment may comprise one or more electrically switchable Bragg (also known as volume phase) holograms. The above mentioned prism allows incident light to be received on the front surface of the switchable hologram at a Bragg angle thereby avoiding an extremely steep incident angle in air. The incident angle of the collimated white light can be reduced to 450 measured with respect to the optical axis 356. Assuming the refractive index of the prism and the particular elements of the electrically switchable hologram are the same, the 45° incident angle may represent the Bragg angle. Without a prism, the collimated white light may be required to have an incident angle of approximately 70° due to the refractive index of air and the particular elements of the switchable hologram. Unfortunately, the electrically switchable hologram is very lossy if the collimated white light is incident at a 70° angle. The loses arise due to the high reflection coefficient (arising from refractive index step changes) at the air/glass substrate interface and the glass substrate/switching electrode layer interface, for large angles of incidence.

Figure 22A:
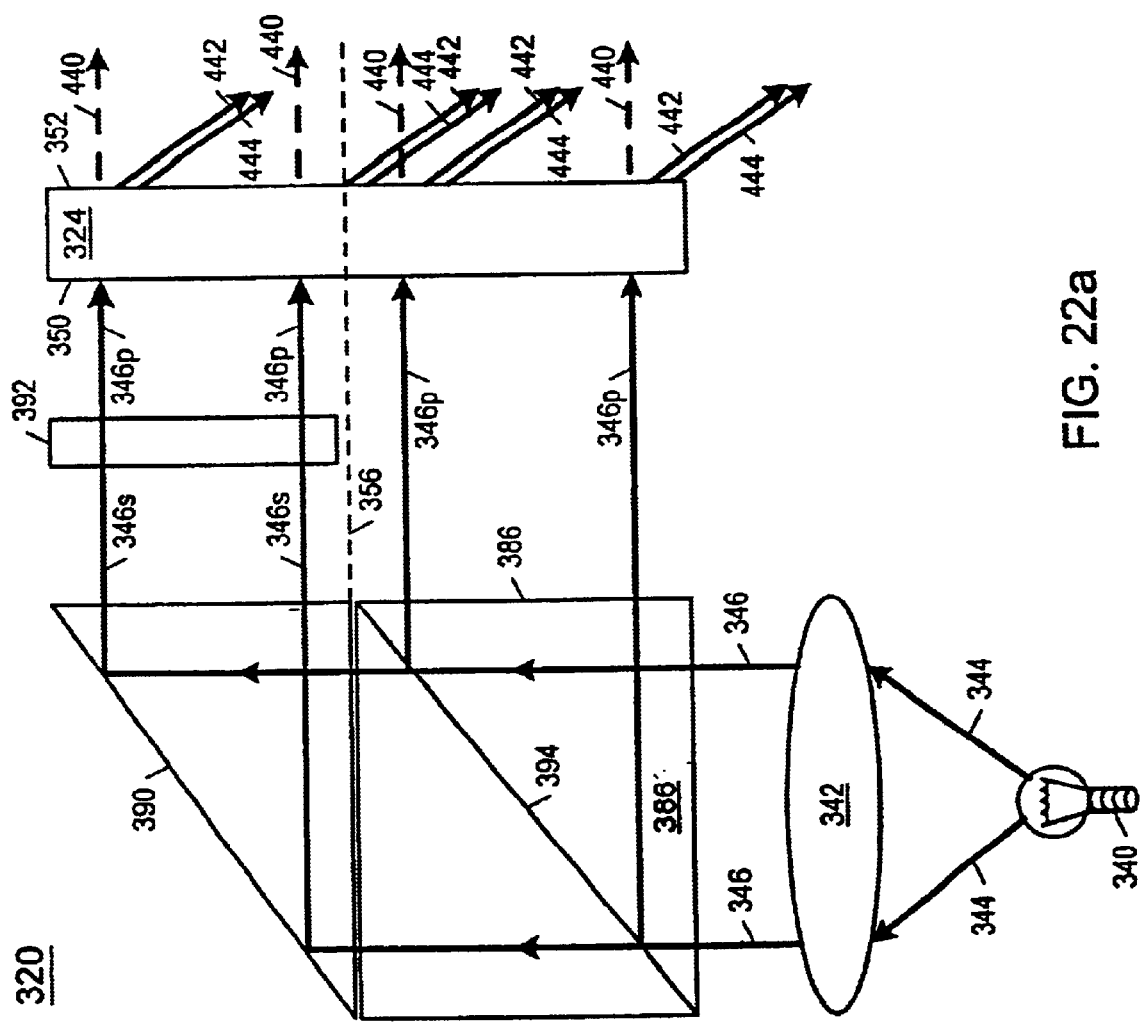
FIG. 22a is a diagram illustrating a collimated light source and a transmissive-type solid-state optical filter employing the present invention and operating in the subtractive mode.
Figure 22B:
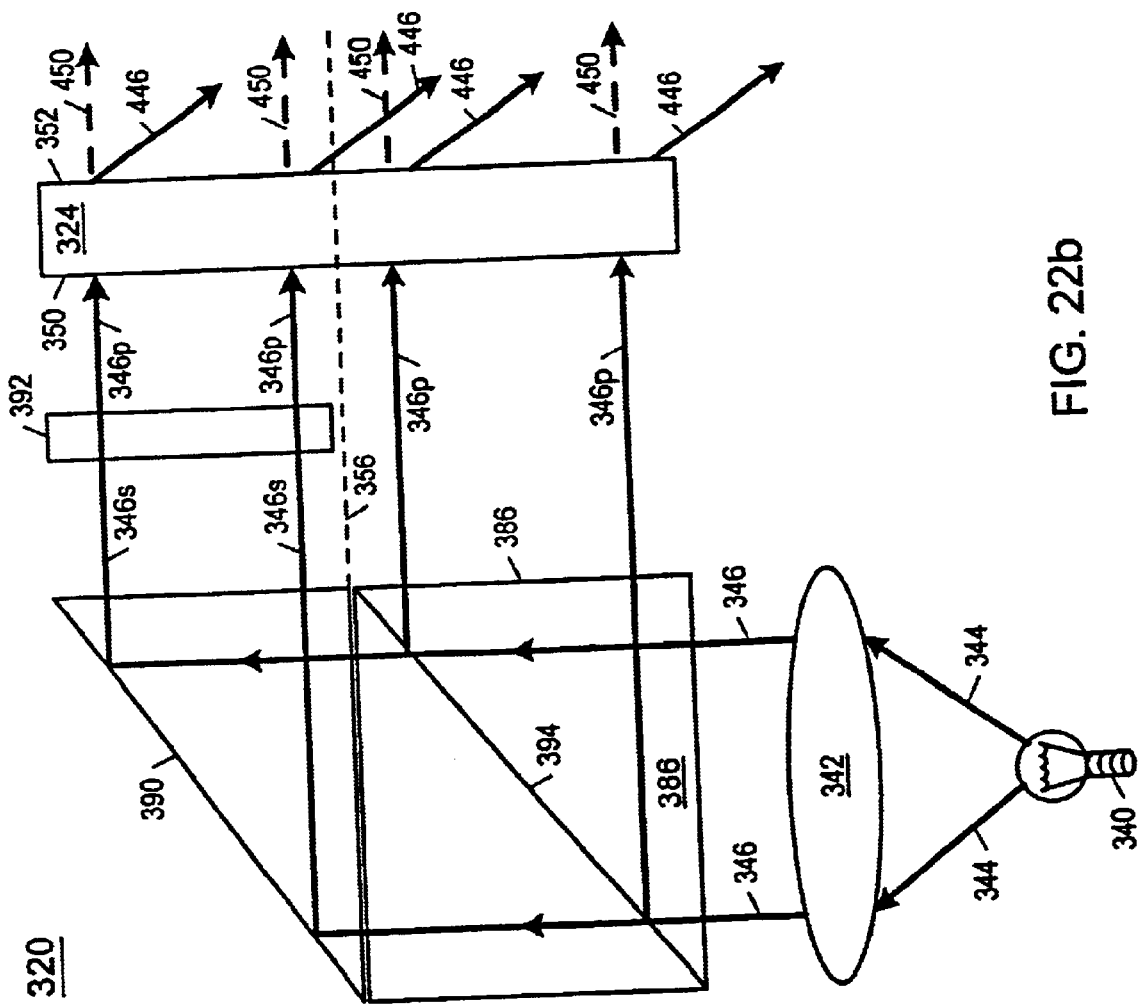
FIG. 22b is a diagram illustrating a collimated light source and a transmissive-type solid-state optical filter employing the present invention and operating in the additive mode.

FIGS. 22a and 22b show alternative embodiments of illumination system 320 that can be used in the image display systems shown in FIGS. 18a and 18b, respectively. The illumination systems 320 shown in FIGS. 22a and 22b are substantially similar in structure, each being controlled by optical filter control circuit 328 (not shown in FIGS. 22a or 22b). Common reference numbers will be used to identify like components in FIGS. 22a and 22b. Further, common reference numbers will be used to identify like components in FIGS. 19a–22a. However, it is noted that the optical filter 324 of FIGS. 22a and 22b is substantially different than that shown in FIGS. 19a–21b.

Although the illumination system 320 shown in FIGS. 22a and 22b employ identical components, they are different in their mode of operation. Whereas FIG. 22a shows and illumination system 320 operating in the subtractive mode, FIG. 22b shows an illumination system 320 operating in the additive mode.

FIG. 22a shows a white light source 340, condenser lens 342, a transmissive-type solid-state optical filter 324, in addition to a beamsplitter cube 386, a total internal reflecting (TIR) prism 390, and a polarization rotation device (polarization rotator which is essentially a half wave plate) 392. In FIG. 22a, randomly polarized white light from light source 340 is condensed by condenser lens 342 into collimated, randomly polarized white light 346. This light, however, falls incident upon beamsplitting cube 386 having a beamsplitting surface 394 which deflects the p-polarized component 346p of the collimated white light 346 onto the front surface 350 of filter 324. On the other hand, the s-polarized component 346s of the collimated white light 346 passes through beamsplitter cube 386, and is deflected by TIR prism 390. The deflected s-polarized light 346s then passes through polarization rotation device 392, which rotates the plane of polarization through 90°, and falls incident on the front surface 350 of optical filter 324 as p-polarized light 346p. The p-polarized light 346p emitted from polarization rotator 392 falls incident on the front surface 350 of solid-state optical filter 324.

Solid-state optical filter 324, operating in accordance with control signals provided by filter control circuit 328, filters all the p-polarized collimated light 346p (i.e., p-polarized light 346p from beam splitting surface 394 and from rotator 392) using diffraction to produce p-polarized illumination light 440, and, p-polarized diffracted light 442 and 444. The p-polarized illumination light 440 emerges from the back surface 352 of solid-state optical filter 324 at a non-diffracted angle, while, p-polarized diffracted light 442 and 444 emerges from the back surface 352 of solid-state optical filter 324 at diffracted angle. The illumination light 440 is projected onto the display screen 314 (not shown in FIG. 22a) to illuminate a monochrome image presented thereon. The diffracted light 442 and 444 enters free space, and is not used for illuminating the display screen 314.

Filter control circuit 328 controls solid-state optical filter 324 so that p-polarized illumination light 440 constitutes one of the red, blue, or green bandwidths of the p-polarized collimated white light 346p incident on the front surface 350. The diffracted light 442 and 444 constitutes the two remaining bandwidths of the p-polarized collimated light 346p. Further, control circuit 328 controls optical filter 324 to cyclically and sequentially produce, for example, red, blue, and green bandwidth p-polarized illumination 440.

FIG. 22b shows the illumination system 320 of FIG. 22a operating in the additive mode. Again, common components in FIGS. 22a and 22b will be identified with like reference numbers. Randomly polarized white light from light source 340 is condensed by condenser lens 342 into collimated, randomly polarized white light 346. This light falls incident upon beamsplitting cube 386 having a beamsplitting surface 394 which deflects the p-polarized component 346p of the collimated white light 346 onto the front surface 350 of filter 324. On the other hand, the s-polarized component 346s of the collimated white light 346 passes through beamsplitter cube 386, and is deflected by TIR prism 390. The deflected s-polarized light 346s then passes through polarization rotation device 392, which rotates the plane of polarization through 90°, and falls incident on the front surface 350 of optical filter 324 as p-polarized light 346p. The p-polarized light 346p emitted from polarization rotator 392 falls incident on the front surface 350 of solid-state optical filter 324.

Transmissive-type solid-state optical filter 324 receives p-polarized, collimated white light 346p from the rotator 392 and the beam splitting surface 394 at the front surface 350. Solid-state optical filter 324 filters the p-polarized light 346p using diffraction to produce p-polarized illumination light 446 and non-diffracted p-polarized light 450. Illumination light 446 emerges from the back surface 352 at a diffraction angle, while non-diffracted light 450 emerges from back surface 352 at a non-diffracted angle. Illumination light 446 is projected onto image display screen 314 (not shown in FIG. 22b) to illuminate a monochrome image presented thereon, while non-diffracted light 450 enters into free space, and is not used for illuminating the monochrome image. Filter control circuit 328 (not shown in FIG. 22b) controls solid-state optical filter 324 so that p-polarized illumination light 446 constitutes one of the red, blue, or green bandwidths of the p-polarized collimated light 346p, while the non-diffracted light 450 constitutes the remaining two bandwidths. Further, optical filter 324 is controlled by control circuit 328 to cyclically and sequentially produce, for example, red, blue, and green bandwidth p-polarized illumination light 450.

Figure 23B:
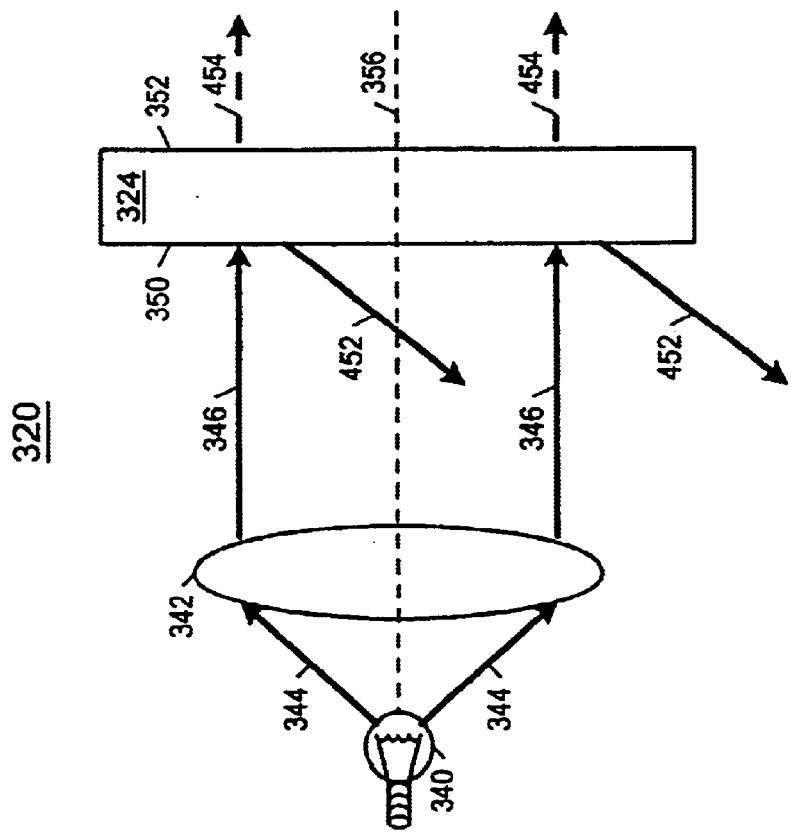
FIG. 23b is a diagram illustrating a collimated light source and a reflective-type solid-state optical filter employing the present invention and operating in the subtractive mode.
Figure 23A:
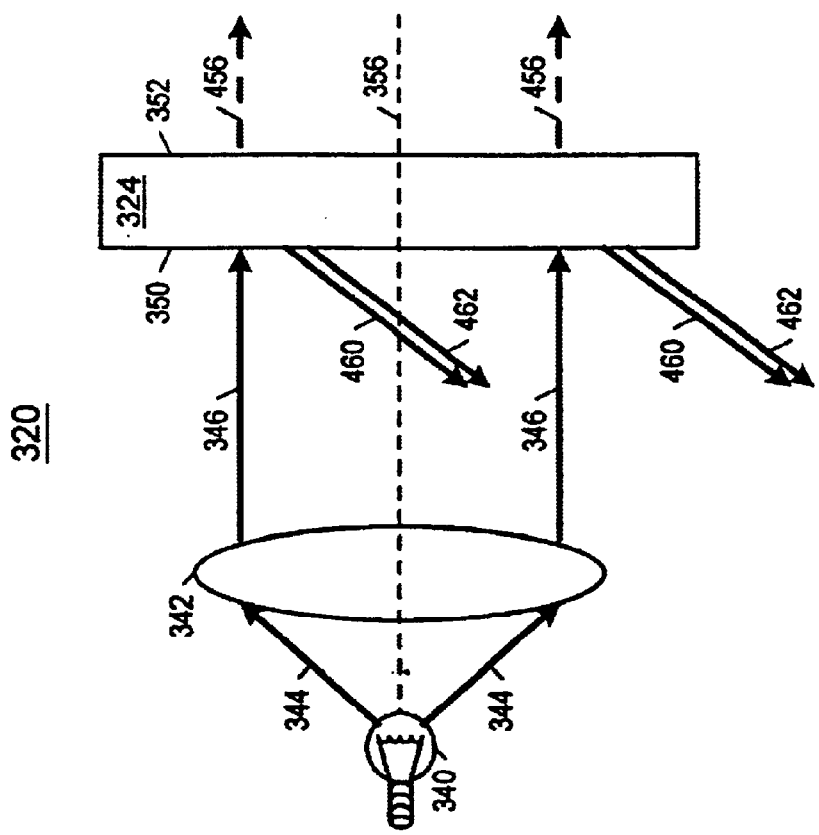
FIG. 23a is a diagram illustrating a collimated light source and a reflective-type solid-state optical filter employing the present invention and operating in the additive mode.

FIGS. 23a and 23b show further embodiments of the illumination system 320 that may be employed in FIGS. 18a and 18c, respectively. FIG. 23a shows an illumination system 320 operating in the subtractive mode while FIG. 23b shows the same illumination system 320 operating in the additive mode. FIGS. 23a and 23b show illumination system 320 comprising light source 340, condenser lens 342, and reflective-type solid-state optical filter 324. Many components in FIGS. 23a and 23b are similar to that shown in FIGS. 19a and 19b, and like reference numerals will be used. However, optical filter 324 shown in FIGS. 23a and 23b is substantially different from the optical filter 324 shown in FIGS. 19a and 19b.

In FIG. 23b, solid-state optical filter 324, operating in the additive mode in accordance with control signals provided by filter control circuit 328 (not shown), filters randomly polarized collimated white light 346 using diffraction to produce illumination light 452 and non diffracted light 454. As shown in FIG. 23*b*, illumination light 452 emerges from the front surface 350 of solid-state optical filter 324 at a diffraction angle, while non-diffracted light 454 emerges from the back surface 352 at a non-diffraction angle. Solid-state optical filter 324 is controlled by control circuit 328 (not shown in FIG. 22*b*) to produce illumination light 452 constituting one of the red, blue, or green bandwidths of the collimated light 346, while the non-diffracted light 454 constitutes the remaining two bandwidths. Further, optical filter 324 is controlled by control circuit 328 to cyclically and sequentially produce, for example, red, blue, and green bandwidth illumination light 452. The illumination light 452 is projected onto the illumination screen 314 (not shown in FIG. 23*a*) to illuminate a monochrome image presented thereon, while the non-diffracted light 454 enters free space, and is not used in illuminating the monochrome image.

In FIG. 23*a*, solid-state optical filter 324, operates in the subtractive mode in accordance with control signals generated by filter control circuit 328, to filter white light 346 using diffraction to produce illumination light 456 and diffracted light 460 and 462. As can be seen in FIG. 23*a*, illumination light 456 emerges from the back surface 352 of filter 324 at a non-diffraction angle, while diffracted light 460 and 462 emerges from the front surface 350 of filter 324 at a diffraction angle. Solid-state optical filter 324 is controlled by control circuit 328 (not shown in FIG. 22*a*) to produce illumination light 456 constituting one of the red, blue, or green bandwidths of the collimated light 346, while the diffracted light 460 and 462 constitute the remaining two bandwidths. The illumination light 456 is projected onto the display screen 314 to illuminate a monochrome image presented thereon, while diffracted separated light 460 and 462 enters free space, and is not used to illuminate the display screen 314. Solid-state optical filter 324 cyclically and sequentially produces, for example, red, blue, and green bandwidth illumination light 456.

FIGS. 24*a*–24*c* show cross-sectional representations of several distinct embodiments of solid-state optical filter 324 employed in the illumination systems 322 described above. Filter 324 shown in FIGS. 24*a* and 24*b* may be either transmissive or reflective-type. If transmissive-type, solid-state optical filter 324 shown in FIGS. 24*a* and 24*b* may be employed in any of the illumination systems 320 of FIGS. 19*a*, 19*b*, 20*a*, 20*b*, 21*a*, and 21*b*. If reflective-type, solid-state optical filter 324 shown in FIGS. 24*a* and 24*b* may be employed in any of the illumination systems 320 shown in FIGS. 23*a* and 23*b*. Finally, transmissive-type solid-state optical filter 324, shown in FIG. 24*c*, may be employed in the illumination systems 320 shown in FIGS. 22*a* and 22*b*.

Solid-state optical filter 324, shown in FIG. 24*a*, comprises a first group 464 of electrically switchable holographic optical elements 464*a*–464*c*, a polarization rotation device 466, such as an achromatic half-wave plate, and a second group 470 of electrically switchable holographic optical elements 470*a*–470*c*. In one embodiment, each of the optical elements 464*a*–*c* and 470*a*–*c* diffracts a select bandwidth of p or s-polarized white light when active while passing the remaining bandwidths of the white light without substantial alteration (e.g. without diffraction). The present invention will be described with optical elements 464*a*–464*c* and 470*a*–470*c* configured to diffract p-polarized light when active, it being understood that the invention should not be limited thereto. In other words, each of the electrically switchable holographic optical elements 464*a*–464*c* and 470*a*–470*c* have the property of exhibiting maximum diffraction efficiency for p-polarized light with the response to s-polarized light being around 1% of the p-polarized response. In one embodiment, optical elements 464*a*–464*c* diffract p-polarized red, blue, and green bandwidth components, respectively, of white light when active. Similarly, optical elements 470*a*–470*c* diffract p-polarized red, blue, and green bandwidth light, respectively, when active. Each optical element 464*a*–464*c* is configured to pass substantially all incident white light without substantial alteration when operating in the inactive state.

The solid-state optical filter 324 shown in FIG. 24*b* comprises first, second, and third groups 472, 474, and 476, respectively, of electrically switchable holographic optical elements. The first group 472 comprises a pair of electrically switchable holographic optical elements 472*a* and 472*b*, each of which is designed to diffract a first bandwidth of p or s-polarized white light when active while transmitting the remaining bandwidths of the white light without substantial alteration (e.g., without diffraction). In one embodiment, optical elements 472*a* and 472*b* are configured to diffract p or s-polarized red bandwidth light incident thereon when active. The second group of electrically switchable holographic optical elements 474 includes a pair of electrically switchable holographic optical elements 474*a* and 474*b*, each of which is designed to diffract a second bandwidth p or s-polarized white light incident thereon when active while passing the remaining bandwidths of the white light without substantial alteration. For example, optical elements 474*a* and 474*b* are configured to diffract p or s-polarized blue bandwidth light incident thereon when active. Likewise, the third group 476 comprises two electrically switchable holographic optical elements 476*a* and 476*b*, each of which is configured to diffract a third bandwidth of p or s-polarized white light incident thereon when active while passing the remaining bandwidths of the white light without substantial alteration. For example, optical elements 476*a* and 476*b* are designed to diffract p or s-polarized green bandwidth light incident thereon. In the embodiment shown in FIG. 24*b*, the optical elements in each group 472, 474, and 476 are configured to diffract light in orthogonal planes of polarization. For example, optical elements 472*a*, 474*a*, and 476*a*, when active, are configured to diffract p-polarized light while passing s-polarized light without substantial alteration, and optical elements 472*b*, 474*b*, and 476*b*, when active, are configured to diffract s-polarized light while passing p-polarized light without substantial alteration. In this embodiment, each of the electrically switchable holographic optical elements 472*a*, 474*a*, and 476*a* have the property of exhibiting maximum diffraction efficiency for p-polarized light with the response to s-polarized light being around 1% of the p-polarized response, while each of the electrically switchable holographic optical elements 472*b*, 474*b*, and 476*b* have the property of exhibiting maximum diffraction efficiency for s-polarized light with the response to p-polarized light being around 1% of the s-polarized-response. Normally, one would not expect reflection holographic switchable filters to exhibit polarization sensitivity, except for large angles (e.g., in excess of 40–50 degrees).

FIG. 24*c* shows solid-state optical filter 324 comprising a single group 380 of three holographic optical elements 480*a*–480*c*, each of which is configured to diffract a select bandwidth of p or s-polarized white light incident thereon when active while passing the remaining bandwidths of the white light without substantial alteration. For example, optical elements 480*a*–480*c* are configured to diffract p or s-polarized red, blue, and green bandwidths, respectively. In this embodiment, each of the electrically switchable holographic optical elements 480a–480c have the property of exhibiting maximum diffraction efficiency for p-polarized light with the response to s-polarized light being around 1% of the p-polarized response.

Figure 35:
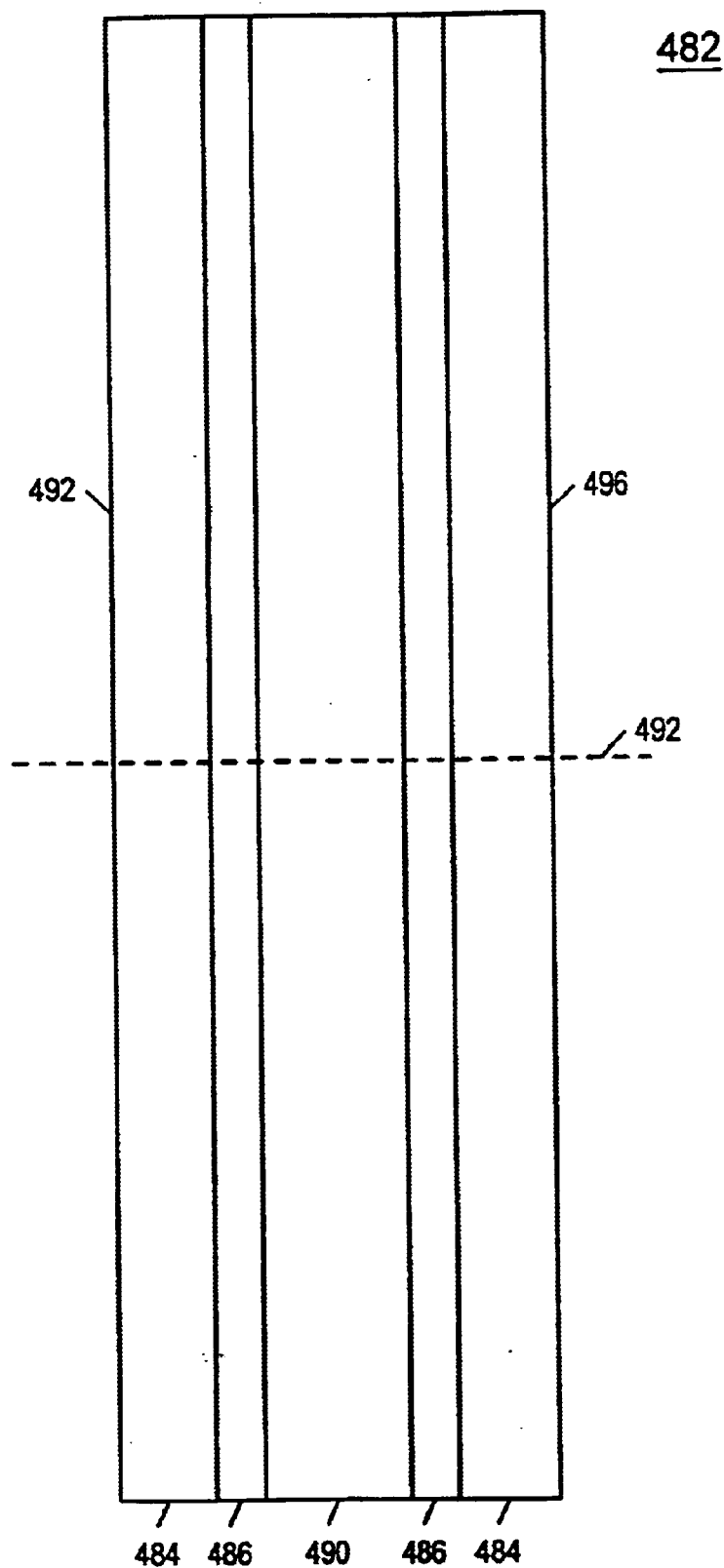
FIG. 35 shows a cross-sectional view of one embodiment of a switchable holographic optical element according to one embodiment of the present invention.

FIG. 35 illustrates one embodiment of an electrically switchable holographic optical element which can be used in the example filters shown in FIGS. 24a–24c. As shown in FIG. 35, switchable holographic optical element 482 includes a pair of substantially transparent and electrically nonconductive layers 484, a pair of substantially transparent and electrically conductive layers 486, and a switchable holographic layer 490 formed, in one embodiment, from the polymer dispersed liquid material described above. In one embodiment, the substantially transparent, electrically nonconductive layers 484 comprise glass, while the substantially transparent, electrically conductive layers 486 comprise indium tin oxide (ITO). An anti-reflection coating (not shown) may be applied to selected surfaces of the switchable holographic optical element 482, including surfaces of the ITO and the electrically nonconductive layers 484, to improve the overall transmissive efficiency of the optical element 482 and to reduce stray light. As shown in the embodiment of FIG. 35, all layers 484–490 are arranged like a stack of pancakes on a common axis 492.

Layers 484–490 may have substantially thin crosssectional widths, thereby providing a substantially thin aggregate in cross section. More particularly, switchable holographic layer 490 may have a cross-sectional width of 5–12 microns (the precise width depending on the spectral bandwidth and required diffraction efficiency), while glass layers 484 may have a cross-sectional width of 0.4–0.8 millimeters. Obviously, ITO layers 486 must be substantially thin to be transparent. It should be noted that holographic layers may deposited on thin plastic substrates. The plastic substrates may also be flexible.

In one embodiment, ITO layers 486 are selectively coupled to a voltage source (not shown in FIG. 35) in accordance with a control signal provided by filter control circuit 328 (not shown in FIG. 35). With ITO layers 486 coupled to the voltage source, an electric field is established within the switchable holographic layer 490, and the switchable holographic element is said to operate in the inactive state. Stated differently, an electric field established between ITO layers 486 deactivates the switchable holographic optical element layer 490 such that substantially all light incident thereon, regardless of incidence angle, is transmitted through holographic layer 490 without substantial alteration. However, when the ITO layers 486 are disconnected from the voltage source, the switchable holographic optical element 482 is said to operate in the active state. More particularly, when ITO layers 486 are decoupled from a voltage source, no electric field is present therebetween, and a select bandwidth of p or s-polarized light is diffracted in layer 490. For example, when active, optical element 42 diffracts the red bandwidth p-polarized component of incident white light while passing the remaining components of the incident white light, including the s-polarized red bandwidth light, without substantial alteration.

Optical element 482 may be reflective or transmissive type. FIG. 35 shows a cross-sectional representation of holographic optical element 42 having oppositely facing front and back surfaces 492 and 496. Whether reflective or transmissive type, light to be diffracted falls incident on the front surface 492 of optical element. If optical element 482 is configured as transmissive type, the diffracted light emerges from back surface 496. In contrast, if optical element 482 is configured as reflective type hologram, the diffracted light emerges from front surface 492.

Switchable holographic layer 490 records a hologram using conventional techniques. In one embodiment, the resulting hologram is characterized by a high diffraction efficiency and a fast rate at which the optical element can be switched between active and inactive states. In the embodiment of switchable holographic layer 490 formed from polymer dispersed liquid crystal (PDLC) material, the recorded hologram can be switched from a diffracting state to a transmitting state with the creation and elimination of the electric field mentioned above. Typically, the holograms recorded in the holographic layer 490 would be Bragg (also know as thick or volume phase) type in order to achieve high diffraction efficiency.

The hologram recorded in switchable holographic layer 490 can be based on PDLC materials mentioned above. The hologram, in one embodiment, results in an interference pattern creating by recording beams, i.e., a reference beam and an object beam, within layer 490. Interaction of the laser light with the PDLC material causes photopolymerization. Liquid crystal droplets become embedded in the dark regions of the fringe patterns that are formed by the intersection of the recording beams during the recording process. Stated differently, the recording material may be a polymer dispersed liquid crystal mixture which undergoes safe separation during the recording process, creating regions densely populated by liquid crystal microdroplets, interspersed by regions of clear photopolymer. When a voltage is supplied to ITO layers 486, the liquid crystal droplets reorient and change the refractive index of the hologram layer 490 thereby essentially erasing the hologram recorded therein. The material used within layer 490 is configured to operate at a high switching rate (e.g., the material can be switched in tens of microseconds, which is very fast when compared with conventional liquid crystal display materials) and a high diffraction efficiency.

Figure 25A:
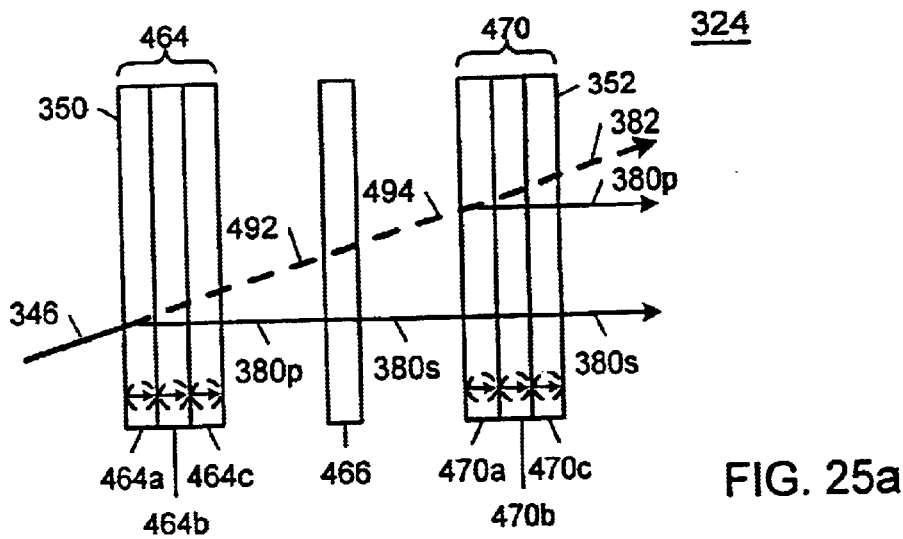
FIGS. 25a–25c show operational aspects of the transmissive-type solid-state optical filter shown in FIG. 24a operating in the additive mode.
Figure 25B:
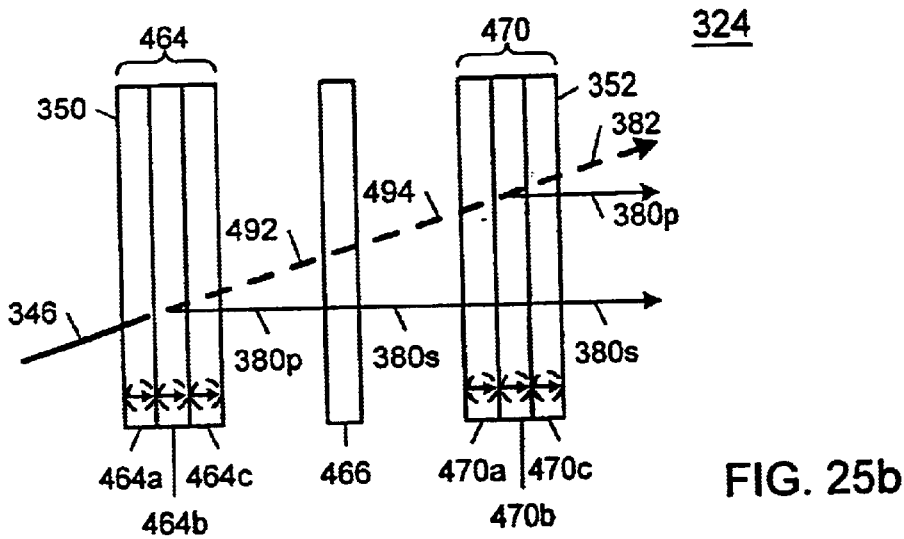
Figure 25C:
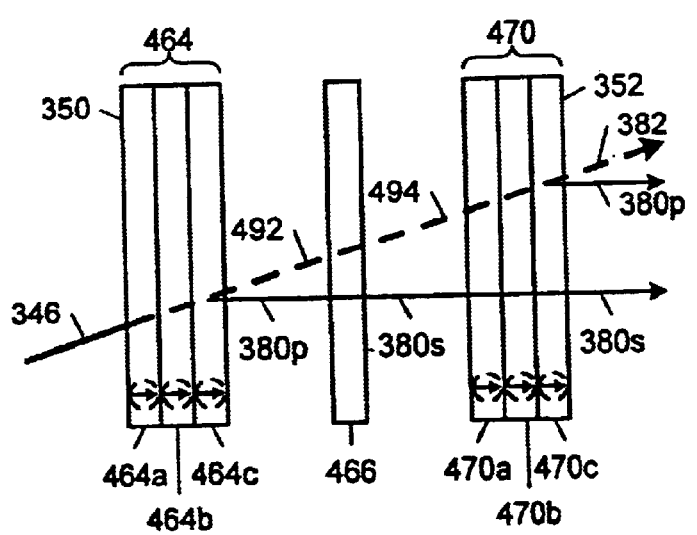

FIGS. 25a–25c illustrate operational aspects of one embodiment of the solid state optical filter 324 shown in FIG. 24a. In FIGS. 25a–25c, each of the electrically switchable holographic optical elements 464a–464c and 470a–470c is transmissive-type. The horizontal arrows enclosed by dashed circles indicate that each optical element 464a–464c is sensitive to p-polarized light. The solid state optical filter 324 illustrated in FIGS. 25a–25c may find application in the illumination system 320 shown in FIG. 20b and will be described with reference thereto.

In FIG. 25a, filter control circuit 328 (not shown) activates electrically switchable holographic optical elements 464a and 470a while the remaining electrically switchable holographic optical elements 464b, 464c, 470b, and 470c are inactive. In the active state, optical element 464a diffracts the p-polarized red bandwidth light component of collimated white light 346 while transmitting the remaining components (i.e., the s-polarized red bandwidth light, blue bandwidth light and green bandwidth light components) of white light 346 without substantial alteration. The diffracted p-polarized red bandwidth light passes through inactive optical elements 464b and 464c without substantial alteration and emerges therefrom as light 380p. The diffracted p-polarized red bandwidth light 380p is polarization rotated by rotator 466 and subsequently passed through group 470 without substantial alteration to emerge from back surface 352 as s-polarized red bandwidth illumination light 380s. Substantially all of the remaining components of collimated white light 346 not diffracted by optical element 464a, including the s-polarized red bandwidth component, passes through group 464 without substantial alteration to emerge therefrom as light 492. Light 492 is phase rotated by rotator and emerges therefrom as rotated light 494. Accordingly, the s-polarized red bandwidth component of light 492 is rotated into p-polarized red bandwidth light by polarization rotator 466. Activated optical element 470a diffracts the p-polarized red bandwidth component of rotated light 494 while transmitting the remaining components (i.e., the blue bandwidth light and green bandwidth light components) without substantial alteration. The diffracted p-polarized red bandwidth light passes through inactive optical elements 470b and 470c without substantial alteration to emerge from back surface 352 as diffracted p-polarized red bandwidth illumination light 380p. The remaining components of rotated light 494 unaltered by group 470 pass through group 470 without substantial alteration to emerge therefrom as non-diffracted light 382.

FIG. 25b illustrates operational aspects of the solid state optical filter 324 shown in FIG. 25a after filter control circuit 328 (not shown) deactivates electrically switchable holographic optical elements 464a and 470a and activates electrically switchable holographic optical elements 464b and 470b. In FIG. 25b, optical elements 464c and 470c remain in the inactive state. Inactive optical element 464a passes collimated white light 346 to activated optical element 464b without substantial alteration. In the active state, optical element 464b diffracts the p-polarized blue bandwidth light component of collimated white light 346 while transmitting the remaining components (i.e., the s-polarized blue bandwidth light, red bandwidth light and green bandwidth light components) of white light 346 without substantial alteration. The diffracted p-polarized blue bandwidth light passes through inactive optical element 464c without substantial alteration and emerges therefrom as light 380p. The diffracted p-polarized blue bandwidth light 380p is polarization rotated by rotator 466 and subsequently passed through group 470 without substantial alteration to emerge from back surface 352 as s-polarized blue bandwidth illumination light 380s. Substantially all of the remaining components of collimated white light 346 not diffracted by optical element 464b, including the s-polarized blue bandwidth component, passes through the remaining elements of group 464 without substantial alteration to emerge therefrom as light 492. Light 492, in turn, is phase rotated by rotator and emerges therefrom as rotated light 494. Accordingly, the s-polarized blue bandwidth component of light 492 is rotated into p-polarized blue bandwidth light by polarization rotator 466. Inactive optical element 470a passes rotated light 494 to activated element 470b without substantial alteration. Activated optical element 470b diffracts the p-polarized blue bandwidth component of rotated light 494 while transmitting the remaining components (i.e., the red bandwidth light and green bandwidth light components) without substantial alteration. The diffracted p-polarized blue bandwidth light passes through inactive optical element 470c without substantial alteration to emerge from back surface 352 as diffracted p-polarized blue bandwidth illumination light 380p. The remaining components of rotated light 494 unaltered by optical element 470b pass through group 470 without substantial alteration to emerge therefrom as non-diffracted light 382.

FIG. 25c shows the solid state optical filter 324 of FIG. 25b after filter control circuit 328 deactivates electrically switchable holographic optical elements 464b and 470b, and activates optical elements 464c and 470c. Electrically switchable holographic optical elements 464a and 470a in FIG. 25c remain inactive. Inactive optical elements 464a and 464b pass collimated white light 346 without substantial alteration to activated optical element 464c. In the active state, optical element 464c diffracts the p-polarized green bandwidth light component of collimated white light 346 while transmitting the remaining components (i.e., the s-polarized green bandwidth light, red bandwidth light and blue bandwidth light components) of white light 346 without substantial alteration. The diffracted p-polarized green bandwidth light emerges from optical element 464c as light 380p. The diffracted p-polarized green bandwidth light 380p is polarization rotated by rotator 466 and subsequently passed through group 470 without substantial alteration to emerge from back surface 352 as s-polarized green bandwidth illumination light 380s. Substantially all of the remaining components of collimated white light 346 not diffracted by optical element 464c, including the s-polarized green bandwidth component, passes through optical element 464c without substantial alteration to emerge therefrom as light 492. Light 492, in turn, is phase rotated by rotator and emerges therefrom as rotated light 494. Accordingly, the s-polarized green bandwidth component of light 492 is rotated into p-polarized green bandwidth light by polarization rotator 466. Inactive optical elements 470a and 470b pass rotated light 494 to activated element 470c without substantial alteration. Activated optical element 470c diffracts the p-polarized green bandwidth component of rotated light 494 while transmitting the remaining components (i.e., the red bandwidth light and blue bandwidth light components) without substantial alteration. The diffracted p-polarized green bandwidth light emerges from back surface 352 as diffracted p-polarized green bandwidth illumination light 380p. The remaining components of rotated light 494 pass through optical element 470c without substantial alteration to emerge therefrom as non-diffracted light 382.

Figure 26A:
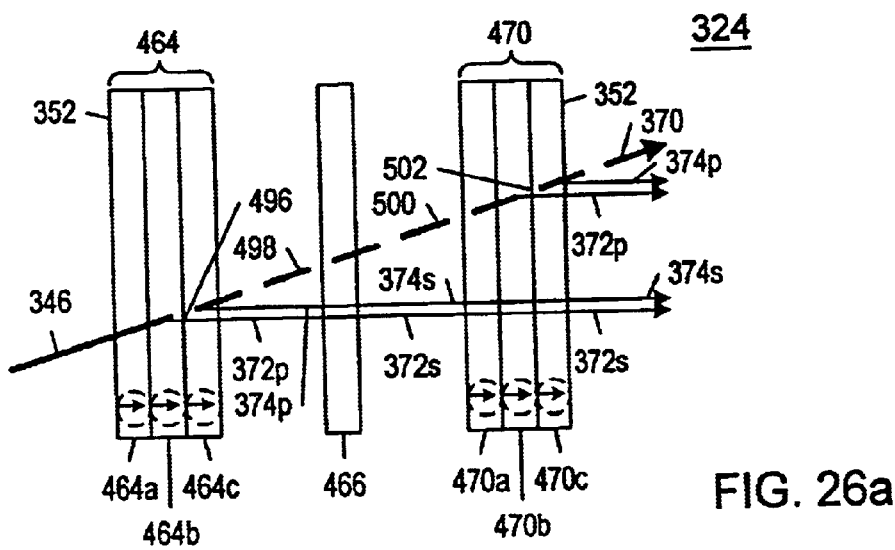
FIGS. 26a–26c show operational aspects of the transmissive-type solid-state optical filter shown in FIG. 24a operating in the subtractive mode.
Figure 26B:
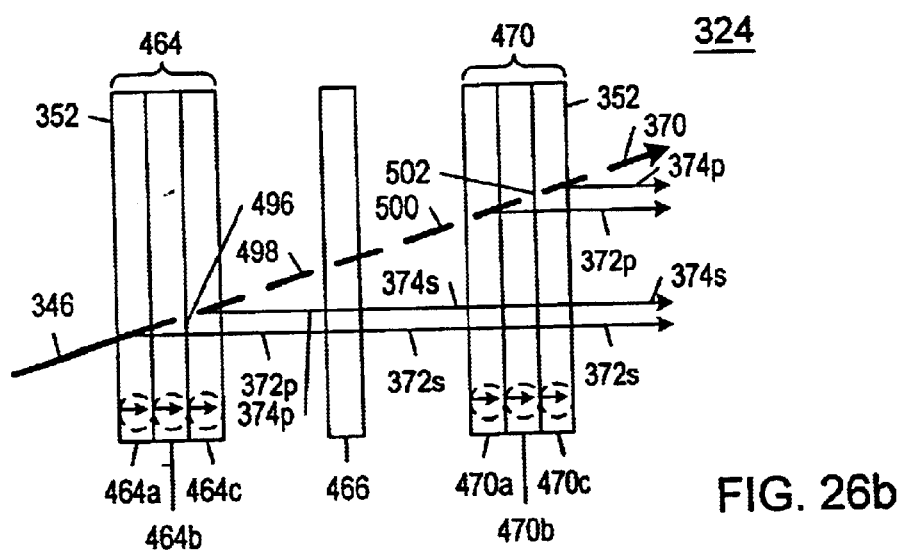
Figure 26C:
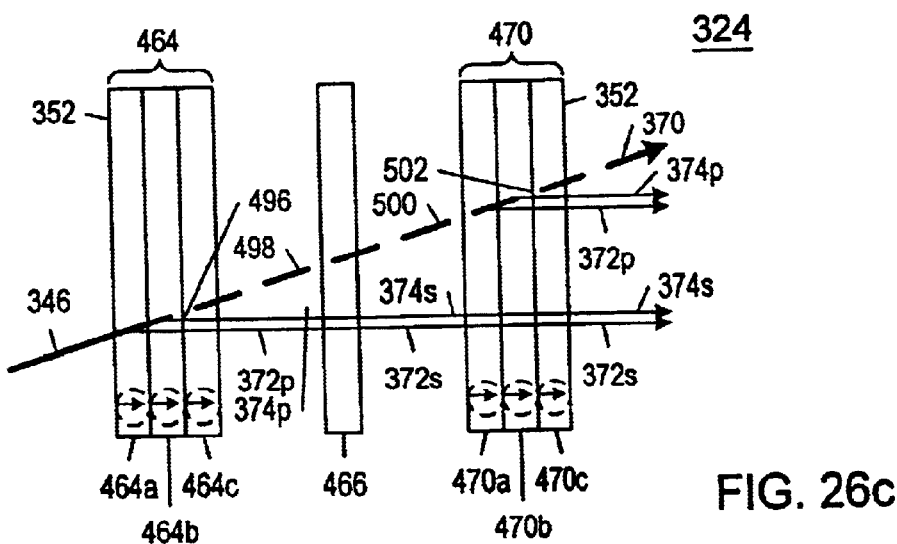

FIGS. 26a–26c show the solid state optical element 324 of FIG. 24a operating in the subtractive mode. The optical filters 324 shown in FIGS. 26a–26c may find application in the illumination system 320 shown in FIG. 20a. As such, optical filter 324 of FIGS. 26a–26c will be described with reference to FIG. 20a. Common reference numbers identify common components in FIGS. 25a–25c and FIGS. 26a–26c.

As noted above, each of the solid state optical filters 324 shown in FIGS. 26a–26c operates in the subtractive mode. In the subtractive mode, the filter control circuit 328 (not shown) activates two of three electrically switchable holographic optical elements in each of the first and second groups 464 and 470, respectively. In FIG. 26a, filter control circuit 328 activates electrically switchable holographic optical elements 464b, 464c, 470b, and 470c, while deactivating optical elements 464a and 470a. In this configuration, inactive optical element 464a passes collimated white light 346 incident on front surface 350 without substantial alteration. Optical element 464b diffracts the p-polarized blue bandwidth component of collimated white light 346 while passing the remaining bandwidth components, including the s-polarized blue bandwidth component, without substantial alteration. The diffracted p-polarized blue bandwidth light 372p passes through optical element 464c without substantial alteration. The diffracted p-polarized blue bandwidth light 372p is then polarization rotated by rotator 466 and subsequently passed through group 470 without substantial alteration to emerge from back surface 352 as s-polarized blue bandwidth illumination light 372s. The remaining unaltered components of collimated white light 346 emerge from optical element 464b as light 496. Activated optical element 464c, in turn, diffracts the p-polarized green bandwidth component of light 496 while passing the remaining bandwidth components, including the s-polarized green bandwidth component, without substantial alteration. The diffracted p-polarized green bandwidth light 374p is polarization rotated by rotator 466 and subsequently passed through group 470 without substantial alteration to emerge from back surface 352 as s-polarized green bandwidth illumination light 374s. The remaining components of light 496 emerge from optical element 464c as light 498. Light 498, in turn, is phase rotated by rotator and emerges therefrom as rotated light 500. Accordingly, the s-polarized blue and green bandwidth components of light 498 are rotated into p-polarized blue and green bandwidth components by polarization rotator 466. Inactive optical element 470a passes rotated light 500 to activated element 470b without substantial alteration. Activated optical element 470b, in turn, diffracts the p-polarized blue bandwidth component of light 500 while passing the remaining components thereof without substantial alteration to activated optical element 470c as light 502. The p-polarized blue bandwidth component diffracted by optical element 470b passes through optical element 470c without substantial alteration and emerges from back surface 352 as diffracted p-polarized blue bandwidth light 372p. Activated optical element 470c diffracts the p-polarized green bandwidth component of light 502 while passing the remaining components thereof. The p-polarized green bandwidth component diffracted by optical element 470c emerges from back surface 352 as diffracted p-polarized green bandwidth light 374p while the remaining components of light 502 emerges as non-diffracted illumination light 370. In FIG. 26a, non-diffracted illumination light 370 essentially constitutes p and s-polarized red bandwidth light.

FIG. 26b shows the filter 324 of FIG. 26a after control circuit 328 deactivates optical elements 464b and 470b and activates optical elements 464a and 470a. In this configuration, active optical element 464a diffracts the p-polarized red bandwidth component of collimated white light 346 incident on front surface 350 while passing the remaining bandwidth components thereof, including the s-polarized red bandwidth component, without substantial alteration. The diffracted p-polarized red bandwidth light 372p passes through the remaining components of group 464 without substantial alteration. The diffracted p-polarized red bandwidth light 372p is then polarization rotated by rotator 466 and subsequently passed through group 470 without substantial alteration to emerge from back surface 352 as s-polarized red bandwidth illumination light 372s. The remaining components of collimated white light 346 emerge from optical element 464a as light 496 and pass through inactive optical element 464b without substantial alteration. Activated optical element 464c, in turn, diffracts the p-polarized green bandwidth component of light 496 while passing the remaining bandwidth components, including the s-polarized green bandwidth component, without substantial alteration. The diffracted p-polarized green bandwidth light 374p is polarization rotated by rotator 466 and subsequently passed through group 470 without substantial alteration to emerge from back surface 352 as s-polarized green bandwidth illumination light 374s. The remaining components of light 496 emerge from optical element 464c as light 498. Light 498, in turn, is phase rotated by rotator and emerges therefrom as rotated light 500. Accordingly, the s-polarized red and green bandwidth components of light 498 are rotated into p-polarized red and green bandwidth components of light 500. Active optical element 470a diffracts the p-polarized red bandwidth component of light 500 while passing the remaining components thereof without substantial alteration to inactivated optical element 470b as light 502. The p-polarized red bandwidth component diffracted by optical element 470a passes through the remaining optical elements of group 470 without substantial alteration and emerges from back surface 352 as diffracted p-polarized blue bandwidth light 372p. Inactive optical element 470b passes light 502 without substantial alteration to activated optical element 470c. Activated optical element 470c diffracts the p-polarized green bandwidth component of light 502 while passing the remaining components thereof. The p-polarized green bandwidth component diffracted by optical element 470c emerges from back surface 352 as diffracted p-polarized green bandwidth light 374p, while the remaining components of light 502 passed by optical element 470c emerges as non-diffracted illumination light 370. In FIG. 26a, non-diffracted illumination light 370 essentially constitutes p and s-polarized red bandwidth light.

FIG. 26c shows filter 324 of FIG. 26b after filter control circuit 328 deactivates optical elements 464c and 470c and activates optical elements 464b and 470b. In this configuration, active optical element 464a diffracts the p-polarized red bandwidth component of collimated white light 346 incident on front surface 350 while passing the remaining bandwidth components thereof, including the s-polarized red bandwidth component, without substantial alteration. The diffracted p-polarized red bandwidth light 372p passes through the remaining components of group 464 without substantial alteration. The diffracted p-polarized red bandwidth light 372p is then polarization rotated by rotator 466 and subsequently passed through group 470 without substantial alteration to emerge from back surface 352 as s-polarized red bandwidth illumination light 372s. The remaining components of collimated white light 346 emerge from optical element 464a as light 496. Activated optical element 464b, in turn, diffracts the p-polarized blue bandwidth component of light 496 while passing the remaining bandwidth components, including the s-polarized blue bandwidth component, without substantial alteration. After transmitting through inactive optical element 464c, the diffracted p-polarized blue bandwidth light 374p is polarization rotated by rotator 466 and subsequently passed through group 470 without substantial alteration to emerge from back surface 352 as s-polarized blue bandwidth illumination light 374s. The remaining components of light 496 passes through optical element 464c and emerge therefrom as light 498. Light 498, in turn, is phase rotated by rotator 466 and emerges therefrom as rotated light 500. Accordingly, the s-polarized red and blue bandwidth components of light 498 are rotated into p-polarized red and blue bandwidth components of light 500. Active optical element 470a diffracts the p-polarized red bandwidth component of light 500 while passing the remaining components thereof without substantial alteration to activated optical element 470b as light 502. The p-polarized red bandwidth component diffracted by optical element 470a passes through the remaining optical elements of group 470 without substantial alteration and emerges from back surface 352 as diffracted p-polarized blue bandwidth light 372p. Active optical element 470b diffracts the p-polarized blue bandwidth component of light 502 while passing the remaining components thereof. The p-polarized blue bandwidth component diffracted by optical element 470b emerges from back surface 352 as diffracted p-polarized blue bandwidth light 374p after passing through inactive optical element 470c without substantial alteration. The remaining components of light 502 pass through optical element 470c and emerge as non-diffracted illumination light 370. In FIG. 26a, non-diffracted illumination light 370 essentially constitutes p and s-polarized green bandwidth light.

Figure 27A:
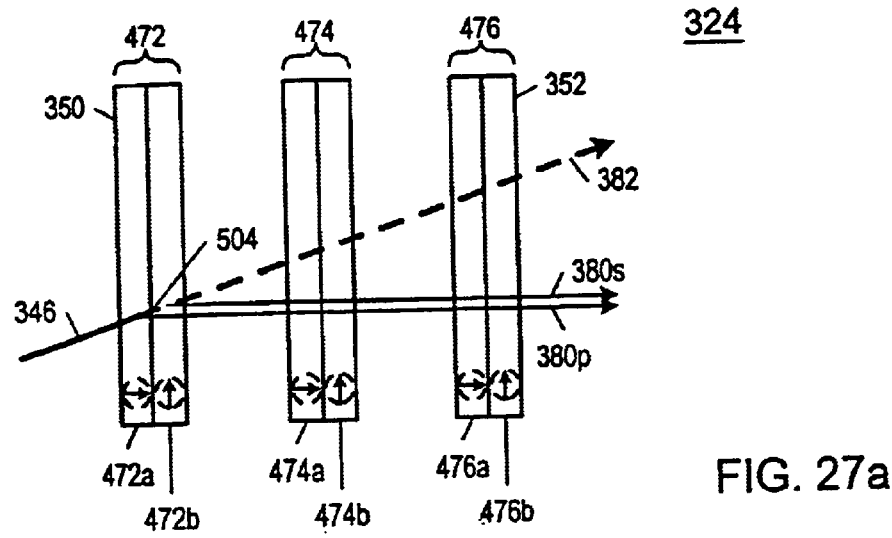
FIGS. 27a–27c show operational aspects of the transmissive-type solid-state optical filter shown in FIG. 24b operating in the additive mode.
Figure 27B:
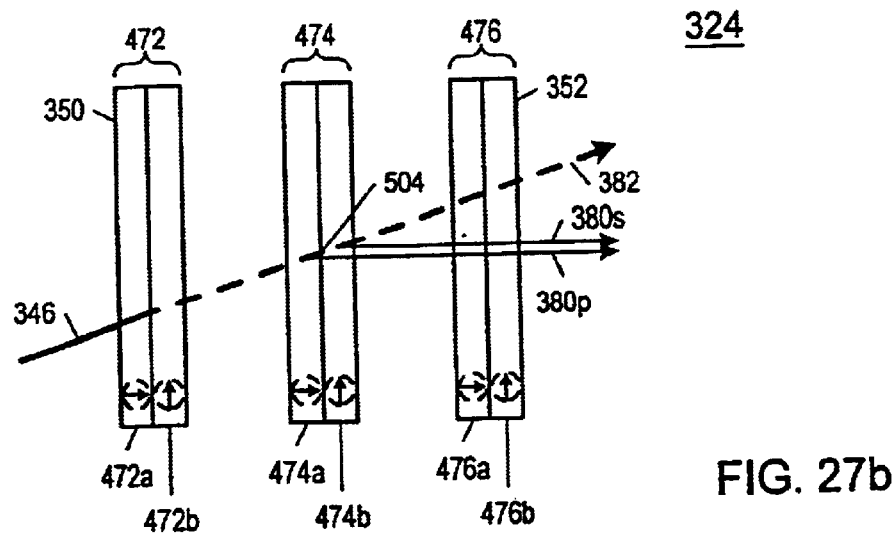
Figure 27C:
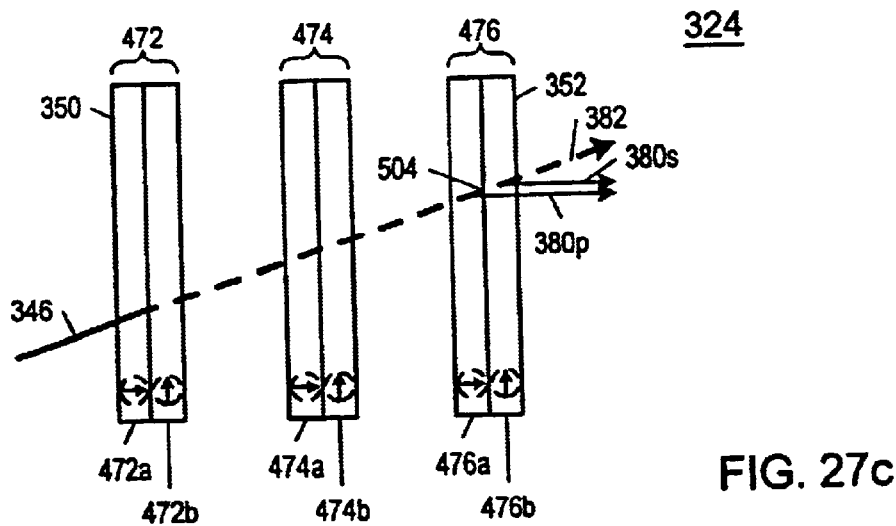

FIGS. 27a–27c show an embodiment of the optical filter 324 shown in FIG. 24b operating in the additive mode. In FIGS. 27a–27c, each group 472, 474 and 476 includes a pair of transmissive type electrically switchable holographic optical elements. The optical elements of each group 472, 474, and 476 have gratings that are disposed orthogonal to one another. As a result, for example, optical element 472a is configured to diffract p-polarized red bandwidth light and transmit s-polarized red bandwidth light substantially unaltered, while optical element 472b is configured to diffract s-polarized red bandwidth light while transmitting p-polarized red bandwidth light without substantial alteration. The horizontal and vertical arrows encircled by a dashed line shown in FIGS. 27a–27c indicate the polarization sensitivity of the optical elements in each group, the horizontal arrows corresponding to p-polarization sensitivity and the vertical arrows corresponding to s-polarization sensitivity. According to normal conventions, however, the term p-polarized refers to light with its electric field vector lying in the plane of the incidence, and the term s-polarized refers to light with its electric field vector oriented normal to the plane of incidence.

In contrast to the filter 324 shown in FIG. 24a, optical filters 324 shown in FIGS. 27a–27c lack the polarization rotation device 466. The optical filters 324 shown in FIGS. 27a–27c may find application in the illumination system 320 shown in FIG. 20b. As such, optical filter 324 of FIGS. 27a–27c will be described with reference to FIG. 20b with common reference numbers used therein.

As noted above, the solid state optical filter 324 shown in FIGS. 27a–27c operates in the additive mode. In the additive mode, the filter control circuit 328 (not shown) activates each of the electrically switchable holographic optical elements in one of the first, second, and third groups 472, 474, and 476, respectively.

In FIG. 27a, the filter control circuit 328 activates the first group 472 of optical elements while deactivating the optical elements of the remaining groups 474 and 476. Activated optical element 472a diffracts the p-polarized red bandwidth component 380p of the collimated white light 346 received on the front surface 350. Most of the remaining portions of the collimated light 346, including the s-polarized red bandwidth component, transmit through optical element 472a without substantial alteration and emerge as light 504. The p-polarized red bandwidth light diffracted by optical element 472a passes through optical element 472b and deactivated optical element elements in groups 474 and 476 without substantial alteration to emerge from back surface 352 as diffracted p-polarized red bandwidth illumination light 380p. Optical element 472b, in turn, diffracts the s-polarized red bandwidth component of light 504 while passing the remaining portions of light 504 substantially unaltered. The s-polarized red bandwidth light diffracted by optical element 472b passes through deactivated optical elements in groups 474 and 476 without substantial alteration to emerge from back surface 352 as diffracted s-polarized red bandwidth illumination light 380s. The remaining components of light 504 pass through groups 474 and 476 without substantial alteration to emerge from back surface 352 as non-diffracted light 382.

FIG. 27b shows filter 324 of FIG. 27a just after filter control circuit 328 deactivates the optical elements of group 472 and activates the optical elements of groups 474. In this configuration, optical group 472 passes collimated white light 346 to activated optical element 474a without substantial alteration. Optical element 474a diffracts the p-polarized blue bandwidth component 380p of the collimated white light 346. Most of the remaining portions of the collimated light 346, including the s-polarized blue bandwidth component, transmit through optical element 474a without substantial alteration and emerge therefrom as light 504. The p-polarized blue bandwidth light diffracted by optical element 474a passes through optical element 474b and deactivated optical element elements in group 476 without substantial alteration to emerge from back surface 352 as diffracted p-polarized blue bandwidth illumination light 380p. Optical element 474b diffracts the s-polarized blue bandwidth component of light 504 while passing the remaining portions of light 504 substantially unaltered. The s-polarized blue bandwidth light diffracted by optical element 474b passes through deactivated optical elements in group 476 without substantial alteration to emerge from back surface 352 as diffracted s-polarized blue bandwidth illumination light 380s. The remaining components of light 504 pass through group 476 without substantial alteration to emerge from back surface 352 as non-diffracted light 382.

FIG. 27c shows filter 324 just after filter control circuit 328 deactivates group 474 of optical elements and activates group 476 of optical elements. In this configuration optical groups 472 and 474 pass collimated white light 346 to activated optical element 476a without substantial alteration. Optical element 476a, in turn, diffracts the p-polarized green bandwidth component 380p of the collimated white light 346. Most of the remaining portions of the collimated light 346, including the s-polarized green bandwidth component, transmit through optical element 476a without substantial alteration and emerge therefrom as light 504. The p-polarized green bandwidth light diffracted by optical element 476a passes through optical element 476b without substantial alteration to emerge from back surface 352 as diffracted p-polarized green bandwidth illumination light 380p. Optical element 476b diffracts the s-polarized green bandwidth component of light 504 while passing the remaining portions of light 504 substantially unaltered. The s-polarized green bandwidth light diffracted by optical element emerges from back surface 352 as diffracted s-polarized green bandwidth illumination light 380s. The remaining components of light 504 emerge from back surface 352 as non-diffracted light 382.

Figure 28A:
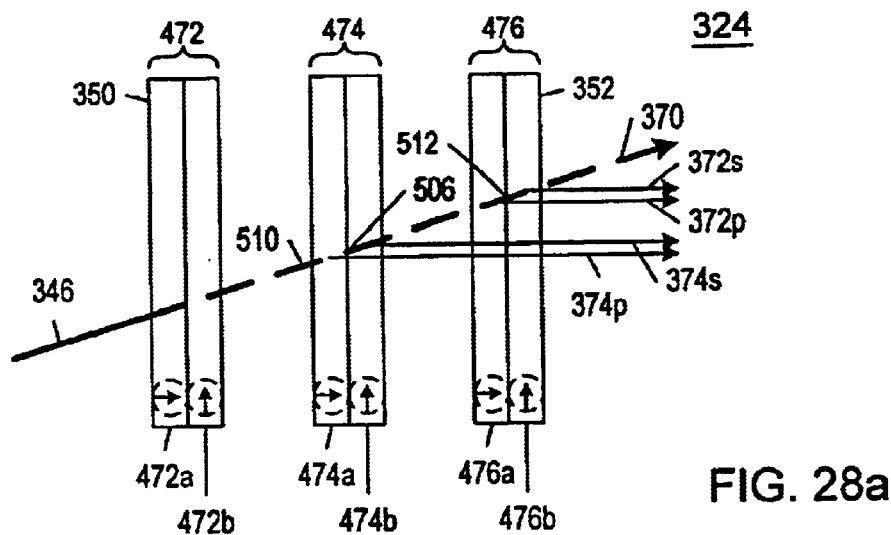
FIGS. 28a–28c show operational aspects of the transmissive-type solid-state optical filter shown in FIG. 24b operating in the subtractive mode.
Figure 28B:
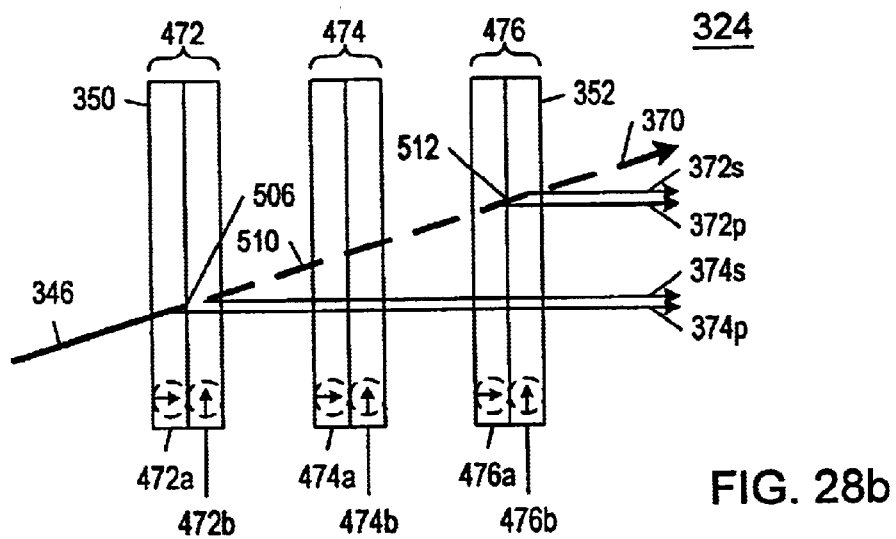
Figure 28C:
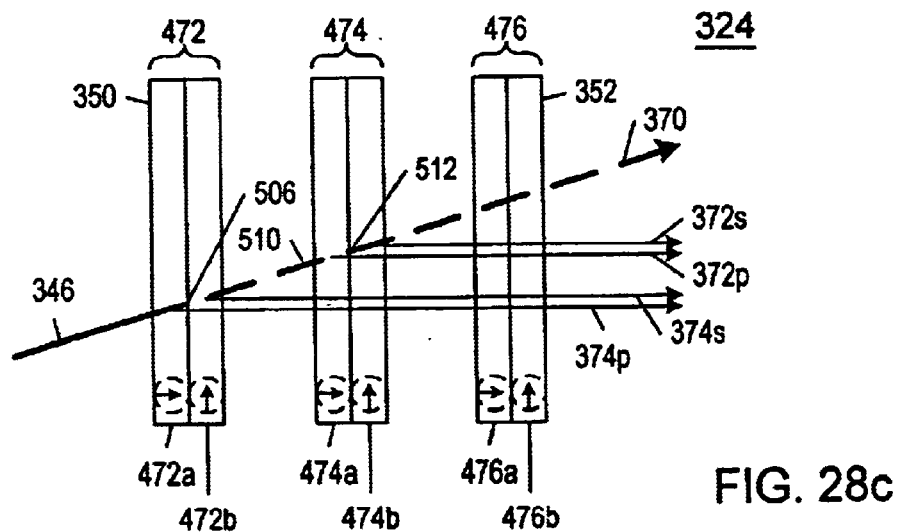

FIGS. 27a–27c illustrate optical filter 324 operating in the additive mode. In contrast, FIGS. 28a–28c illustrate the same optical filter 324 operating in the subtractive mode. In FIGS. 28a–28c, filter control circuit 328 activates two of the three groups of optical elements 472, 474, and 476. The solid state optical filter 324 shown in FIGS. 28a–28c may find application in the illumination system shown, for example, in FIG. 20a.

In FIG. 28a, filter control circuit 328 activates the optical elements of groups 474 and 476 while inactivating the optical elements of group 472. Once deactivated, the optical elements of group 472 transmit collimated light 346 received on the front surface 350 without substantial alteration. However, optical elements in group 474 diffract blue bandwidth components of the collimated white light 346. More particularly, activated optical element 474a diffracts the p-polarized blue bandwidth component from the collimated white light 346. This diffracted light is shown emerging from the back surface 352 as diffracted p-polarized blue bandwidth light 374p after passing through activated optical element 474b and group 476 without substantial alteration.

The remaining components of collimated white light 346 are transmitted by activated optical element 474a without substantial alteration and emerge therefrom as light 506. Activated optical element 474b diffracts the s-polarized blue bandwidth component of light 506. This diffracted light emerges from the back surface 352 as diffracted s-polarized blue bandwidth light 374s after passing through activated optical element 474b and group 476 without substantial alteration. The remaining components of light 506 pass through activated optical element 474b without substantial alteration and emerge from the second group 474 as light 510. Activated optical element 476a, however, diffracts the p-polarized green bandwidth component of light 510 emitted from second optical group 474. This diffracted light emerges from back surface 352 as diffracted p-polarized green bandwidth light 372p after passing through optical element 476a without substantial alteration. The remaining components of light 510 passes through activated optical element 476a without substantial alteration and emerge therefrom as light 512. Activated holographic optical element 476b diffracts the s-polarized green bandwidth component of light 512. This diffracted light emerges from the back surface 352 as diffracted s-polarized green bandwidth light 372s. The remaining components of 512 emerge from the back surface 352 as illumination light 370 that essentially constitutes s and p-polarized red bandwidth light.

FIG. 28b shows the solid state optical filter 324 shown in FIG. 28a just after filter control circuit 328 (not shown) activates the holographic optical elements of the first group 472 and deactivates the holographic optical elements of the second group 474. In this configuration, activated optical element 472a diffracts the p-polarized red bandwidth component of collimated white light 346. This diffracted light transmits through the remaining holographic optical elements without substantial alteration and emerges from back surface 352 as diffracted p-polarized red bandwidth light 374p as shown in FIG. 28b. The remaining components of collimated white light 346 are transmitted through activated optical element 472a without substantial alteration to emerge therefrom as light 506. Activated optical element 472b, in turn, diffracts the s-polarized red bandwidth component of light 506. This diffracted light emerges from back surface 352 as diffracted s-polarized red bandwidth light 374s after passing through the remaining holographic optical elements without substantial alteration. The remaining components of light 506 emerge from the first optical group 472 as light 510. Activated optical element 474a diffracts the p-polarized blue bandwidth component of light 510 after it passes through group 474 without substantial alteration. This diffracted light emerges from back surface 352 as p-polarized green bandwidth light 372p after passing through activated optical element 476b without substantial alteration. The remaining components of light 510 emerge from activated optical element 476a as light 512. Activated optical element 476b diffracts the s-polarized green bandwidth component from light 512. This diffracted light emerges from back surface 352 as diffracted s-polarized green bandwidth light 372s. The remaining component of light 512 pass through activated optical element 476b without substantial alteration and emerges as randomly polarized blue bandwidth illumination light 370.

FIG. 28c shows the solid-state optical filter 324 of FIG. 28b just after filter control circuit 328 deactivates holographic optical elements of group 476 and activates holographic elements of group 474. In FIG. 28c, activated optical element 472a diffracts the p-polarized red bandwidth component of collimated white light 346. This diffracted light passes through the remaining holographic optical elements without substantial alteration to emerge from back surface 352 as diffracted p-polarized red bandwidth light 374p. The remaining components of collimated white light 346 pass through activated optical element 472a without substantial alteration to emerge as light 506. Activated optical element 472b diffracts the s-polarized blue bandwidth component of light 506. This diffracted light passes through the remaining holographic elements without substantial alteration and emerges from back surface 352 as diffracted s-polarized red bandwidth light 374s. The remaining components of light 506 transmit through activated optical element 472b without substantial alteration to emerge as light 510. Activated optical element 474a diffracts the p-polarized blue bandwidth component of light 510. This diffracted light passes through the remaining holographic optical elements without substantial alteration to emerge from back surface 352 as p-polarized blue bandwidth component 372p. The remaining components of light 510 pass through activated optical element 474a and emerge therefrom as light 512. Activated optical element 474b diffracts the s-polarized blue bandwidth component of light 512. This diffracted light passes through the remaining optical elements without substantial alteration and emerges from back surface 352 as diffracted s-polarized blue bandwidth component 372s. The remaining components of light 512 transmit through activated optical element 474b and optical elements of group 476 without substantial alteration to emerge as randomly polarized green bandwidth illumination light 370.

Figure 29A:
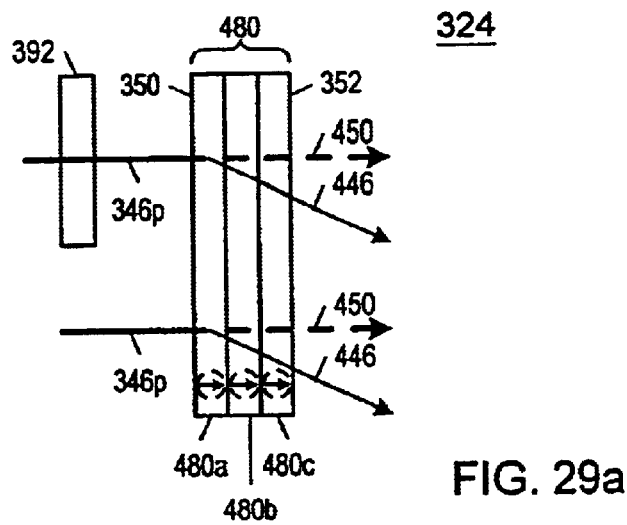
FIGS. 29a–29c show operational aspects of the transmissive-type solid-state optical filter shown in FIG. 24c operating in the additive mode.
Figure 29B:
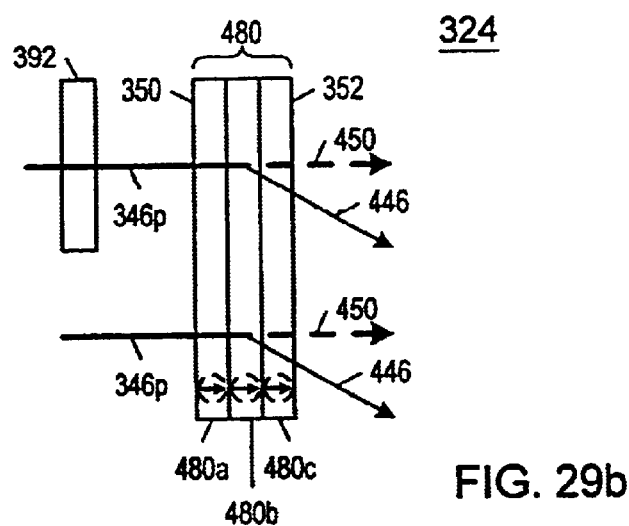
Figure 29C:
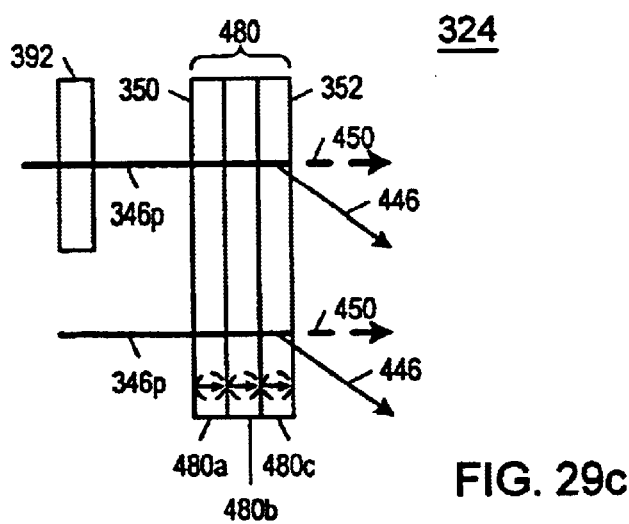

FIGS. 29a–29c show operational aspects of the solid-state optical filter 324 shown in FIG. 24c. In FIGS. 29a–29c, solid-state optical filter 324 operates in the additive mode. More particularly, in the additive mode, filter control circuit 328 activates one of the three electrically switchable holographic optical elements 480a–480c while deactivating the remaining two elements. The solid-state optical filter 324 illustrated in FIGS. 29a–29c may find application in the illumination system 322 shown in FIG. 22b. As such, optical filter 324 of FIGS. 29a–29c will be described with reference to FIG. 22b with common reference numbers used therein. Each of the electrically switchable holographic optical elements 480a–480c is a transmissive type and, in one embodiment, is sensitive to p-polarized light as indicated by the horizontal arrows encircled by dashed lines. Polarization rotator 392, which comprises an achromatic half-wave plate in one embodiment, is also shown in FIGS. 29a–29c.

In FIG. 29a, filter control circuit 328 (not shown) activates the first electrically switchable holographic optical element 480a, while deactivating optical elements 480b and 480c. In this configuration, activated optical element 480a diffracts the p-polarized red bandwidth component of p-polarized collimated light 346p while transmitting the remaining components thereof without substantial alteration. The diffracted p-polarized red bandwidth light emerges as illumination light 446 from back surface 352 after passing through the remaining electrically switchable holographic optical elements without substantial alteration. The remaining components of p-polarized collimated white light 346 pass through each of the optical elements 480a–480c without substantial alteration and emerge from back surface 352 as non-diffracted light 450. This non-diffracted light includes the p-polarized blue and green bandwidth portions of collimated p-polarized light 346p.

FIG. 29b shows the filter 324 of FIG. 29a just after filter control circuit 328 activates holographic optical element 480b and deactivates holographic element 480a. In this configuration, inactive optical elements 480a and 480c transmit substantially all light incident thereon without substantial alteration. Activated optical element 480*b* diffracts the p-polarized blue bandwidth component of p-polarized collimated white light 346*p*. This diffracted p-polarized blue bandwidth light passes through inactive optical element 480*c* without substantial alteration, and emerges from back surface 352 as p-polarized blue bandwidth illumination light 446. The remaining components of p-polarized collimated white light 346*p* travel through the remaining components 480*b* and 480*c* without substantial alteration to emerge from back surface 352 as non-diffracted light 450. Non-diffracted light 450 includes p-polarized red and green bandwidth components of p-polarized white light 346*p*.

FIG. 29*c* shows solid-state optical filter 324 of FIG. 29*b* just after filter control circuit 328 activates holographic optical element 480*c* and deactivates holographic element 480*b*. In this configuration, p-polarized collimated white light transmits through inactive optical elements 480*a* and 480*b* without substantial alteration. Activated optical element 480*c*, however, diffracts the p-polarized green bandwidth component of collimated p-polarized white light 346*p* while passing the remaining components thereof without substantial alteration. This diffracted light emerges from back surface 352 as p-polarized green bandwidth illumination light 446. The remaining components of p-polarized collimated white light 346*p* pass through activated optical element 480*c* and emerge as non-diffracted light 450 without substantial alteration. Non-diffracted light 450 includes the p-polarized red and blue bandwidth components of collimated white light 346*p*.

Figure 30A:
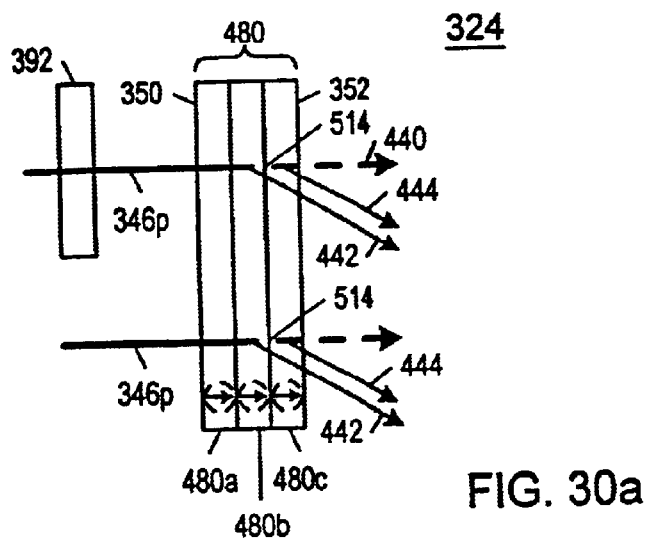
FIGS. 30a–30c show operational aspects of the transmissive-type solid-state optical filter shown in FIG. 24c operating in the subtractive mode.
Figure 30B:
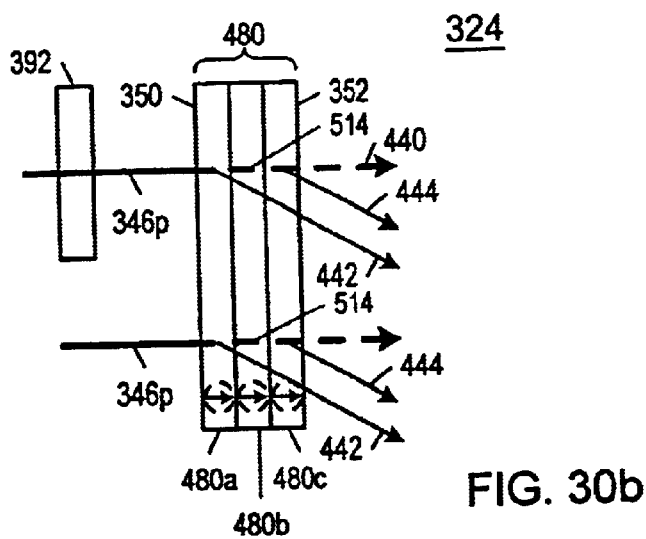
Figure 30C:
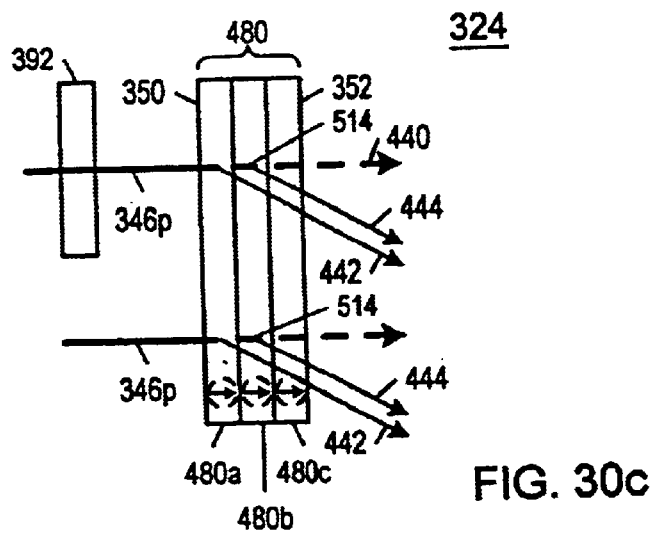

FIGS. 30*a*–30*c* show the solid-state optical filter 324 of FIG. 24*c* operating in subtractive mode. In contrast to the filter 324 shown in FIGS. 29*a*–29*c*, FIGS. 30*a*–30*c* show filter 324 in which two of the three electrically switchable holographic optical elements 480*a*–480*c* are activated by filter control circuit 328. Each of the holographic optical elements 480*a*–480*c* define a transmissive-type hologram which is sensitive to p-polarized light. The solid-state optical filter 324 illustrated in FIGS. 30*a*–30*c* may find application in the illumination system 320 shown in FIG. 22*a*. As such, optical filter 324 of FIGS. 30*a*–30*c* will be described with reference to FIG. 22*a* with common reference numbers used therein.

In FIG. 30*a*, solid-state optical filter 324 is shown after control circuit 328 activates holographic optical elements 480*b* and 480*c*, and deactivates holographic optical element 480*a*. In this configuration, inactive holographic optical element 480*a* transmits or passes substantially all light incident thereon without substantial alteration. As such, p-polarized collimated white light 346*p* passes through optical element 480*a* without substantial alteration. Activated optical element 480*b*, however, diffracts the p-polarized blue bandwidth component of collimated white light 346*p* while passing the remaining components thereof without substantial alteration. This diffracted light passes through optical element 480*c* without substantial alteration, and emerges from back surface 352 as diffracted p-polarized blue bandwidth light 442. The remaining portions of p-polarized collimated white light 346*p* transmit through activated optical element 480*b* without substantial alteration and emerge from optical element 480*b* as light 514. Activated optical element 480*c* diffracts the p-polarized green bandwidth component of light 514. This diffracted component emerges as diffracted p-polarized green bandwidth light 444. The remaining components of light 514 transmit through activated optical element 480*c* without substantial alteration, and emerge from back surface 352 as illumination light 440. Illumination light 440 in this configuration constitutes p-polarized red bandwidth light.

FIG. 30*b* shows the filter 324 of FIG. 30*a* just after control circuit 328 activates optical element 480*a* and deactivates optical element 480*b*. Activated optical element 480*a* diffracts p-polarized red bandwidth light from p-polarized collimated white light 346*p* while passing the remaining components thereof without substantial alteration. This diffracted light passes through optical elements 480*b* and 480*c* without substantial alteration to emerge as diffracted p-polarized red bandwidth light 442. The remaining components of p-polarized collimated white light 346*p* pass through optical element 480*a* and emerge therefrom as light 514. Light 514 passes through optical element 480*b* without substantial alteration. Activated optical element 480*c* diffracts the p-polarized green bandwidth component of light 514. This light emerges from back surface 352 as diffracted p-polarized green bandwidth light 444. The remaining components of light 514 pass through activated optical element 480*c* without substantial alteration to emerge from back surface 352 as illumination light 440. Illumination light 440 comprises p-polarized blue bandwidth light.

FIG. 30*c* illustrates the filter 324 of FIG. 30*b* just after filter control circuit 328 activates optical element 480*b* and deactivates optical element 480*c*. In this configuration, optical element 480*a* diffracts the p-polarized red bandwidth component of p-polarized white collimated light 346*p*. This diffracted light passes through optical elements 480*b* and 480*c* without substantial alteration to emerge from back surface 352 as diffracted p-polarized red bandwidth light 442. The remaining components of p-polarized collimated white light 346*p* transmit through activated optical element 480*a* without substantial alteration and emerge as light 514 therefrom. Activated optical element 480*b* diffracts the p-polarized blue bandwidth component of light 514. This diffracted light transmits through optical element 480*c* without substantial alteration to emerge from back surface 352 as diffracted p-polarized blue bandwidth light 444. The remaining components of light 514 transmit through optical elements 480*b* and 480*c* without substantial alteration to emerge from back surface 352 as illumination light 440. Illumination light 440 comprises p-polarized green bandwidth light.

Figure 31A:
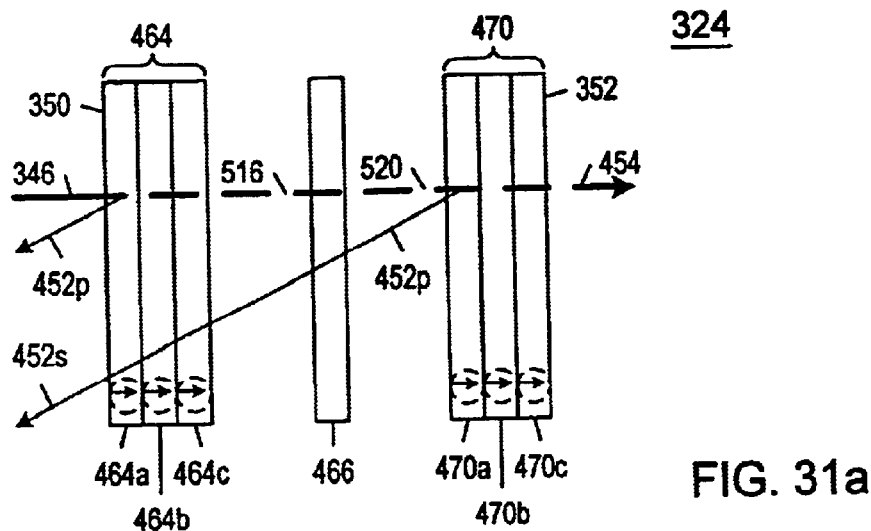
FIGS. 31a–31c show operational aspects of the reflective-type solid-state optical filter shown in FIG. 24a operating in the additive mode.
Figure 31B:
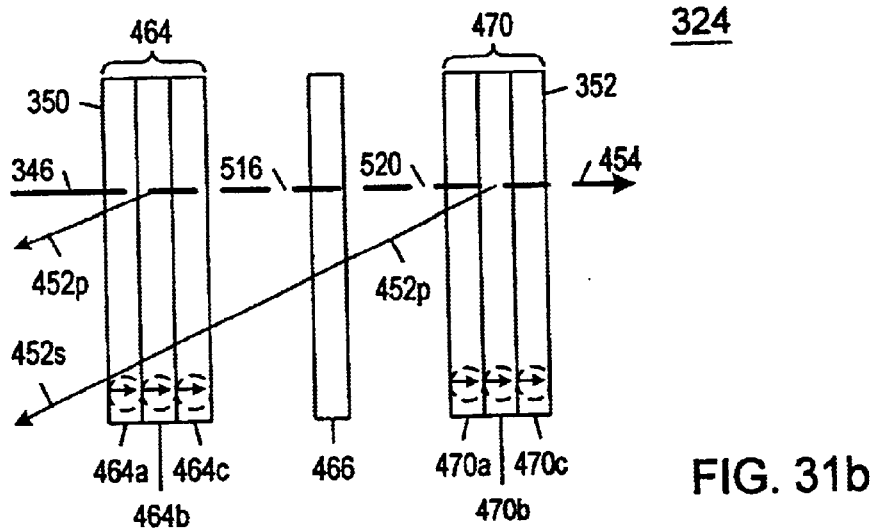
Figure 31C:
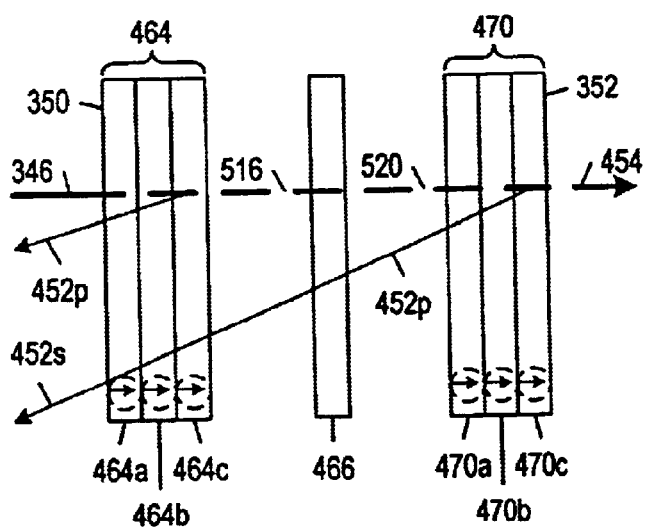

FIGS. 31*a*–31*c* illustrate operational aspects of one embodiment of a reflective-type solid-state optical filter 324 shown in FIG. 24*a*. Filter 324 illustrated in FIGS. 31*a*–31*c* may find application in the illumination system 320 shown in FIG. 23*a*. As such, optical filter 324 of FIGS. 31*a*–31*c* will be described with reference to FIG. 23*a* with common reference numbers used therein. The solid-state optical filter 324 illustrated in FIGS. 31*a*–31*c* operates in the additive mode. More particularly, in the additive mode, filter control circuit 328 activates one of the three electrically switchable holographic optical elements in each group 464 and 470 while deactivating the remaining elements.

First group 464 comprises reflective-type electrically switchable holographic optical elements 464*a*–464*c*, while the second group 470 includes reflective-type electrically switchable holographic elements 470*a*–470*a*. In this embodiment, each holographic optical element 464*a*–464*c* and 470*a*–470*c* is sensitive to a distinct bandwidth of p-polarized light as indicated by the horizontal arrows encircled by dashed lines.

FIG. 31*a* shows solid-state optical filter 324 just after filter control circuit 328 activates optical elements 464*a* and 470a, and deactivates the remaining optical elements 464b, 464c, 470b, and 470c. In this configuration, activated optical element 464a diffracts the p-polarized red bandwidth component of the collimated white light 346 received on front surface 350. This diffracted light emerges from front surface 350 as diffracted p-polarized red bandwidth illumination light 452p. Thus, light 452p emerges from the same surface that receives collimated white light 346. The remaining portions of collimated white light 346, including the s-polarized red bandwidth component, transmit through activated optical element 464a without substantial alteration, and emerge therefrom as light 516. Additionally, light 516 passes through de-activated optical elements 464b and 464c without substantial alteration. Light 516 includes the s-polarized red bandwidth component of collimated white light 346. Light 516 is then polarization rotated upon passing through polarization rotator 466 and emerges therefrom as light 520. Light 520 now includes a p-polarized red bandwidth component that is the result of rotating the s-polarized red bandwidth component of light 516. Activated optical element 470a diffracts the p-polarized red bandwidth component of light 520 which emerges therefrom as diffracted p-polarized red bandwidth light 452p. This diffracted light transmits through polarization rotator 466 and is rotated into diffracted s-polarized red bandwidth illumination light 452s. Finally, diffracted s-polarized red bandwidth illumination light 452s passes through the first group of optical elements 464 without substantial alteration and emerges from front surface 350 thereof. The remaining components of light 520 passes through activated optical element 470a and deactivated optical elements 470b and 470c without substantial alteration to emerge from back surface 352 as non-diffracted light 454. Non-diffracted light 454 includes randomly polarized blue and green bandwidth components.

FIG. 31b illustrates the solid-state optical filter 324 shown in FIG. 31a just after filter control circuit 328 activates holographic optical elements 464b and 470b, and deactivates holographic optical elements 464a and 470a. In FIG. 31b, collimated white light 354 passes through deactivated optical element 464a without substantial alteration. Activated optical element 464b, in turn, diffracts the p-polarized blue bandwidth component of collimated light 346. This diffracted light emerges from front surface 350 as diffracted p-polarized blue bandwidth illumination light 452p after passing through de-activated optical element 464a without substantial alteration. Activated optical element 464b and inactive optical element 464c transmit the remaining portions 516 of collimated light 346 without substantial alteration. This light 516 emerges from first optical group 464 and includes the s-polarized blue bandwidth component of collimated white light 346. Light 516 is polarization rotated by polarization rotator 466 and emerges therefrom as light 520. Light 520 now includes p-polarized blue bandwidth light. Inactive optical element 470a transmits light 520 without substantial alteration. Activated optical element 470b, however, diffracts the p-polarized blue bandwidth component of light 520. This diffracted light passes through optical element 470a without substantial alteration and emerges therefrom as diffracted p-polarized blue bandwidth light 452p. Light 452p passes through polarization rotator 466, and is polarization rotated into diffracted s-polarized blue bandwidth illumination light 452s which, in turn, transmits through first optical group 464 without substantial alteration to emerge from front surface 350. The remaining components of light 520 transmit through optical elements 470b and 470c without substantial alteration to emerge from back surface 352 as non-diffracted light 454. Non-diffracted light 454 includes randomly polarized red and green bandwidth light.

FIG. 31c shows the solid-state optical filter 324 of FIG. 31b just after filter control circuit 328 (not shown) activates optical elements 464c and 470c and deactivates optical elements 464b and 470b. In this configuration, collimated white light 346 received on front surface 350 passes through inactive optical elements 464a and 464b without substantial alteration. Activated optical element 464c diffracts the p-polarized blue bandwidth component of collimated white light 346. This diffracted light passes back through inactive optical elements 464a and 464b without substantial alteration to emerge from front surface 350 as diffracted p-polarized green bandwidth illumination light 452p. The remaining components of collimated white light 346 pass through activated optical element 464c without substantial alteration and emerge from first group 464 as light 516. Light 516 includes the s-polarized green bandwidth light component of collimated light 346. Light 516 passes through polarization rotator 466, and emerges as rotated light 520, which now includes p-polarized green bandwidth light. Rotated light 520 passes through inactive optical elements 470a and 470b substantially unaltered. Activated optical element 470c, however, diffracts the p-polarized green bandwidth component of rotated light 520. The diffracted p-polarized green bandwidth light 452p passes back through optical elements 470a and 470b without substantial alteration. Diffracted p-polarized green bandwidth light 452p also passes through polarization rotator 466 and emerges therefrom as diffracted s-polarized green bandwidth illumination light 452s, which, in turn, passes through the first group of optical elements 464 without substantial alteration to emerge from front surface 350. The remaining components of rotated light 520 pass through activated optical element 470c without substantial alteration to emerge as non-diffracted light 454. Non-diffracted light 454 includes randomly polarized red and blue bandwidth light.

Figure 32A:
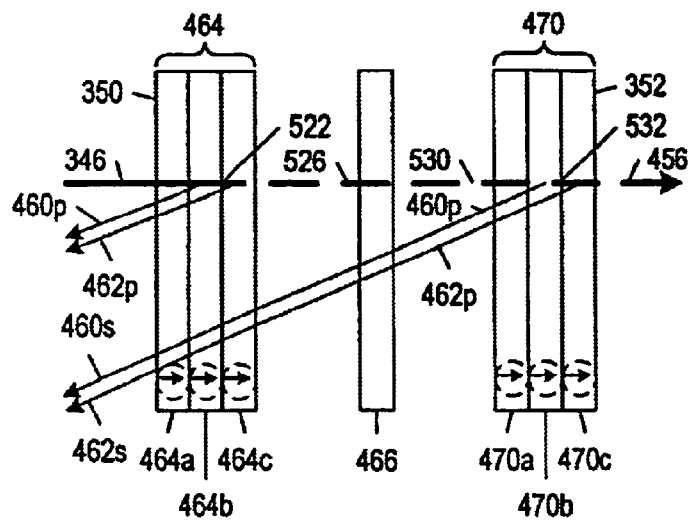
FIGS. 32a–32c show operational aspects of the reflective-type solid-state optical filter shown in FIG. 24a operating in the subtractive mode.
Figure 32B:
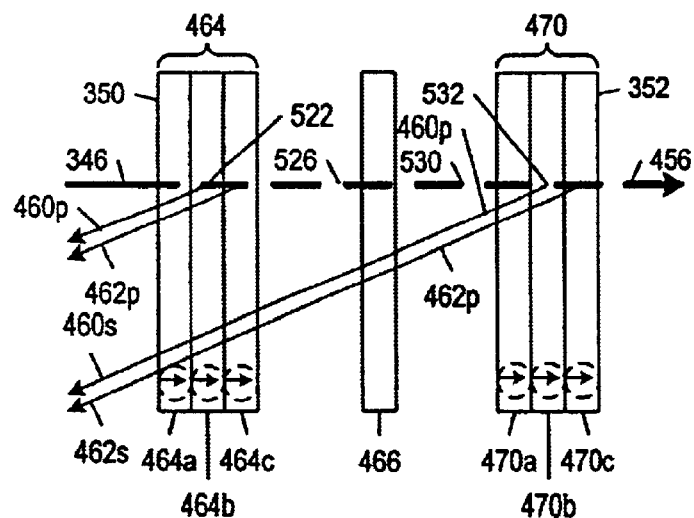
Figure 32C:
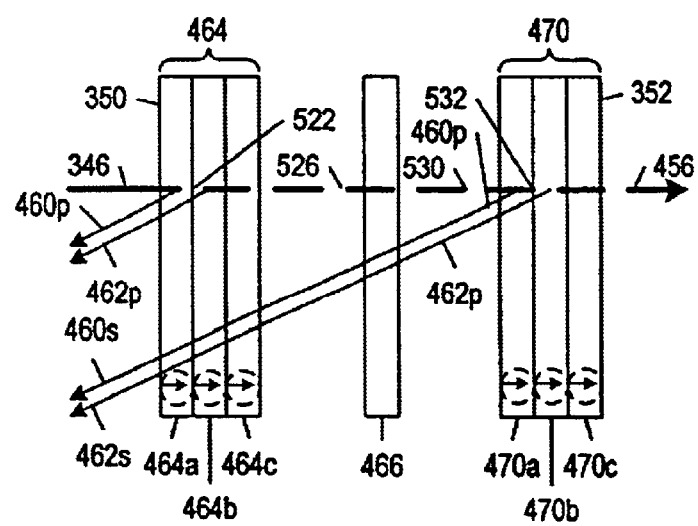

FIGS. 32a–32c illustrate the reflective-type solid-state filter 324 shown in FIGS. 31a–31c operating in the subtractive mode with filter output exiting through the back end 352 of the filter 324. The filter 324 shown in FIGS. 32a–32c may find application in the illumination system 320 shown in FIG. 23a. As such, optical filter 324 of FIGS. 32a–32c will be described with reference to FIG. 23a with common reference numbers used therein.

In FIG. 32a, filter control circuit 328 (not shown) activates holographic optical elements 464b, 464c, 470b, and 470c, and deactivates optical elements 464a and 470a. In this configuration, collimated white light 346 received on front surface 350 transmits through inactive optical element 464a without substantial alteration. Activated optical element 464b diffracts the p-polarized blue bandwidth component of collimated white light 346. This diffracted light passes back through inactive optical element 464a without substantial alteration to emerge from front surface 350 as diffracted p-polarized blue bandwidth light 460p. The remaining components of collimated white light 346, including the s-polarized blue bandwidth component, pass through activated optical element 464b without substantial alteration and emerge therefrom as light 522. Activated optical element 464c diffracts the p-polarized green bandwidth component of light 522. This diffracted light passes back through optical elements 464a and 464b without substantial alteration to emerge from front surface 350 as diffracted p-polarized green bandwidth light 462p. The remaining components of light 522 pass through activated optical element 464c without substantial alteration and emerge as light 526. It is noted that light 526 includes randomly polarized red bandwidth light of collimated white light 346 in addition to the p-polarized blue and green bandwidth components of collimated white light 346. Light 526 passes through polarization rotator 466 and emerges as rotated light 530. Light 530 includes randomly polarized red bandwidth light, in addition to p-polarized green and blue bandwidth light. Rotated light 530 passes through inactive optical element 470a without substantial alteration. Activated optical element 470b diffracts the p-polarized blue bandwidth component of rotated light 530. This diffracted light passes back through optical element 470a without substantial alteration and emerges as diffracted p-polarized blue bandwidth light 460p. Diffracted p-polarized blue bandwidth light 460p is subsequently rotated by rotator 466 into diffracted s-polarized blue bandwidth light 460s, which, in turn, passes through the first group of optical elements 464 without substantial alteration to emerge from the front surface 350 thereof. The remaining components of rotated light 530 pass through activated optical element 470b without substantial alteration to emerge therefrom as light 532. Activated optical element 470c diffracts the p-polarized green bandwidth component of light 532. Diffracted p-polarized green bandwidth light 462p passes back through optical elements 470a and 470b without substantial alteration. Diffracted p-polarized green bandwidth light 462p is then rotated into diffracted s-polarized green bandwidth light 462s after passing through rotator 466. Diffracted s-polarized green bandwidth light 462s passes through the first group 464 without substantial alteration to emerge from the front surface 350. The remaining components of light 532 pass through activated optical element 470c without substantial alteration to emerge from back surface 352 as illumination light 456; illumination light 456 includes randomly polarized red bandwidth light.

FIG. 32b shows the solid-state optical filter 324 of FIG. 32a just after filter control circuit 328 activates optical elements 464a and 470a, and deactivates optical elements 464b and 470b. Activated optical element 464a diffracts the p-polarized red bandwidth component of collimated white light 346 received on front surface 350. This diffracted light emerges from the front surface 350 as diffracted p-polarized red bandwidth light 460p. The remaining components of collimated white light 346 pass through optical element 464b without substantial alteration and emerge therefrom as light 522. Activated optical element 464c diffracts the p-polarized green bandwidth component of light 522. This diffracted light travels back through optical elements 464a and 464b without substantial alteration to emerge from front surface 350 as diffracted p-polarized green bandwidth light 462p. The remaining components of light 522 pass through activated optical element 464c and emerge therefrom as light 526. Polarization rotator 466 rotates light 526 into light 530. Light 530 includes randomly polarized blue bandwidth light in addition to p-polarized red and green bandwidth light. Activated optical element 470a diffracts the p-polarized red bandwidth component of light 530. This diffracted p-polarized red bandwidth light passes back through polarization rotator 466, and emerges therefrom as diffracted s-polarized red bandwidth light 460s. Additionally, diffracted s-polarized red bandwidth light 460s passes through each optical element of first group without substantial alteration and emerges from front surface 350 thereof. The remaining components of light 530 transmit through activated optical element 470a and 470b without substantial alteration to emerge from optical element 470b as light 532. Activated optical element 470c diffracts the p-polarized green bandwidth component of light 532. Diffracted p-polarized green bandwidth light 462p passes back through optical elements 470a and 470b without substantial alteration. Diffracted p-polarized green bandwidth light 462p also passes through polarization rotator 466 where it is rotated into diffracted s-polarized green bandwidth light 462s. This light, in turn, passes through first optical group 464 without substantial alteration to emerge from front surface 350. The remaining components of light 532 pass through activated optical element 470c without substantial alteration to emerge from back surface 352 as illumination light 456; illumination light 456 essentially constitutes randomly polarized blue bandwidth light.

FIG. 32c shows the solid-state filter 324 of FIG. 32b just after filter control circuit 328 activates optical elements 464b and 470b, and deactivates optical elements 464c and 470c. In this configuration, the p-polarized red bandwidth component of collimated white light 346 is diffracted by activated optical element 464a. This diffracted light emerges from front surface 350 as diffracted p-polarized red bandwidth light 460p. The remaining components of collimated white light 346 pass through activated optical element 464a without substantial alteration to emerge therefrom as light 522. Activated optical element 464b diffracts the p-polarized blue bandwidth component of light 522. This diffracted light travels back through optical element 464a without substantial alteration to emerge from front surface 350 as p-polarized blue bandwidth component 462p. The remaining components of light 522 pass through optical elements 464b and 464c without substantial alteration to emerge as light 526. Polarization rotator 466 rotates light 526 to produce rotated light 530 which includes randomly polarized green bandwidth light, in addition to p-polarized red and blue bandwidth light. Activated optical element 470a diffracts the p-polarized red bandwidth component of light 530. This p-polarized red bandwidth component light diffracted by optical element 470a passes back through polarization rotator 466 and emerges therefrom as diffracted s-polarized red bandwidth light 460s. Diffracted s-polarized red bandwidth light 460s passes through the optical elements of first group 464 without substantial alteration to emerge from front surface 350. The remaining components of rotated light 530 pass through activated optical element 470a to emerge as light 532. Activated optical element 470b diffracts the p-polarized blue bandwidth component of light 532. This p-polarized blue bandwidth component diffracted by optical element 470b travels back through optical element 470a without substantial alteration. The diffracted p-polarized blue bandwidth component is then rotated into diffracted s-polarized blue bandwidth light 462s by rotator 466 prior to passing through the optical elements of first group 464 without substantial alteration. Diffracted s-polarized blue bandwidth light 462s emerges from front surface 350 thereof. The remaining components of light 532 pass through activated optical elements 470b and 470c without substantial alteration to emerge from back surface 352 as illumination light 456; illumination light 456 includes randomly polarized green bandwidth light.

Figure 33A:
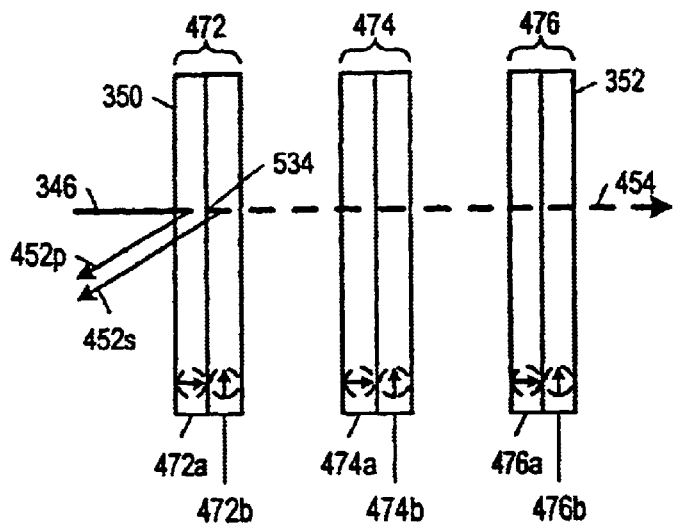
FIGS. 33a–33c show operational aspects of the transmissive-type solid-state filter of FIG. 24b operating in the additive mode.
Figure 33B:
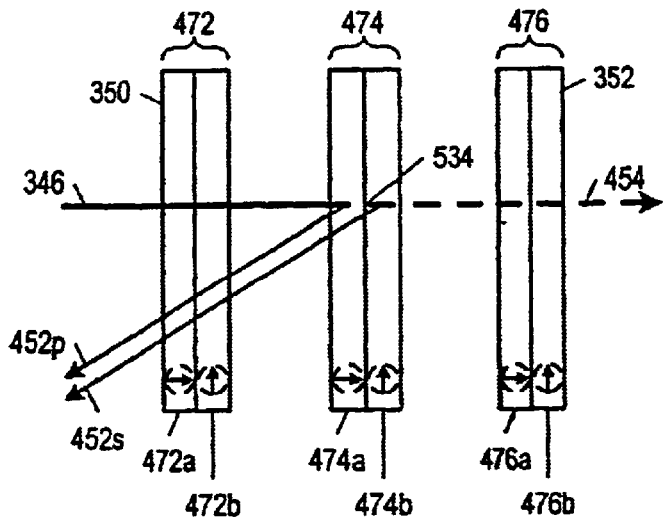
Figure 33C:
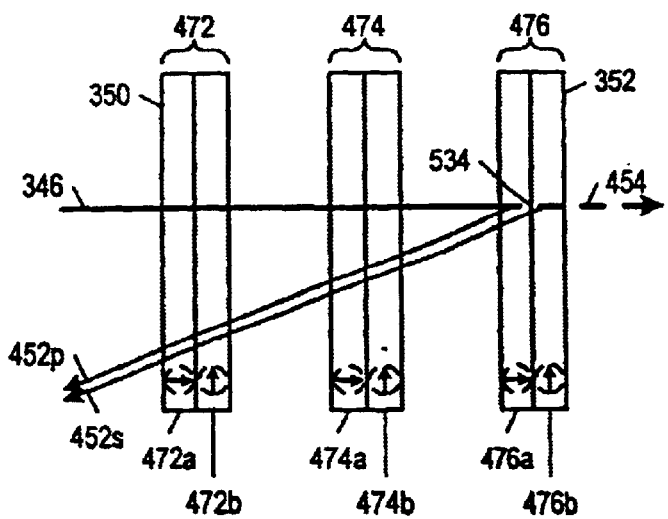

FIGS. 33a–33c show one embodiment of a reflective-type solid-state optical filter 324 shown in FIG. 24b. The optical filter shown in FIGS. 33a–33c may find application in the illumination system 320 shown in FIG. 23a. As such, optical filter 324 of FIGS. 33a–33c will be described with reference to FIG. 23a with common reference numbers used therein. The solid-state optical filter 324 illustrated in FIGS. 33a–33c operates in the additive mode. More particularly, in the additive mode, filter control circuit 328 (not shown) activates each of the electrically switchable holographic optical elements of one of the three groups of optical elements 472, 474 and 476 while deactivating the remaining optical elements. In FIGS. 33a–33c, each group 472, 474 and 476 includes a pair of reflective type electrically switchable holographic optical elements. The optical elements of each group 472, 474, and 476 have reflective gratings that are disposed orthogonal to one another. As a result, for example, optical element 472a is configured to diffract p-polarized red bandwidth light and transmit s-polarized red bandwidth light substantially unaltered, while optical element 472b is configured to diffract s-polarized red bandwidth light while transmitting p-polarized red bandwidth light without substantial alteration. The horizontal and vertical arrows encircled by a dashed line shown in FIGS. 33a–33c indicate the polarization sensitivity of the optical elements in each group, the horizontal arrows corresponding to p-polarization sensitivity and the vertical arrows corresponding to s-polarization sensitivity.

FIG. 33a shows reflective-type solid-state filter 324 just after filter control circuit 328 activates the optical elements of first group 472. In this configuration, activated optical element 472a diffracts the p-polarized red bandwidth component of collimated white light 346. The light diffracted by optical element 472a emerges from front surface 350 of solid-state optical filter 324 as diffracted p-polarized red bandwidth illumination light 452p. The remaining components of collimated white light 346 pass through activated optical element 472a without substantial alteration and emerge therefrom as light 534. Activated optical element 472b diffracts the s-polarized red bandwidth component of light 534. The light diffracted by optical element 472b passes back through activated optical element 472a to emerge from front surface 350 as diffracted s-polarized red bandwidth light illumination 452s. The remaining components of light 534 pass through optical element 472b, second group 474, and third group 476 without substantial alteration to emerge from back surface 352 as non-diffracted light 454. Non-diffracted illumination light 454 in FIG. 33a essentially constitutes randomly polarized blue and green components of the original collimated white light 346.

FIG. 33b illustrates operational aspects of the solid-state filter 324 of FIG. 33a just after filter control circuit 328 activates the optical elements of groups 474 and deactivates the optical elements of group 472. In this configuration, collimated white light 346 passes through the optical elements of group 472 without substantial alteration. Activated optical element 474a, however, diffracts the p-polarized blue bandwidth component of collimated light 346. The light diffracted by optical element 474a passes back through the optical elements of group 472 without substantial alteration to emerge from front surface 350 as diffracted p-polarized blue bandwidth illumination light 452p. The remaining portions of collimated white light 346 pass through activated optical element 474a without substantial alteration and emerge as light 534. Activated optical element 474b diffracts the s-polarized blue bandwidth component of light 534. Light diffracted by optical element 474b transmits back through activated optical element 474a and the optical elements of 472 without substantial alteration to emerge from front surface 350 as diffracted s-polarized blue bandwidth illumination light 452s. The remaining components of light 534 pass through activated optical element 474b and the optical elements of group 476 without substantial alteration to emerge from back surface 352 as non-diffracted light 454. Non-diffracted illumination light 454 in FIG. 33b essentially constitutes randomly polarized red and green components of the original collimated white light 346.

FIG. 33c shows the operational aspects of the solid-state optical filter 324 of FIG. 33b just after filter control circuit 328 activates the optical elements of group 476 and deactivates the optical elements of group 474. In this configuration, collimated white light 346 passes through the optical elements of groups 472 and 474 without substantial alteration. However, activated optical element 476a diffracts the p-polarized green bandwidth component of collimated white light 346. The light diffracted by optical element 476a transmits back through the optical elements of groups 472 and 474 without substantial alteration to emerge from front surface 350 as diffracted p-polarized green bandwidth illumination light. The remaining components of collimated white light 346 pass through activated optical element 472a without substantial alteration to emerge therefrom as light 534. Activated optical element 476b diffracts the s-polarized green bandwidth components of light 534. The light diffracted by optical element 476b transmits back through the optical element 476a, group 472, and group 474 without substantial alteration to emerge from front surface 350 as diffracted s-polarized green bandwidth illumination light. The remaining components of light 534 pass through activated optical element 476b to emerge from back surface 352 as non-diffracted light 454. Non-diffracted light 454 essentially constitutes the randomly polarized red and blue bandwidth components of collimated white light 346.

Figure 34A:
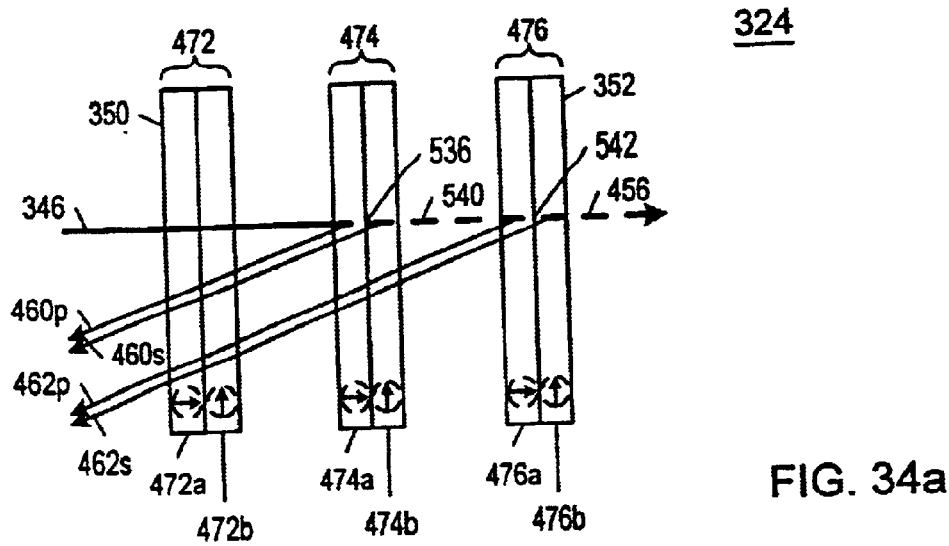
FIGS. 34a–34c show operational aspects of the reflective-type solid-state optical filter shown in FIG. 24b operating in the subtractive mode.
Figure 34B:
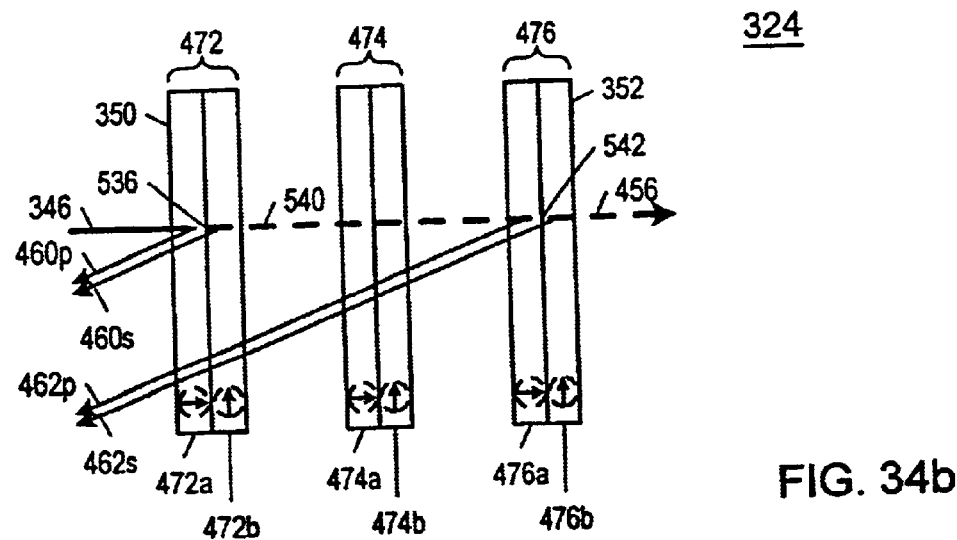
Figure 34C:
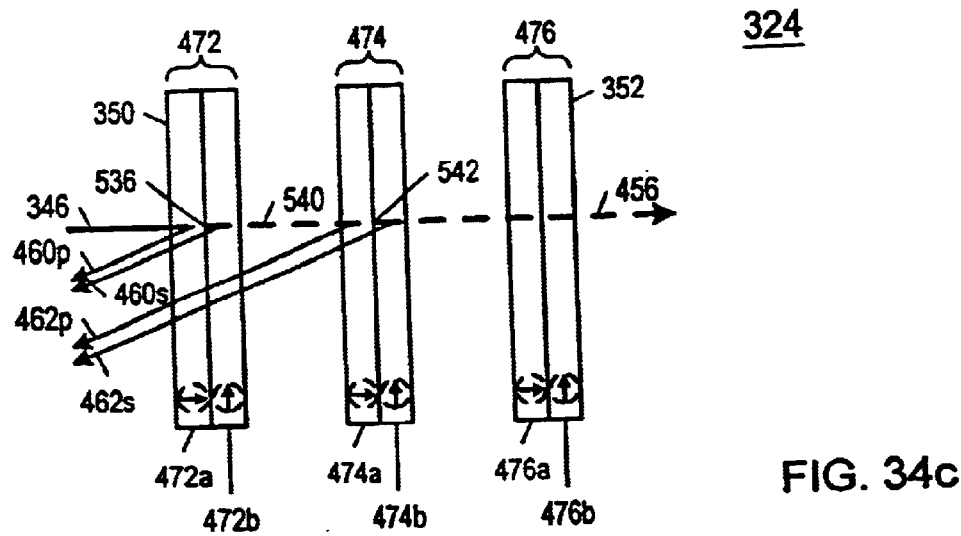

FIGS. 34a–34c illustrate the reflective-type solid-state optical filter 324 of FIGS. 33a–33c operating in the subtractive mode with the filter output exiting the back surface 352 of filter 324. In this mode, filter control circuit activates each of the optical elements in two of the three groups of optical elements 472, 474, and 476. Filter 324 shown in FIGS. 34a–34c may find application in the illumination system 320 shown in FIG. 23a. As such, optical filter 324 of FIGS. 33a–33c will be described with reference to FIG. 23a with common reference numbers used therein.

FIG. 34a shows optical filter 324 just after control circuit 328 activates the optical elements of groups 474 and 476, and deactivates the optical elements of group 472. In this configuration, collimated white light 346 transmits through the optical elements of group 472 without substantial alteration. Activated optical element 474a diffracts the p-polarized blue bandwidth component of collimated white light 346. The light diffracted by optical element 474a passes back through the optical elements of group 472 without substantial alteration to emerge from front surface 350 as diffracted p-polarized blue bandwidth light 460p. The remaining components of collimated white light 346 emerge from activated optical element 474a without substantial alteration as light 536. Activated optical-element 474b diffracts the s-polarized blue bandwidth component of light 536. The light diffracted by optical element 474b transmits back through optical element 474a and the optical elements of group 472 without substantial alteration to emerge from front surface 350 as diffracted s-polarized blue bandwidth light 460s. The remaining components of light 536 pass through optical element 474b without substantial alteration to emerge therefrom as light 540. Activated optical element 476a diffracts the p-polarized green bandwidth component of light 540. The light diffracted by optical element 476a passes back through the optical elements of groups 474 and 472 without substantial alteration to emerge from front surface 350 as diffracted p-polarized green bandwidth light 462p. The remaining components of light 540 pass through activated optical element 476a without substantial alteration and emerge therefrom as light 542. Activated optical element 476b diffracts the s-polarized green bandwidth component of light 542. The light diffracted by optical element 476b passes back through optical element 476a and the optical elements of groups 474 and 472 without substantial alteration to emerge from front surface 350 as diffracted s-polarized green bandwidth light 462s. The remaining components of light 542 pass through activated optical element 476b without substantial alteration to emerge from back surface 352 as illumination light 456. Illumination light 456 essentially constitutes the randomly polarized red bandwidth component of white collimated light 346.

FIG. 34b shows the solid-state optical filter 324 of FIG. 34a just after filter control circuit 328 deactivates the optical elements of group 474 and activates the optical elements of group 472. In this configuration, activated optical element 472a diffracts the p-polarized red bandwidth component of collimated white light 346. The light diffracted by optical element 472a emerges, from front surface 350 as diffracted p-polarized red bandwidth light 460p. The remaining components of collimated white light 346 transmit through activated optical element 472a without substantial alteration and emerge therefrom as light 536. Activated optical element 472b diffracts the s-polarized red bandwidth component of light 536. The light diffracted by optical element 472b transmits back through activated optical element 472a to emerge from front surface 350 as diffracted s-polarized red bandwidth light 460s. The remaining components of light 536 transmit through activated optical element 472b without substantial alteration to emerge as light 540. Light 540, in turn, passes through the optical elements of group 474 without substantial alteration. Activated optical element 476a diffracts the p-polarized green bandwidth component of light 540. The light diffracted by optical element 476a transmits back through the optical elements of groups 474 and 472 without substantial alteration to emerge from front surface 350 as diffracted p-polarized green bandwidth light 462p. The remaining components of light 540 pass through activated optical element 476, and emerge therefrom as light 510. Activated optical element 476b diffracts the s-polarized green bandwidth component of light 510. The light diffracted by optical element 476b transmits back through optical element 476a and the optical elements of groups 474 and 472 without substantial alteration to emerge from front surface 350 as diffracted s-polarized green bandwidth light 462s. The remaining components of light 542 pass through optical element 476b without substantial alteration to emerge from back surface 352 as illumination light 456. Illumination light 456 essentially constitutes the randomly polarized blue bandwidth component of collimated white light 346.

FIG. 34c shows the solid-state filter 324 of FIG. 34b just after control circuit 328 deactivates the optical elements of group 476 and activates the optical elements of group 474. In this configuration, activated optical element 472a diffracts the p-polarized red bandwidth component of collimated white light 346. The light diffracted by optical element 472a emerges from front surface 350 as diffracted p-polarized red bandwidth light 460p. The remaining components of collimated white light 346 transmit through activated optical element 472a without substantial alteration and emerge therefrom as light 536. Activated optical element 472b diffracts the s-polarized red bandwidth component of light 536. The light diffracted by optical element 472b transmits back through activated optical element 472a to emerge from front surface 350 as diffracted s-polarized red bandwidth light 460s. The remaining components of light 536 transmit through activated optical element 472b without substantial alteration to emerge as light 540. Activated optical element 474a diffracts the p-polarized blue bandwidth component of light 540. The light diffracted by optical element 474a passes back through the optical elements of group 472 without substantial alteration to emerge from front surface 350 as diffracted p-polarized blue bandwidth light 462p. The remaining components of light 540 pass through activated optical element 474a without substantial alteration to emerge therefrom as light 542. Activated optical element 474b diffracts the s-polarized blue bandwidth component of light 542. The light diffracted by optical element 474b transmits back through optical element 474a and the optical elements of group 472b without substantial alteration to emerge from front surface 350 as diffracted s-polarized blue bandwidth light 462s. The remaining components of light 542 pass through optical elements 474b and the optical elements of group 476 to emerge as illumination light 456. Illumination light 456, in this embodiment, essentially constitutes the randomly polarized green bandwidth light of collimated white light 346.

The solid-state optical filter 324 illustrated in FIGS. 33a–33c and FIGS. 34a–34c can be modified by placing a blue/green holographic optical element between groups 472 and 474 in order to broaden the spectral bandwidth of optical filter 324. This additional blue/green component is not shown in the figures. These filters generate red, green, and blue primary colors by activating the two red optical elements to give the red primary, the two green optical elements plus the added blue/green optical element to give the green primary, and the two blue optical elements plus the added blue/green optical element to give the blue primary color.

The solid-state optical filters described above can be operated in either the additive or subtractive modes. In the additive mode of operation, illumination light, for illuminating a monochrome image is generated using diffracted light. In the subtractive mode, illumination light is generated using zero-ordered non-diffracted light. White light can be outputted by the solid-state optical filters described above by deactivating all of the internal electrically switchable holographic optical elements. Filters operating in the additive mode might offer higher efficiency, better color gamut and contrast. However, filters operating in the additive mode may suffer from dispersion due to the relative large spectral band passes that may be required. Filters operating in the additive mode, in one embodiment, might require chromatic correction by using additional diffractive elements. Filters operating in the subtractive mode, on the other hand, may require careful optimization to ensure adequate color gamut and contrast. However, since diffracted light is rejected in filters operating in the subtractive mode, dispersion may not present a problem. Filters operating in the subtractive mode may give the best white light throughput.

As for any Bragg hologram, the spectral bandwidth is a function of the hologram geometry and the material parameters. The bandwidth can be tuned to give high diffractive efficiency over the broad bandwidths required for illumination filters 324. When it is necessary to reduce the spectral bandwidth, it may be possible to use the properties of Bragg holograms to construct very narrow band high-efficiency filters 324.

The total stray light reflected back from the solid-state optical filter 324, and arising from specular reflections of non-Bragg diffracted light at refracted index interfaces, can be reduced using antireflective coatings.

Figure 36A:
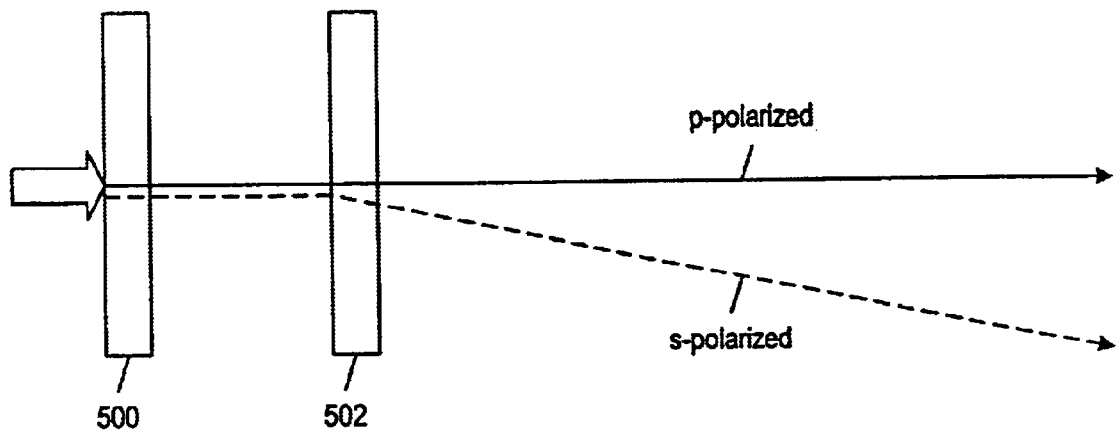
FIGS. 36a–36b show a plan view and a side view, respectively, of operational aspects of holographic optical elements.
Figure 36B:
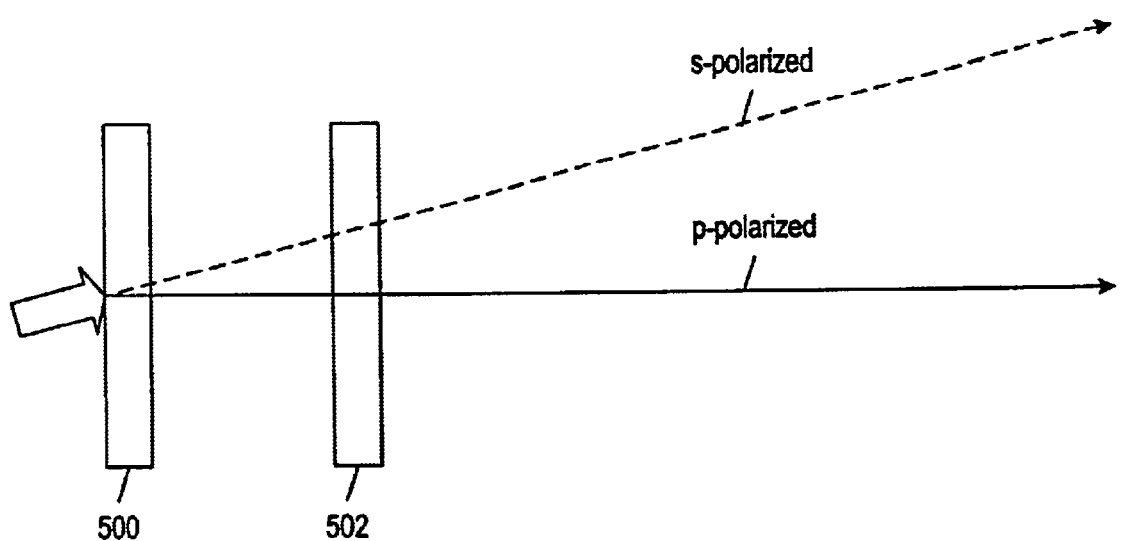

In FIGS. 24b, 27a–c, 28a–c, 33a–c and 3a–c, the s-polarized and p-polarized output beams may diverge from each other upon exiting the filter. FIGS. 36a and 36b illustrate this principle and show a plan view and side view, respectively, of a pair of holographic optical elements 500 and 502. Holographic optical element 500 is configured such that the p-component of the incident beam diverges in the plane of the drawing. The second holographic optical element (which has a grating orientated such that the s-component looks like p-component light) may cause the s-light to be deflected into or out of the plane of the drawing. If the output beams of FIGS. 24b, 27a–c, 28a–c, 33a–c and 34a–c diverge, such as shown in FIGS. 36a and 36b, additional optical components, conventional or switchable holographic, may be needed to place the output beams of the filters in parallel with each other.

The bandwidth sensitivity of each of the electrically switchable holographic optical elements in filters 324 described above, in addition to the angular range over which light is emitted, may depend upon the parameters of the hologram in layer 490 shown in FIG. 35. In particular, the wavelength bandwidths may depend upon the refractive index modulation (which is typically 0.02–0.06), the thickness of the hologram layer 490 (typically 5–12 microns), and the beam geometry incident thereon.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

We claim:

1. An apparatus comprising:
   a first holographic optical element having front and back oppositely facing surfaces, wherein the first holographic optical element is switchable between active and inactive states, wherein the first optical element diffracts first bandwidth light incident on the front surface thereof when operating in the active state, wherein first bandwidth light diffracted by the first holographic optical element emerges from the back surface thereof, and wherein the first holographic optical element transmits first bandwidth light incident on the front surface thereof without substantial alteration when operating in the inactive state;
   a second holographic optical element having front and back oppositely facing surfaces, wherein the second holographic optical element is switchable between active and inactive states, wherein the second holographic optical element diffracts first bandwidth light incident on the front surface thereof when operating in the active state, wherein first bandwidth light diffracted by the second holographic optical element emerges from the back surface thereof, and wherein the second holographic optical element transmits first bandwidth light without substantial alteration when operating in the inactive state;
   a display device coupled to an image signal processor, wherein the display device is configured to display a monochrome image frame in response to receiving a frame of image signals generated by the image signal processor;
   wherein the display device is configured to be illuminated directly or indirectly with diffracted first bandwidth emitted from the first and second holographic optical elements;
   wherein the first and second holographic optical elements are positioned adjacent each other;
   wherein the front surfaces of the first and second holographic optical elements are aligned orthogonal to a common axis so that the back surface of the first holographic optical element faces the front surface of the second holographic optical element.

2. The apparatus of claim 1 further comprising a polarization rotation device positioned between the first and second holographic optical elements, wherein each of the first and second holographic optical elements comprise a diffraction grating, wherein the first and second holographic optical elements are configured so that the diffraction gratings thereof are disposed parallel to each other.

3. The apparatus of claim 1 wherein the first holographic optical element comprises a first diffraction grating, wherein the second holographic optical element comprises a second grating, and wherein the first and second holographic optical elements are configured so that the first diffraction grating is disposed orthogonal to the second diffraction grating.

4. The apparatus of claim 1 further comprising a polarization rotation device positioned adjacent the front surface of the first holographic optical element, wherein the front surfaces of the first and second holographic optical elements are substantially contained in one common plane.

5. The apparatus of claim 2 wherein the first and second holographic optical elements are configured to diffract first bandwidth light in a first plane of polarization when operating in the active state, and wherein the first and second holographic optical elements are configured to transmit first bandwidth light in a second plane of polarization without substantial alteration when operating in the inactive state, wherein the first plane of polarization is orthogonal to the second plane of polarization.

6. The apparatus of claim 3 wherein the first and second holographic optical elements are configured to diffract first bandwidth light in a first plane of polarization and second bandwidth light in a second plane of polarization, respectively, when operating in the active state, wherein the first and second holographic optical elements are configured to transmit first bandwidth light in the second plane of polarization and second bandwidth light in the first plane of polarization, respectively, without substantial alteration when operating in the inactive state, wherein the first plane of polarization is orthogonal to the second plane of polarization.

7. The apparatus of claim 1 further comprising a control circuit coupled to the first and second holographic optical elements, wherein the first and second holographic optical elements switch between active and inactive states in response to control signals generated by the control circuit.

8. The apparatus of claim 7, wherein the first and second holographic optical elements simultaneously operate in the active state in response to an activation control signal generated by the control circuit, and wherein the first and second holographic optical elements simultaneously operate in the inactive state in response to a deactivation control signal generated by the control circuit.

9. The apparatus of claim 1 wherein diffracted first bandwidth light is emitted from the back surface of the first holographic optical element in a direction that is substantially similar to a direction of diffracted first bandwidth light emitted from the back surface of the second holographic optical element.

10. The apparatus of claim 1 further comprising:
    a light source for generating incoherent light;
    a light condenser positioned adjacent the light source and configured to condense incoherent light generated by the light source into a parallel beam of incoherent light;

wherein the front surface of the first holographic optical element is configured to receive the parallel beam of incoherent light.

11. The apparatus of claim 1 further comprising:
a light source for generating incoherent light;
a light condenser positioned adjacent the light source and configured to condense the incoherent light generated by the light source into a parallel beam of incoherent light;
a beam splitting cube positioned adjacent the condenser and the second holographic optical element, wherein the beam splitting cube is configured to receive and split the parallel beam of incoherent light into first and second parallel beams of light, wherein the first and second parallel beams of light are contained in orthogonal planes of polarization, wherein the beam splitting cube is configured to deflect the second parallel beam of light onto the front surface of the second holographic optical element, and wherein the beam splitting cube is configured to pass the first parallel beam of light without substantial deflection;
a total internal reflection prism positioned adjacent the beam splitting cube and the polarization rotation device, wherein the total internal reflection prism is configured to receive the first parallel beam of light, wherein the total internal reflection prism is configured to deflect received first parallel light onto the polarization rotation device.

12. The apparatus of claim 1 wherein the first holographic optical element is formed from polymer dispersed liquid crystal material.

13. The apparatus of claim 1 wherein the second holographic optical element is formed from polymer dispersed liquid crystal material.

14. The apparatus of claim 1 wherein the first and second holographic optical elements are formed from polymer dispersed liquid crystal material which undergoes phase separation during a hologram recording process to create regions populated by liquid crystal droplets and to create regions of clear photopolymer interspersed by regions populated by liquid crystal droplets.

15. The apparatus of claim 1 wherein each of the first and second holographic optical elements comprises a volume phase hologram recorded in a holographic recording medium.

16. The apparatus of claim 1 further comprising a control circuit and a voltage source, wherein the control circuit is configured to selectively couple the voltage source to the first and second holographic optical elements, wherein the first and second holographic optical elements operate in the inactive state when coupled to the voltage source, and wherein the first and second holographic optical elements operate in the active state when coupled to the voltage source.

17. The apparatus of claim 1 wherein the first holographic optical element comprises a layer of material that records a hologram and at least one layer of electrically conductive material positioned adjacent the layer of material that records the hologram.

18. The apparatus of claim 1 wherein the first holographic optical element comprises a layer of material that records a hologram and a pair of layers of electrically conductive material, wherein the layer of material that records the hologram is contained between the pair of layers of electrically conductive material.

19. The apparatus of claim 1 wherein the second holographic optical element comprises a layer of material that records a hologram and at least one layer of electrically conductive material positioned adjacent the layer of material that records the hologram.

20. The apparatus of claim 3 wherein each of the first and second holographic optical elements comprises a layer of material that records a hologram, and wherein the layers of material that record holograms are contained between a pair of layers of electrically conductive material.

21. The apparatus of claim 17 further comprising a control circuit and a voltage source, wherein the control circuit is configured to selectively couple the at least one layer of electrically conductive material to the voltage source.

22. The apparatus of claim 13 further comprising a control circuit and a voltage source, wherein the control circuit is configured to selectively couple the at least one layer of electrically conductive material to the voltage source.

23. The apparatus of claim 17 wherein the at least one layer of electrically conductive material comprises indium tin oxide (ITO).

24. The apparatus of claim 13 wherein the at least one layer of electrically conductive material comprises indium tin oxide (ITO).

25. The apparatus of claim 17 wherein the at least one layer of electrically conductive material is configured to be selectively coupled to a voltage source, wherein the first holographic optical element operates in the inactive state when the at least one layer of electrically conductive material of the first holographic optical element is coupled to the voltage source, and wherein the first holographic optical element operates in the active state when the at least one layer of electrically conductive material of the first holographic optical element is not coupled to the voltage source.

26. The apparatus of claim 13 wherein the at least one layer of electrically conductive material is configured to be selectively coupled to a voltage source, wherein the second holographic optical element operates in the inactive state when the at least one layer of electrically conductive material of the second holographic optical element is coupled to the voltage source, and wherein the second holographic optical element operates in the active state when the at least one layer of electrically conductive material of the second holographic optical element is not coupled to the voltage source.

27. The apparatus of claim 1 further comprising:
a light source for generating incoherent light;
a light condenser positioned adjacent the light source and configured to condense incoherent light generated by the light source into a parallel beam of incoherent light;
a prism positioned adjacent the light condenser and the front surface of the first holographic optical element, wherein the prism is configured to deflect the parallel beam of incoherent light onto the front surface of the first holographic optical element.

28. The apparatus of claim 1 wherein the first holographic optical element comprises a holographic recording medium that records the hologram, wherein the holographic recording medium comprises:
a monomer dipentaerythritol hydroxypentaacrylate;
a liquid crystal;
a cross-linking monomer;
a coinitiator; and
a photoinitiator dye.

29. The apparatus of claim 1 wherein the first holographic optical element comprises a hologram made by exposing an interference pattern inside a polymer-dispersed liquid crystal material, the polymer-dispersed liquid crystal material comprising, before exposure:
- (a) a polymerizable monomer;
- (b) a liquid crystal;
- (c) a cross-linking monomer;
- (d) a coinitiator; and
- (e) a photoinitiator dye.

30. An apparatus comprising:

a first holographic optical element having front and back oppositely facing surfaces, wherein the first holographic optical element is switchable between active and inactive states, wherein the first optical element diffracts first bandwidth light incident on the front surface thereof when operating in the active state, wherein first bandwidth light diffracted by the first holographic optical element emerges from the front surface thereof, and wherein the first holographic optical element transmits first bandwidth light incident on the front surface thereof without substantial alteration when operating in the inactive state;

a second holographic optical element having front and back oppositely facing surfaces, wherein the second holographic optical element is switchable between active and inactive states, wherein the second holographic optical element diffracts first bandwidth light incident on the front surface thereof when operating in the active state, wherein first bandwidth light diffracted by the second holographic optical element emerges from the front surface thereof, and wherein the second holographic optical element transmits first bandwidth light without substantial alteration when operating in the inactive state;

a display device coupled to an image signal processor, wherein the display device is configured to display a monochrome image frame in response to receiving a frame of image signals generated by the image signal processor;

wherein the display device is configured to be illuminated directly or indirectly with diffracted first bandwidth emitted from the first and second holographic optical elements;

wherein the first and second holographic optical elements are positioned adjacent each other.

31. The apparatus of claim 30 wherein the first holographic optical element comprises a holographic recording medium that records a hologram, wherein the holographic recording medium comprises:

a monomer dipentaerythritol hydroxypentaacrylate;
a liquid crystal;
a cross-linking monomer;
a coinitiator; and
a photoinitiator dye.

32. The apparatus of claim 30 wherein the first holographic optical element comprises a hologram made by exposing an interference pattern inside a polymer-dispersed liquid crystal material, the polymer-dispersed liquid crystal material comprising, before exposure:
- (a) a polymerizable monomer;
- (b) a liquid crystal;
- (c) a cross-linking monomer;
- (d) a coinitiator; and
- (e) a photoinitiator dye.

* * * * *